(12) United States Patent
Zilmer et al.

(10) Patent No.: US 9,787,631 B2
(45) Date of Patent: Oct. 10, 2017

(54) UNIFIED AND CONSISTENT MULTIMODAL COMMUNICATION FRAMEWORK

(71) Applicant: Wire Swiss GmbH, Zug (CH)

(72) Inventors: Priidu Zilmer, Tallinn (EE); Angel Sergio Palomo Pascual, Helsinki (FI); Oliver Reitalu, Tallinn (EE); Alan Duric, Allenwinden (CH); Bjørn Nordbø, Bo (NO); Robert Kortenoeven, Berlin (DE); Håkon Bø, London (GB); Tyson Chihaya, Berlin (DE); Michael Bevin, Tallinn (EE); Tymofii Zadorozhny of Serhii, Lviv (UA); Panayiotis Lipiridis, Copenhagen (DK); Dusan Stevanovic, Allenwinden (CH); Tiago Manuel Ventura Loureiro, Berlin (DE); Jonathan Christensen, San Ramon, CA (US)

(73) Assignee: Wire Swiss GmbH, Zug (CH)

( * ) Notice: Subject to any disclaimer, the term of this patent is extended or adjusted under 35 U.S.C. 154(b) by 306 days.

(21) Appl. No.: 14/311,291

(22) Filed: Jun. 21, 2014

(65) Prior Publication Data

US 2015/0039706 A1 Feb. 5, 2015

Related U.S. Application Data

(60) Provisional application No. 61/860,222, filed on Jul. 30, 2013.

(51) Int. Cl.
*G06F 15/16* (2006.01)
*H04L 12/58* (2006.01)

(52) U.S. Cl.
CPC .............. *H04L 51/36* (2013.01); *H04L 51/04* (2013.01); *H04L 51/26* (2013.01)

(58) Field of Classification Search
CPC .......... H04L 51/36; H04L 51/26; H04L 51/04
See application file for complete search history.

(56) References Cited

U.S. PATENT DOCUMENTS

| 2007/0003029 A1* | 1/2007 | Vesterinen ........... G06Q 10/107 379/88.14 |
| 2007/0135099 A1* | 6/2007 | Taylor ................. G06F 17/3089 455/412.1 |
| 2008/0198981 A1 | 8/2008 | Skakkebaek |
| 2009/0319941 A1* | 12/2009 | Laansoo ........... G06F 17/30551 715/784 |
| 2013/0086153 A1 | 4/2013 | Vendrow |

FOREIGN PATENT DOCUMENTS

EP 2383947 A1 11/2011

OTHER PUBLICATIONS

WIPO, International Preliminary Report on Patentability Chapter I, for PCT/EP2014/066284, Feb. 2, 2016 (12p.).
WIPO, International Search Report, for PCT/EP2014/066284, Jan. 19, 2015 (4p.).
WIPO, Written Opinion of the International Search Authority, for PCT/EP2014/066284, Jan. 19, 2015 (11p.).

* cited by examiner

*Primary Examiner* — Padma Mundur
(74) *Attorney, Agent, or Firm* — Siritzky Law, PLLC

(57) ABSTRACT

A unified communication framework in which multiple users communicate using multiple modes. Conversations are kept consistent across users' devices. A backend maintains the true and authoritative version of the conversation within the communication framework.

47 Claims, 66 Drawing Sheets

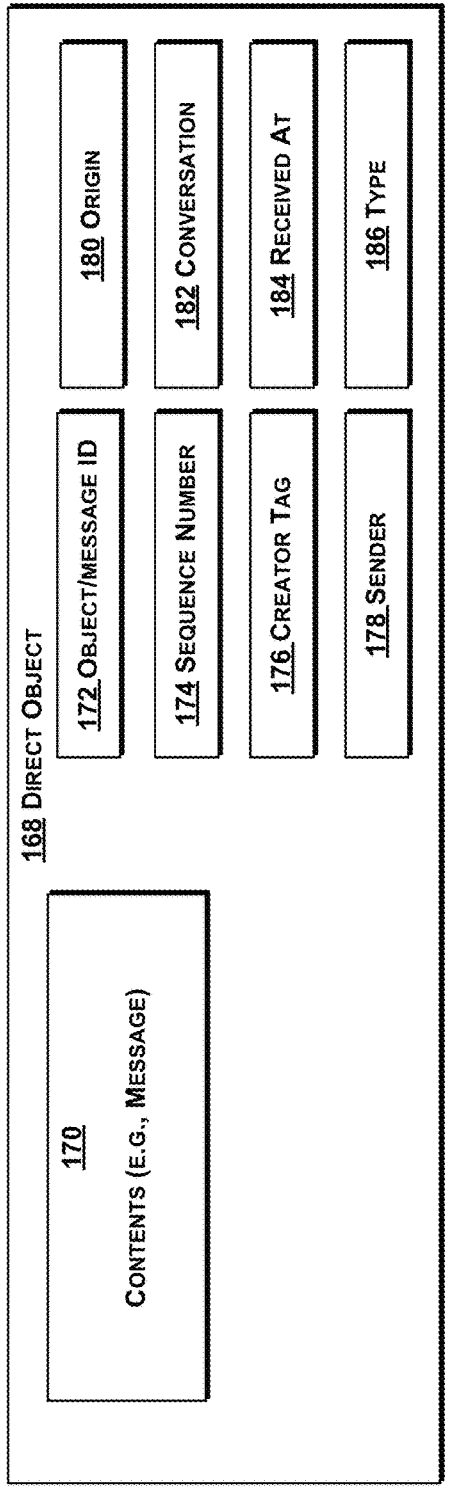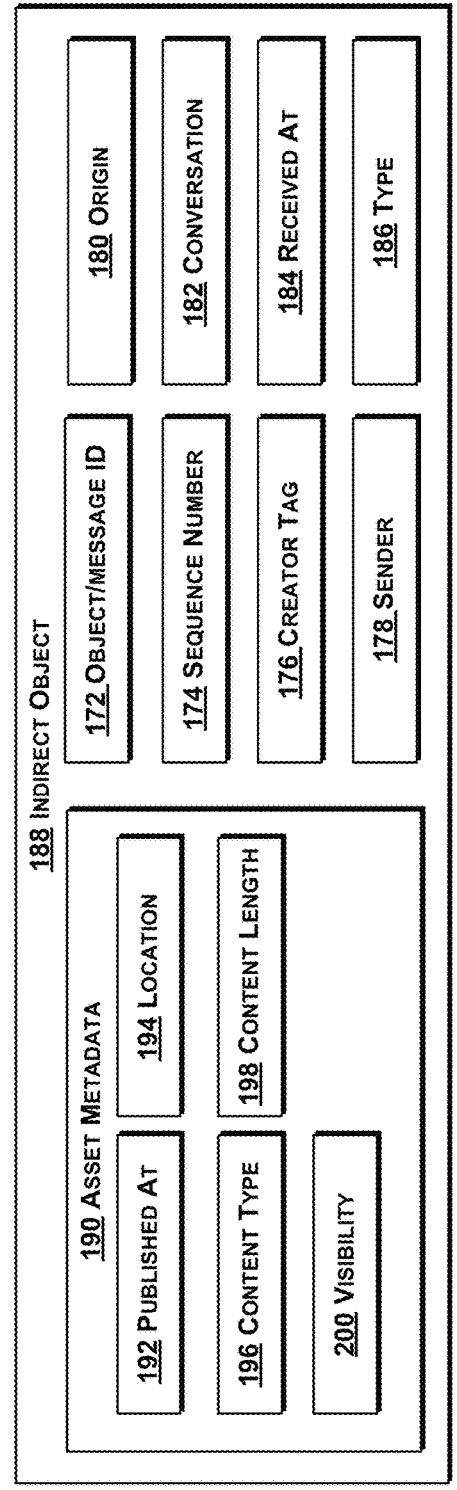
FIG. 4B
FIG. 4C

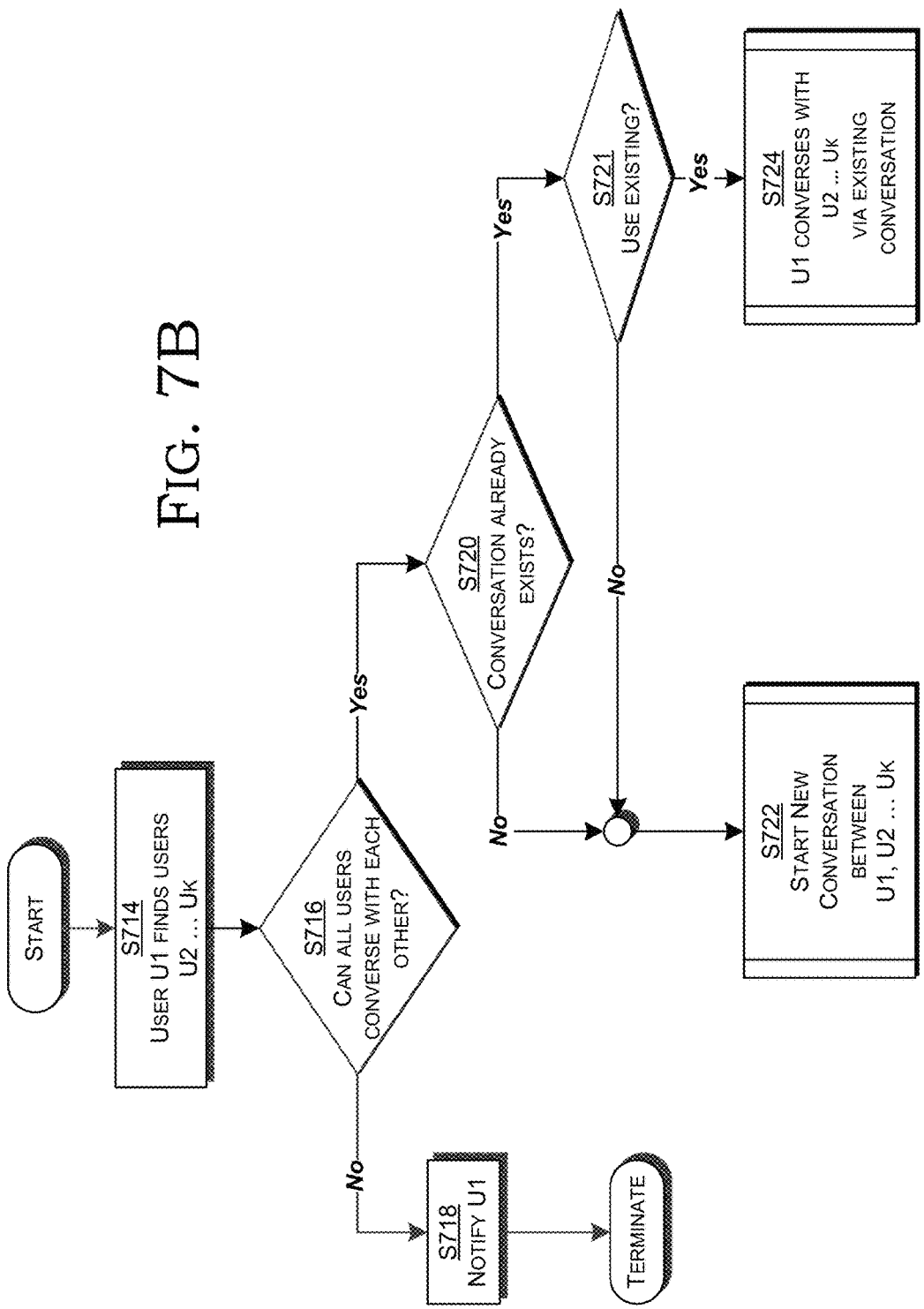

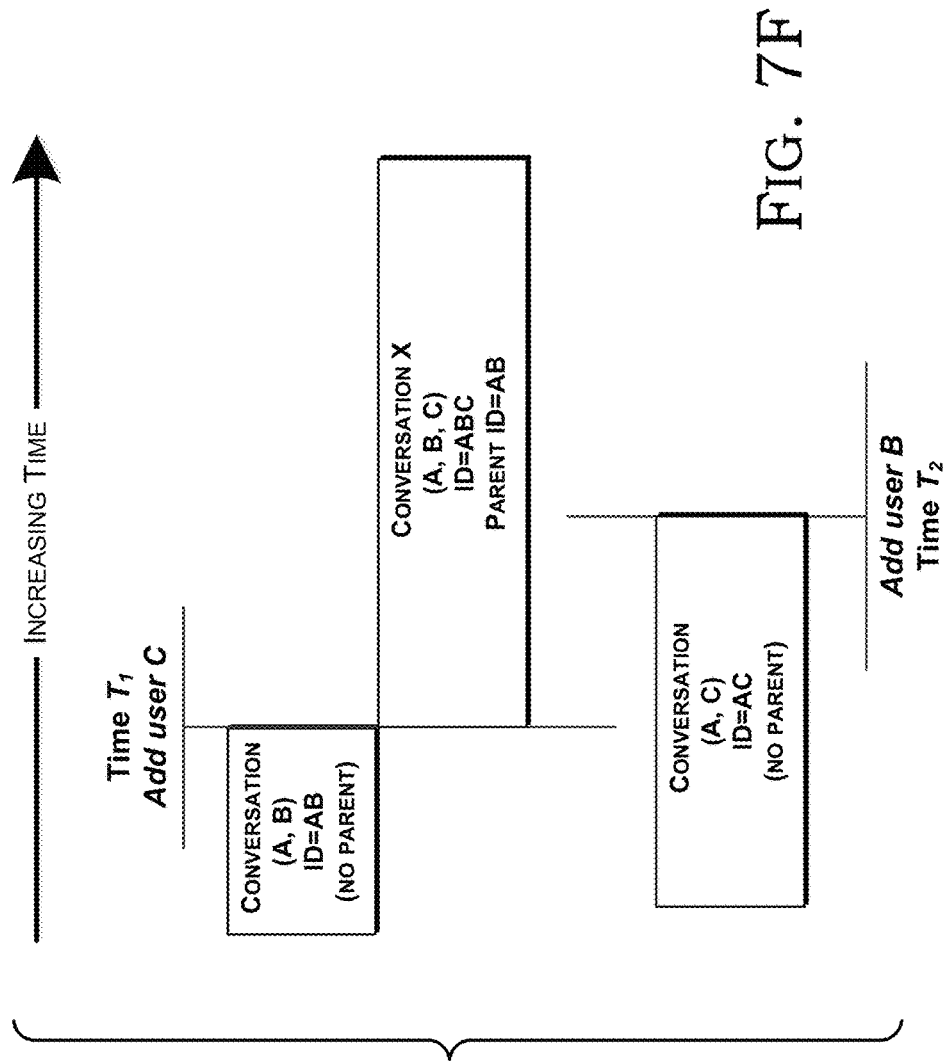

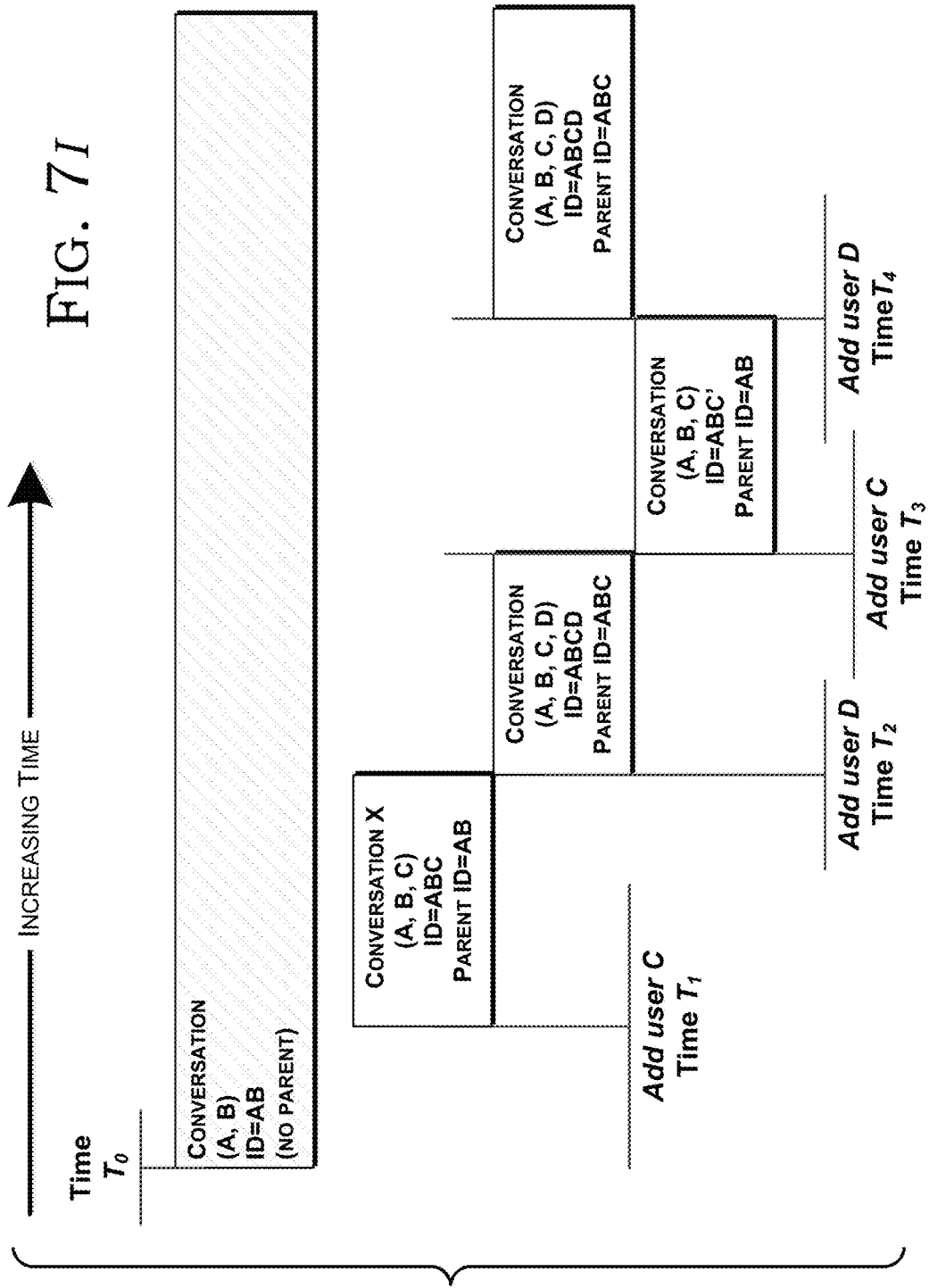

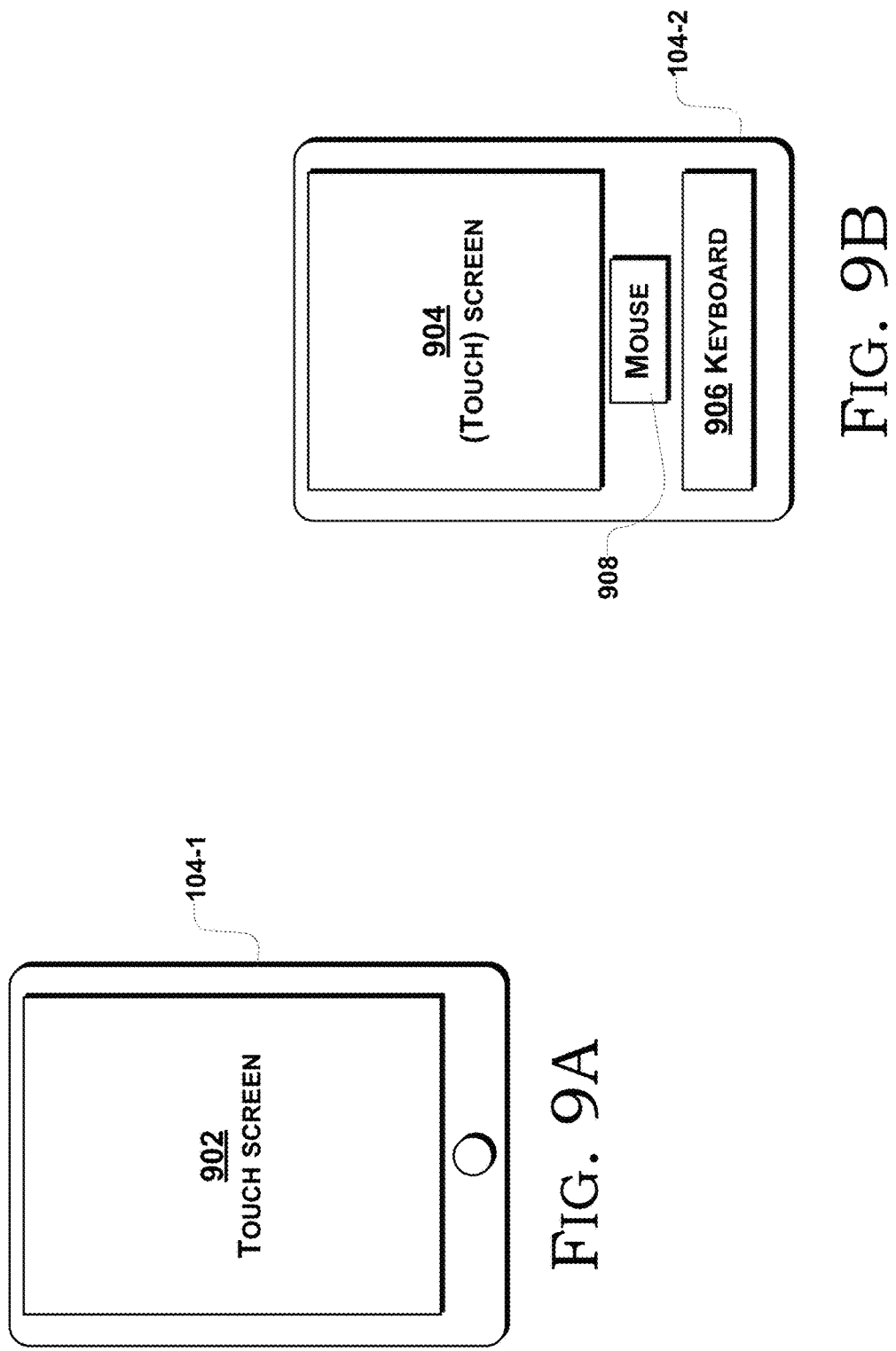

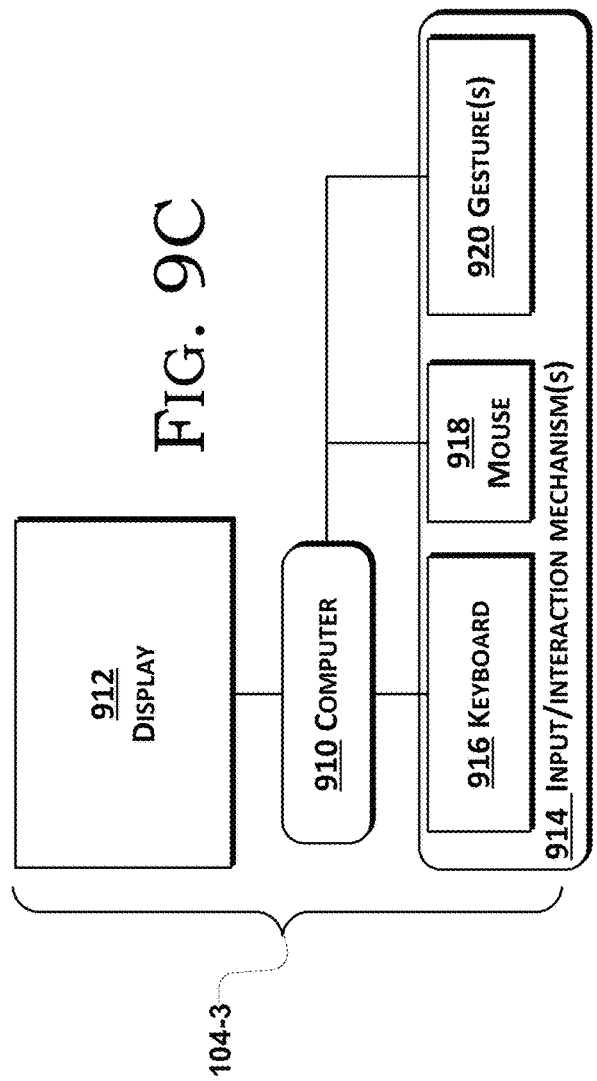

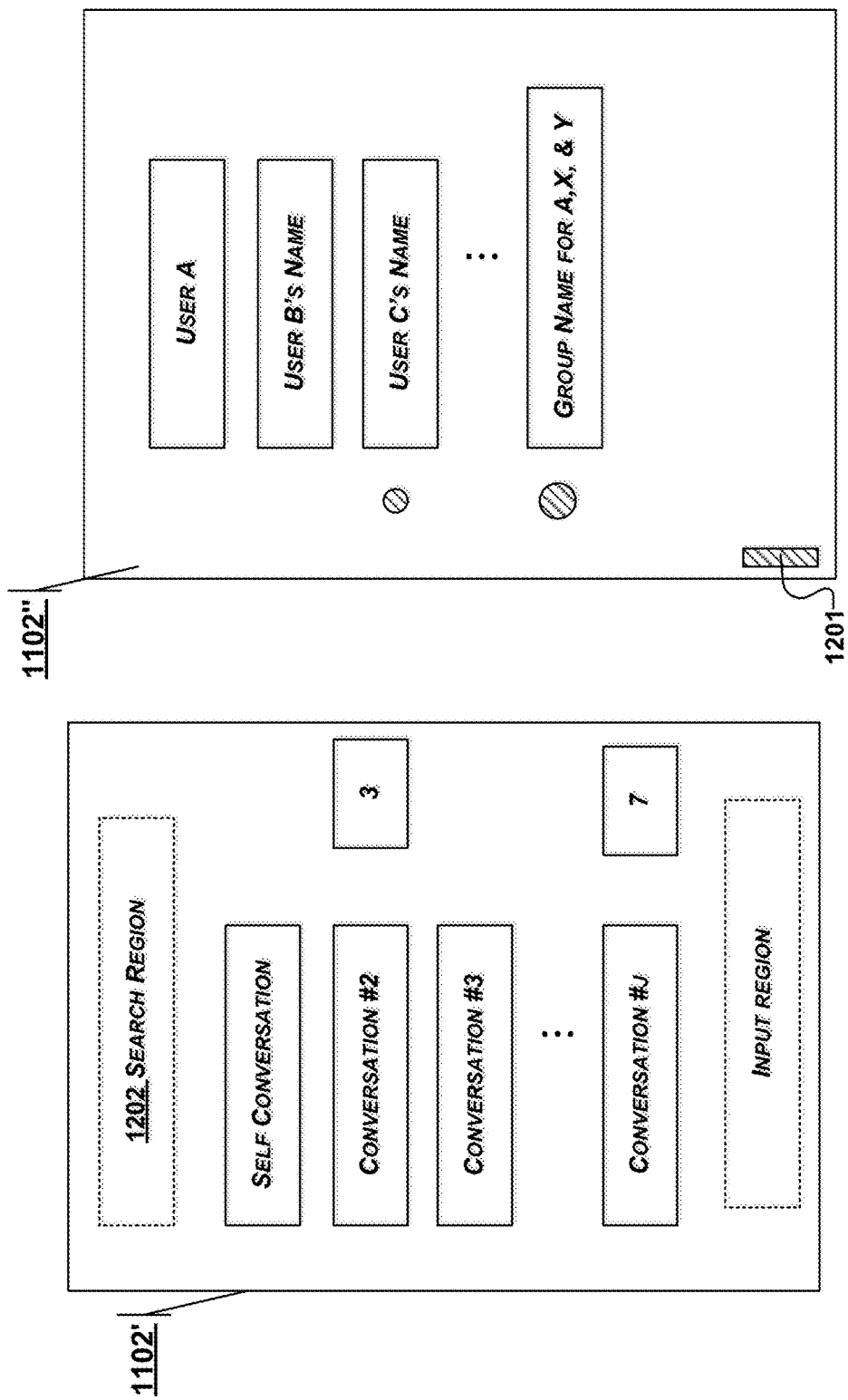

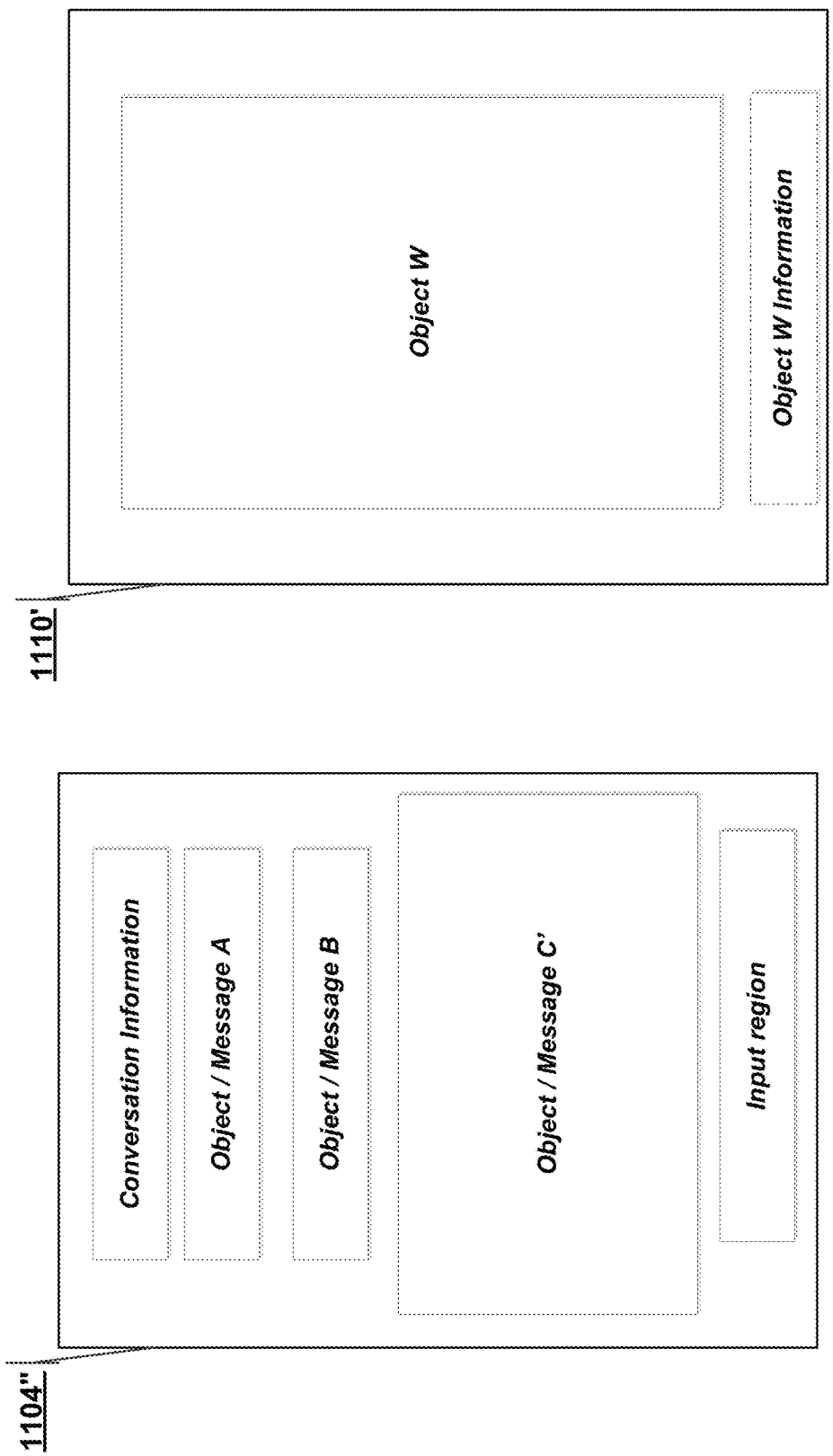

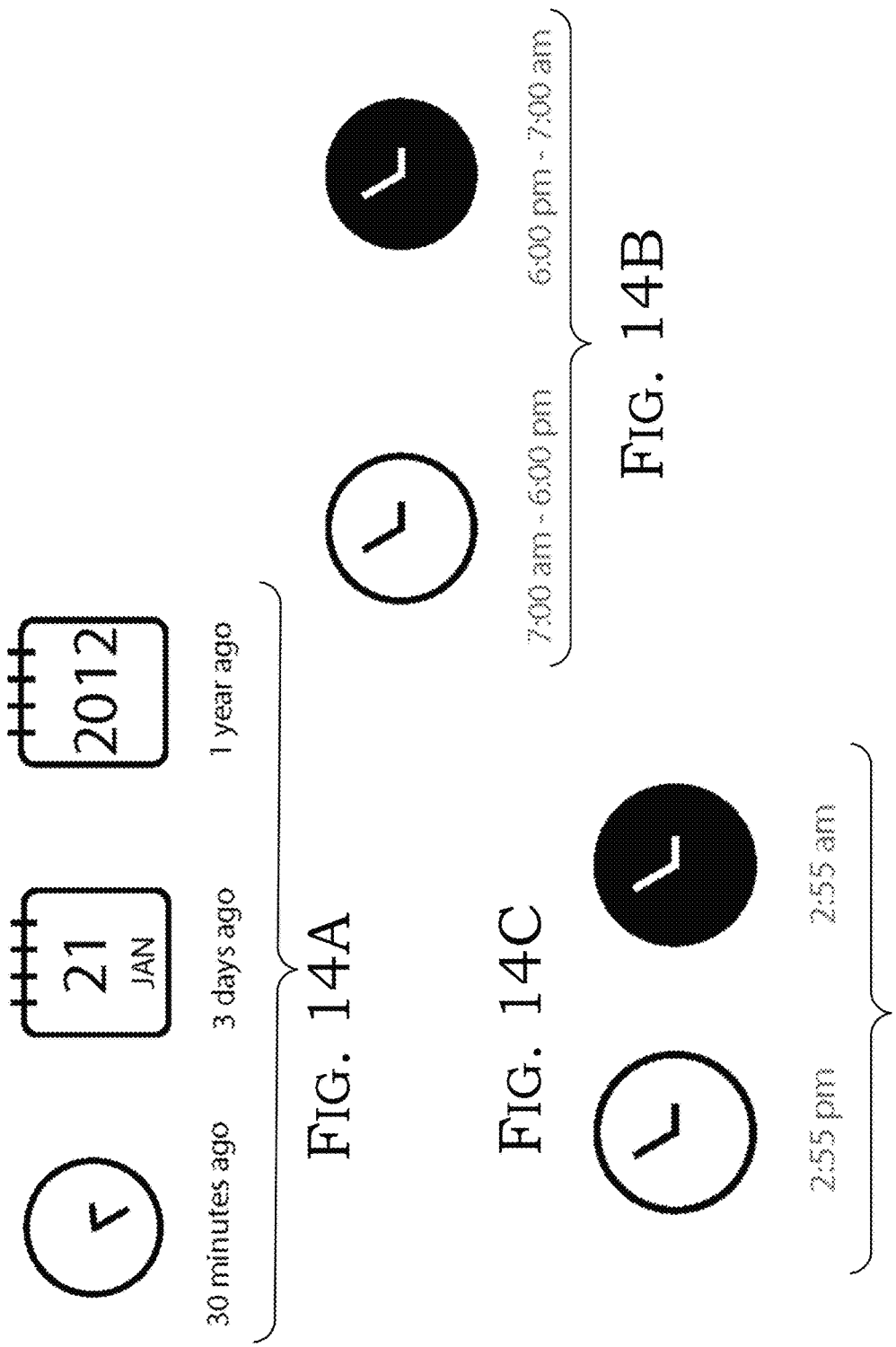

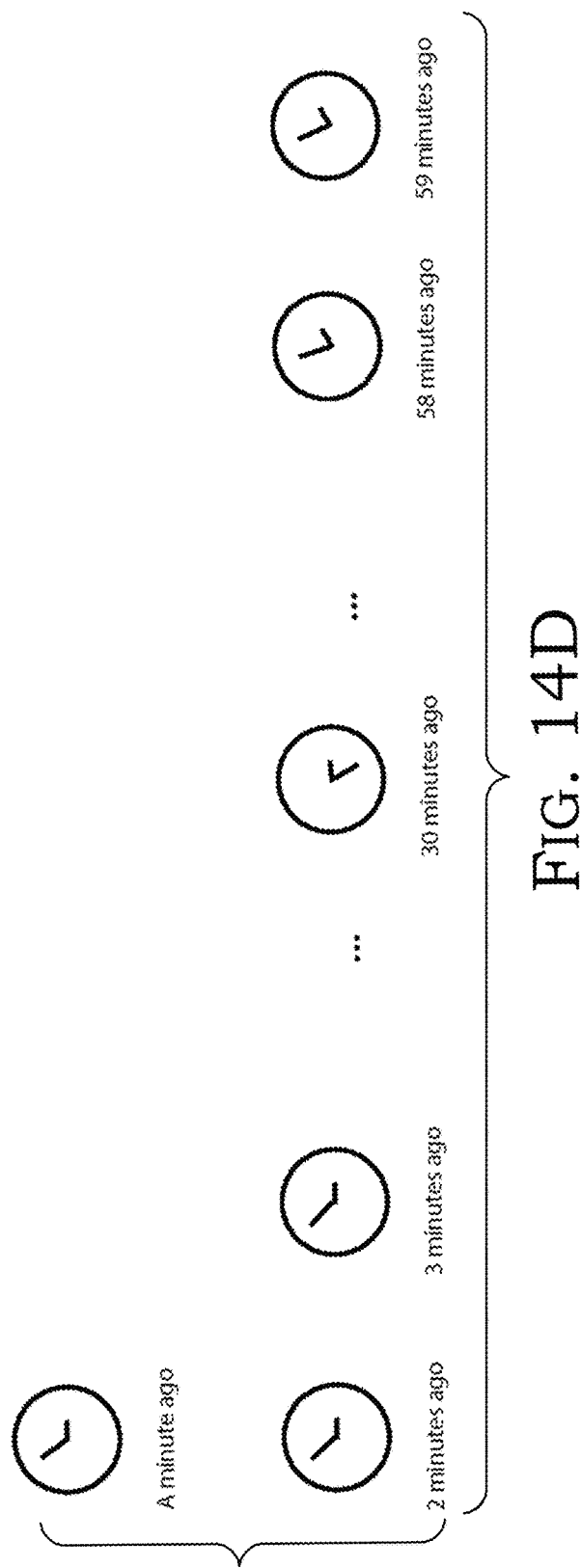

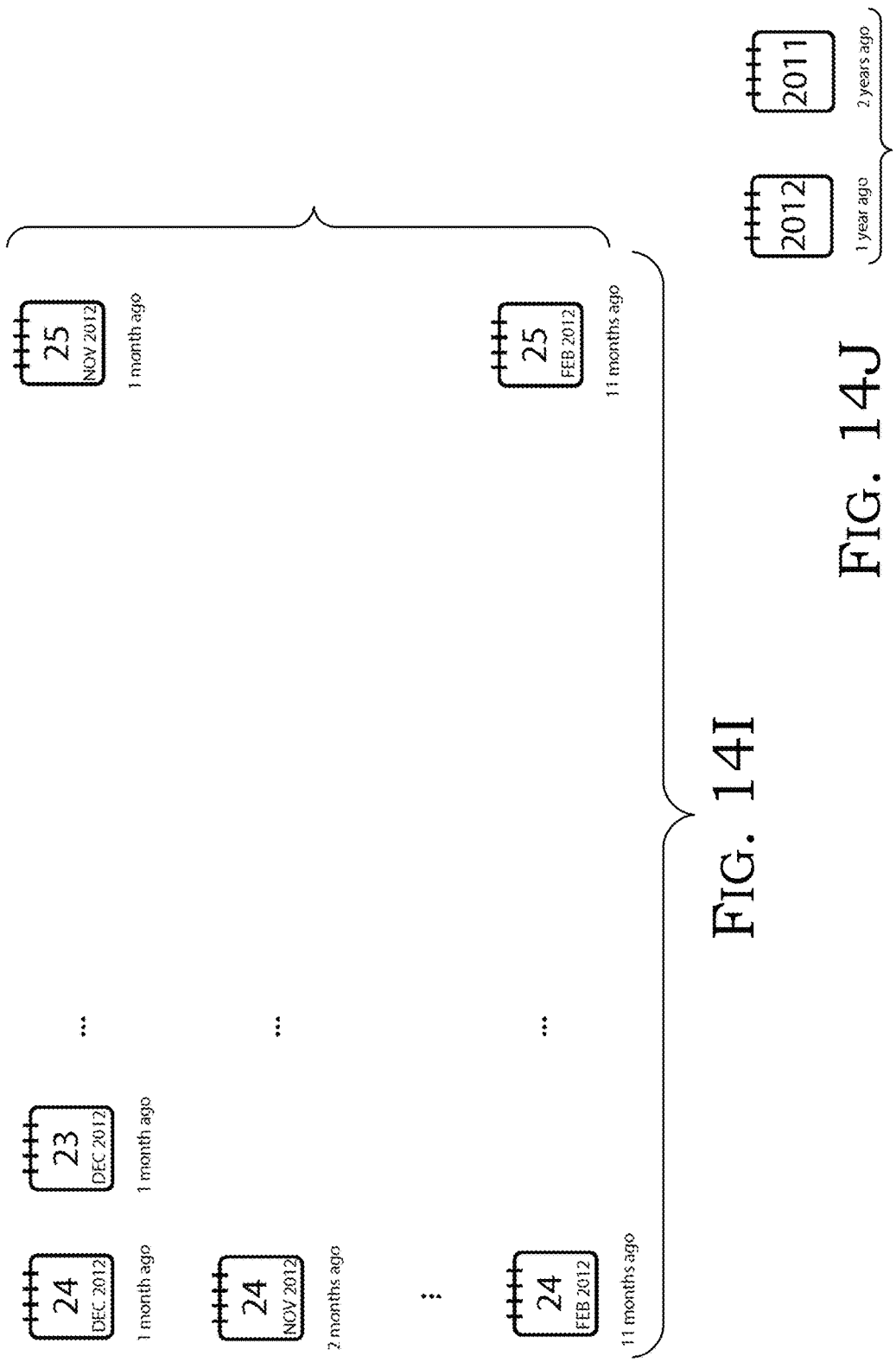

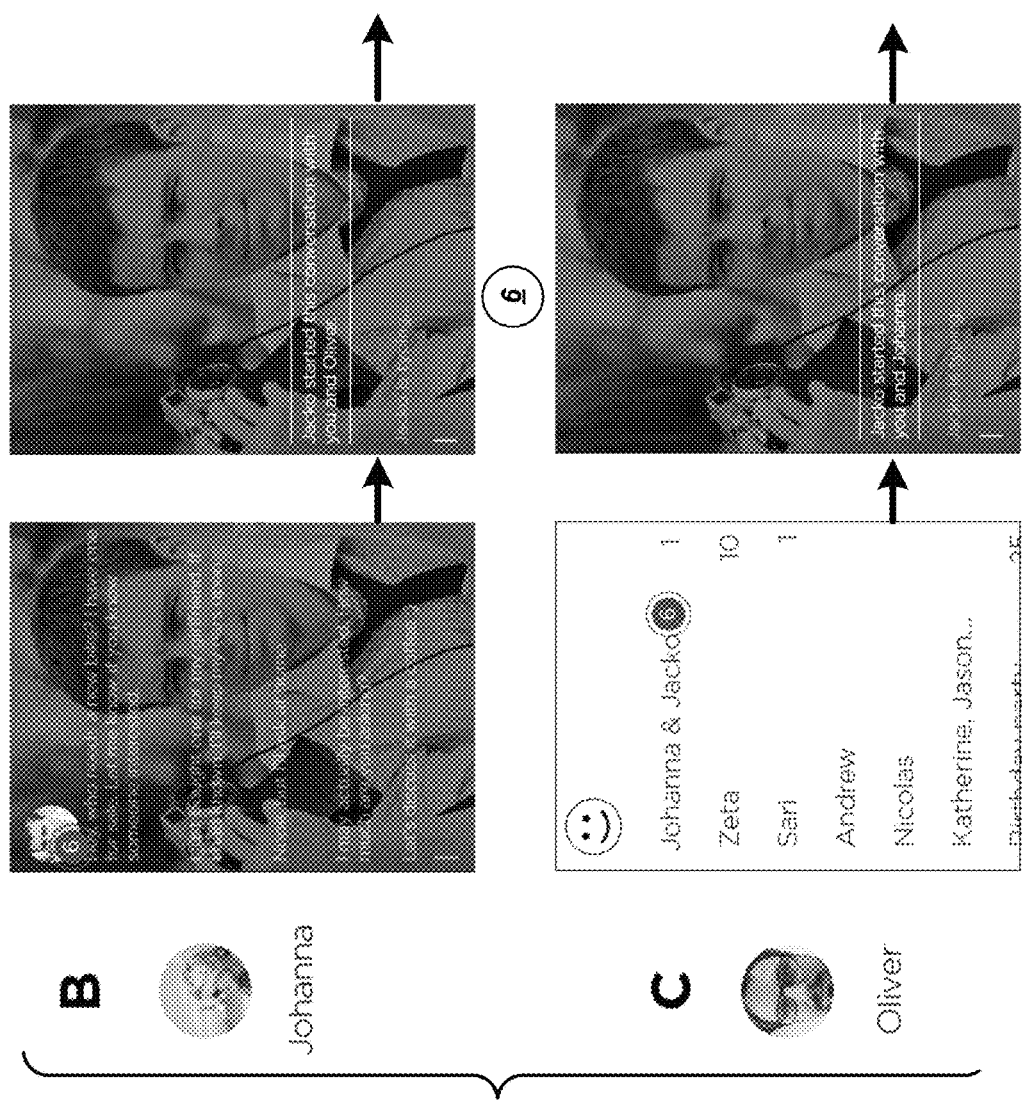

UNIFIED AND CONSISTENT MULTIMODAL COMMUNICATION FRAMEWORK

RELATED APPLICATION

This application is related to and claims priority from U.S. provisional patent application No. 61/860,222, filed Jul. 30, 2013, the entire contents of which are hereby fully incorporated herein by reference for all purposes.

BACKGROUND OF THE INVENTION

Copyright Statement

This patent document contains material subject to copyright protection. The copyright owner has no objection to the reproduction of this patent document or any related materials in the files of the United States Patent and Trademark Office, but otherwise reserves all copyrights whatsoever.

FIELD OF THE INVENTION

This invention relates to a framework for communication, and, more particularly, to a unified framework for multimodal consistent communication.

BRIEF DESCRIPTION OF THE DRAWINGS

Other objects, features, and characteristics of the present invention as well as the methods of operation and functions of the related elements of structure, and the combination of parts and economies of manufacture, will become more apparent upon consideration of the following description and the appended claims with reference to the accompanying drawings, all of which form a part of this specification.

FIGS. 4A-4F, 5A-5B, 6A-6B, and 7A-7I depict aspects of conversations in accordance with an embodiment;

FIGS. 9A-9C depict aspects of exemplary devices for use in a system in accordance with an embodiment;

FIGS. 10A-10B, 11A-11B, 12A-12J, 13A-13G, and 14A-14J depict aspects of exemplary user interfaces in accordance with an embodiment;

FIGS. 15A-15L and 16A-16F show various operational aspects of the system using exemplary user interfaces in accordance with an embodiment.

DETAILED DESCRIPTION OF THE PRESENTLY PREFERRED EXEMPLARY EMBODIMENTS

Glossary and Abbreviations

As used herein, unless used otherwise, the following terms or abbreviations have the following meanings:
API means application programming interface;
CA means Certificate Authority;
CRL means certificate revocation list;
GUI means graphical user interface (UI);
HTTP means Hyper Text Transfer Protocol;
HTTPS means HTTP Secure;
IP means Internet Protocol;
IPv4 means Internet Protocol Version 4;
IPv6 means Internet Protocol Version 6;
IP address means an address used in the Internet Protocol, including both IPv4 and IPv6, to identify electronic devices such as servers and the like;
JSON means JavaScript Object Notation;
MIME means Multipurpose Internet Mail Extensions;
OCSP refers to the Online Certificate Status Protocol;
PKI means Public-Key Infrastructure;
POTS means Plain old telephone service;
TCP means Transmission Control Protocol;
UI means user interface;
URI means Uniform Resource Identifier;
URL means Uniform Resource Locator;
VKB means virtual keyboard.

Background and Overview

Computers and computing devices, including so-called smartphones, are ubiquitous, and much of today's communication takes place via such devices. In many parts of the world, computer-based inter-party communication has superseded POTS systems. Much of today's computer-based communication is built on old protocols that were designed to provide simple messages between devices on the homogeneous networks.

The inventors realized that existing communications systems do not support consistent views of conversations over multiple heterogeneous devices, regardless of when those devices join a conversation, nor do they provide an authoritative and consistent source of a conversation within a multimodal communications system.

It is desirable to provide a system that can maintain or provide consistent views of conversations over multiple heterogeneous devices, regardless of when those devices join a conversation.

It is desirable to provide an authoritative and consistent source of a conversation within a multimodal communications system.

Overview—Structure

Figure 1:
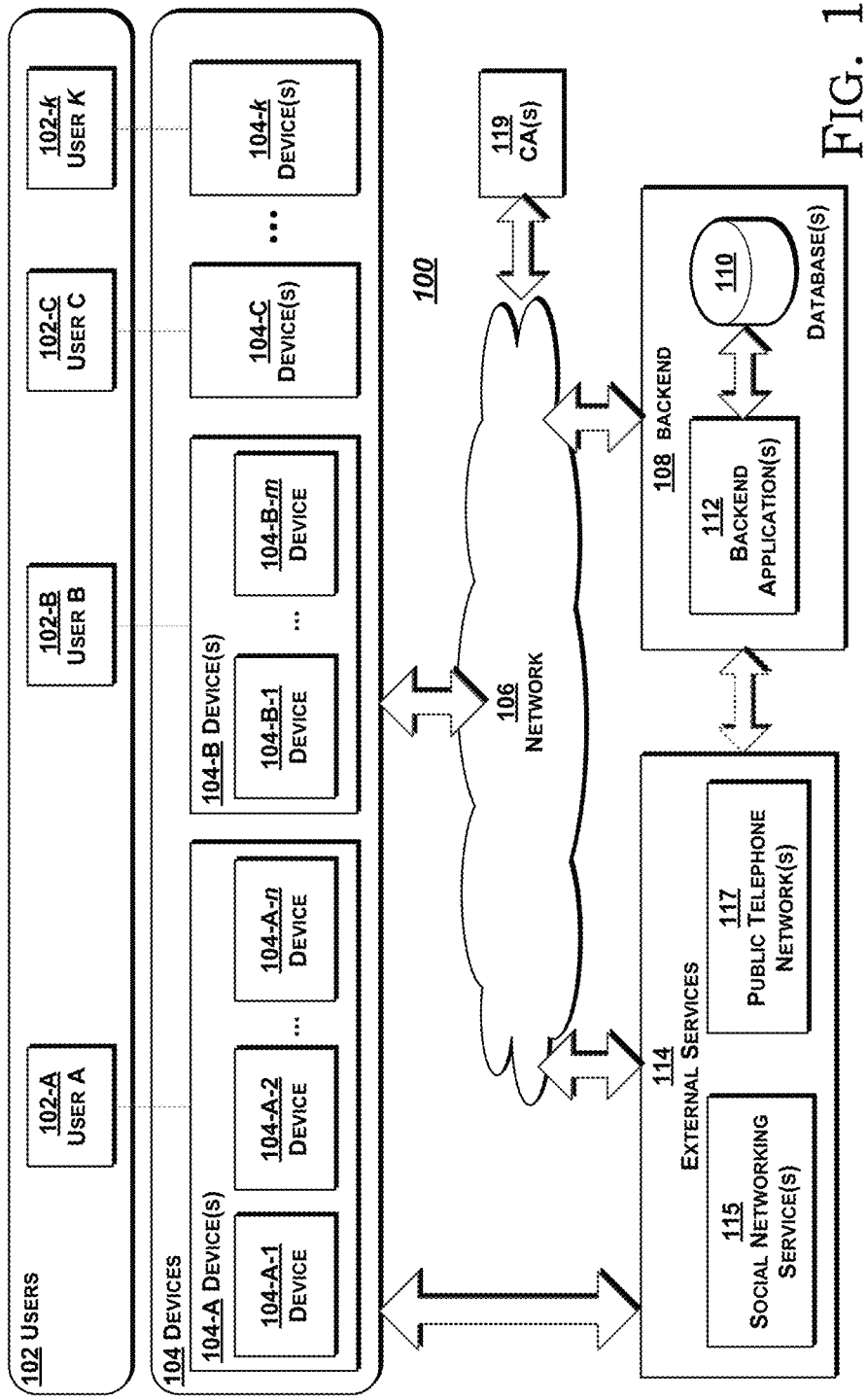
FIG. 1 shows an overview of a framework for a unified and consistent communications in accordance with an embodiment.

FIG. 1 shows an overview of an exemplary framework 100 for a unified and consistent communications system. Within the framework 100, a user 102 may have one or more devices 104 associated therewith. For example, as shown in FIG. 1, user 102-A has device(s) 104-A (comprising devices 104-A-1, 104-A-2 . . . 104-A-n) associated therewith. Similarly, user 102-B has device(s) 104-B (comprising devices 104-B-1 . . . 104-A-m) associated therewith. The association between the user and the devices is depicted in the drawing by the line connecting user 102 with devices 104 associated with that user. Although only four user/device associations are shown in the drawing, it should be appreciated that a particular system may have an arbitrary number of users, each with an arbitrary number of devices.

Those of ordinary skill in the art will realize and appreciate, upon reading this description, that a particular user/device association may change over time, and further, that a particular device may be associated with multiple users (for example, multiple users may share a computer).

It should be appreciated that a user 102 may not correspond to a person or human, and that a user 102 may be any entity (e.g., a person, a corporation, a school, etc.).

Users 102 may use their associated device(s) 104 to communicate with each other within the framework 100. As will be explained in greater detail below, a user's device(s) may communicate with one or more other users' device(s) via network 106 and a backend 108, using one or more backend applications 112. The backend 108 (backend application(s) 112) maintains a record/history of communications between users in one or more databases 110, and essentially acts as a persistent store through which users 102 share data.

The backend database(s) 108 may comprise multiple separate or integrated databases, at least some of which may be distributed. The database(s) 108 may be implemented in any manner, and, when made up of more than one database, the various databases need not all be implemented in the same manner. It should be appreciated that the system is not limited by the nature or location of database(s) 108 or by the manner in which they are implemented.

It should be appreciated that multiple devices 104 associated with the same user 102 may be communicating via the backend 108 at the same time (for example, as shown in the drawing, some or all of the devices 104-A-1, 104-A-2 . . . 104-A-n may be communicating via the backend 108).

The devices 102 can be any kind of computing device, including mobile devices (e.g., phones, tablets, etc.), computers (e.g., desktops, laptops, etc.), and the like. Computing devices are described in greater detail below.

Figure 2A:
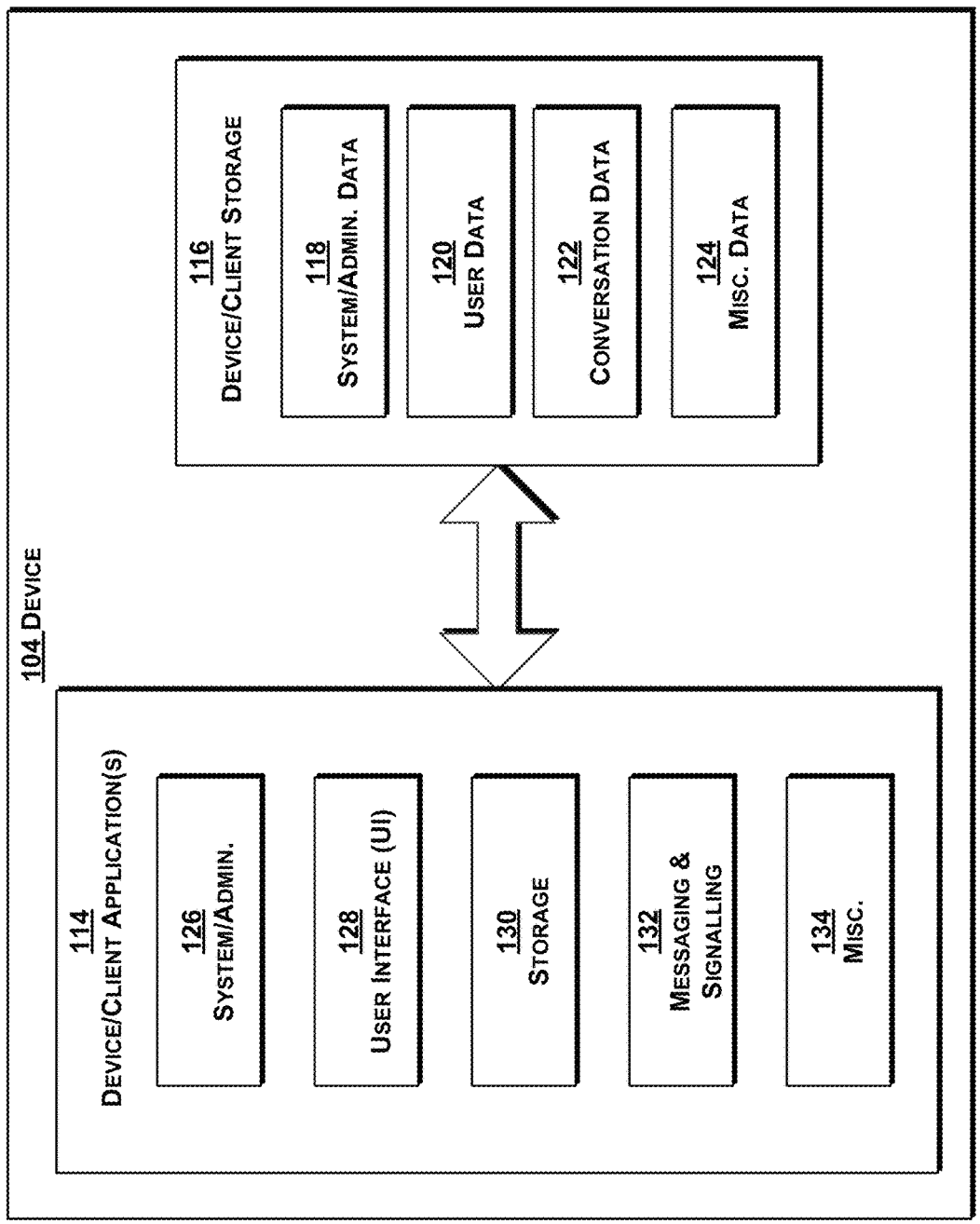
FIG. 2A depicts a device in accordance with an embodiment.

FIG. 2A shows aspects of a typical device 102, including device/client applications 114 interacting with client storage 116. As will be described in greater detail below, an interaction between a set of one or more users is referred to herein as a "conversation." Device/client storage 116 may include system/administrative data 118, user data 120, conversation data 122, and miscellaneous data 124. The device/client application(s) 114 may include system/administrative applications 126, user interface (UI) applications 128, storage applications 130, messaging and signaling applications 132, and other miscellaneous applications 134. The categorization of data in storage 116 is made for the purposes of aiding this description, and those of ordinary skill in the art will realize and appreciate, upon reading this description, that different and/or other categorizations of the data may be used. It should also be appreciated any particular data may categorized in more than one way. Similarly, it should be appreciated that different and/or other categorizations of the device/client applications 114 may be used and furthermore, that any particular application may be categorized in more than one way.

Figure 2B:
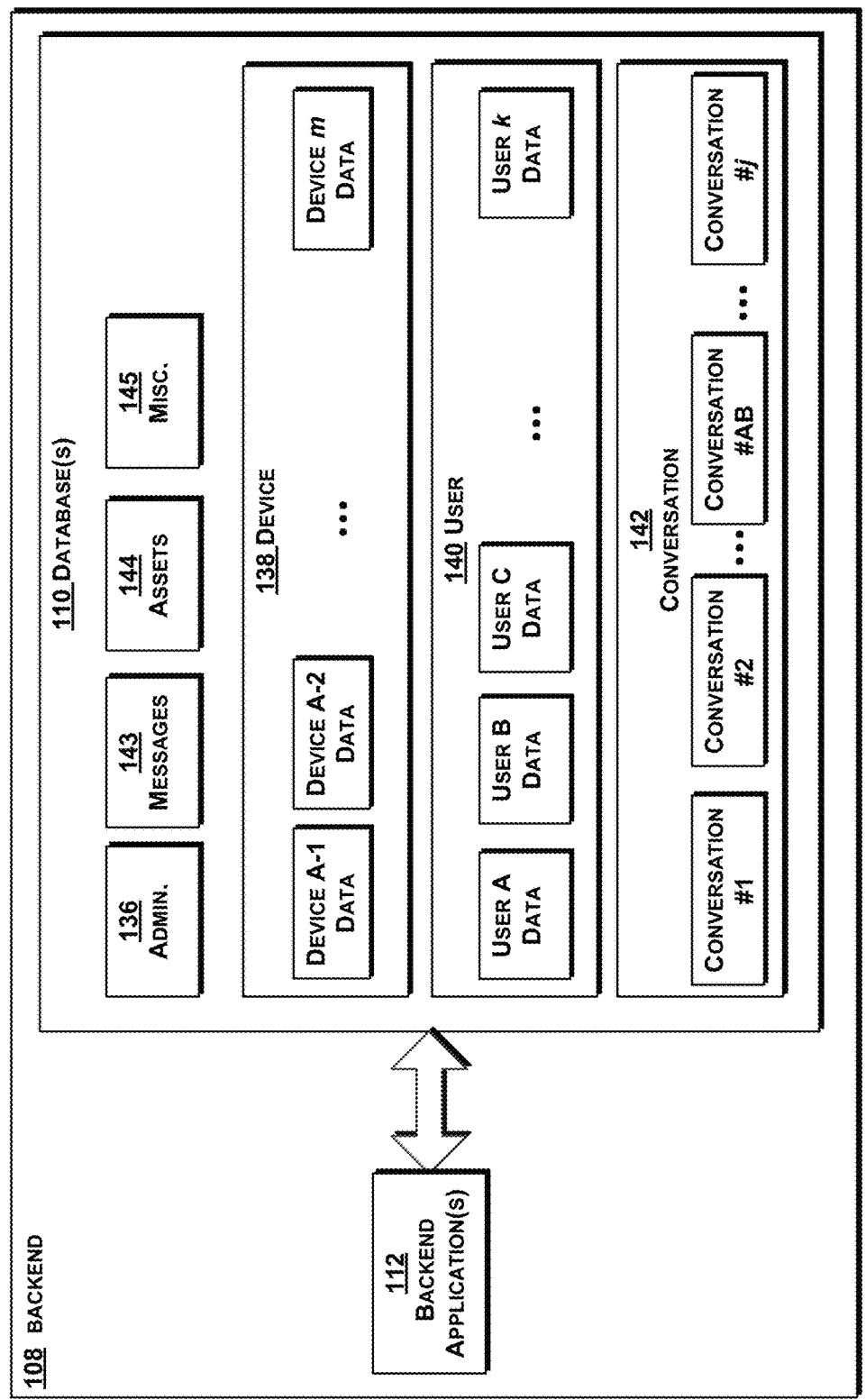
FIG. 2B depicts a backend in accordance with an embodiment.

FIG. 2B shows aspects of an exemplary backend 108 in which database(s) 110 includes administrative data 136, device data 138, user data 140, conversation data 142, messages 143, asset data 144, and other miscellaneous data 145. The device data 138 in the backend database(s) 110 may include data about all devices in the system 100. Thus, e.g., and with reference again to the exemplary system 100 shown in FIG. 1, the device data 138 may include data about device A-1, device A-2, . . . and device m. The user data 140 may include data about all users of the system 100. Thus, e.g., the user data 140 may include data about user A, user B, user C, . . . and user k. The conversation data 142 preferably includes data about all conversations that have occurred within the system 100. As shown in the drawing in FIG. 2B, conversations are denoted "Conversation #1", "Conversation #2," etc. Recall that the backend essentially acts as a persistent store through which users 102 may share and access data, including conversation data.

A conversation stored and maintained in the backend is considered to be the "true" or authoritative version of that conversation within the system. As such, to the extent that any other version of that conversation exists within the system, e.g., on any device, the version stored and maintained in the backend is considered to be the correct and authoritative version of that conversation. If there are any discrepancies between a conversation version in the backend and any other version of that conversation that might exist in the system, the version of the conversation in the backend controls and is authoritative within the system (and is thus considered to be the "true" version of that conversation).

It should be appreciated that the categorization of data in the backend database(s) is made for the purposes of this description, and those of ordinary skill in the art will realize and appreciate, upon reading this description, that different and/or other categorizations and/or organizations of the data may be used. It should also be appreciated that the backend database(s) 110 preferably include appropriate index data to facilitate fast and efficient access to and update of the various data stored therein.

Figure 3B:
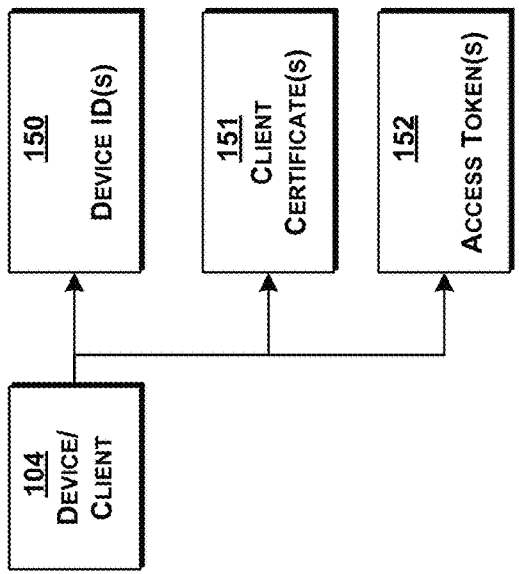
FIGS. 3A-3B show aspects of users and devices.
Figure 3A:
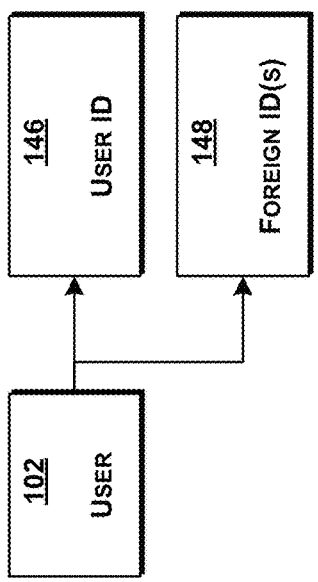

As shown in FIG. 3A, each user 102 within the system 100 is identified by an internal user identifier (user ID 146) that is unique within the system 100. This user ID 146 may be assigned in a registration process. While in a presently preferred implementation there is no explicit signup of users, in an exemplary registration process users may register via one or more external services 114 (FIG. 1) with which the user is already registered, such as, social network services 115 (FIG. 1, e.g., Facebook, Twitter, LinkedIn, Google, and the like) or public telephone network(s) 117 (FIG. 1, e.g., Vodafone, AT&T, Optus, Sprint, Verizon, and the like).

With reference again to FIG. 1, when a user registers or joins the system 100 using an external service 114 (e.g., social network service or public telephone network) the combination of the service and the user's ID 146 in that service is referred to as a foreign identifier (foreign ID) 148. As a user 102 may be registered with more than one external service, the user may have more than one foreign ID 148.

It should be appreciated that system is not limited by the manner in which a user ID 146 is assigned to a user. It should also be appreciated that the system is not limited by whether or how registration takes place. Those of ordinary skill in the art will realize and appreciate, upon reading this description, that although registration is described herein via external services, different and/or other registration techniques may be used.

User information such as the user ID 146 and a user's foreign ID(s) 148 may be stored in the user data 140 the backend database 110.

Device Identifiers (IDs)

Each client/device 104 using or associated with the system 100 needs a device identifier (ID). As shown, e.g., in FIG. 3B, an exemplary client/device 104 may have device ID 150 associated therewith. Each device is associated with at least one user, and the device identifier is unique within the system 100 for a single user. Thus, within the system 100, there may be identical device identifiers, but each <user ID, device ID> pair will be unique.

Authentication

A client/device 104 using the system 100 needs to authenticate itself with the system. In presently preferred implementations, there are two options for authentication: client certificates and access tokens. Client certificates are the preferred approach, and the access token approach is preferably only used to facilitate clients that cannot use client certificates (e.g., web applications). As shown, e.g., in FIG. 3B, an exemplary client/device 104 may have one or more client certificates 151 and/or access tokens 152 associated therewith. Typically a client/device 104 will have either certificate(s) 151 or tokens 152, depending on the type of connection that client/device will make with the backend 108.

The system 100 may use or provide one or more certificate authorities (CAs) 119 (FIG. 1) for authentication and verification purposes, both during a user or device's initial use of the system, and in an ongoing manner for communication between devices 104 and/via the backend 108.

Connecting a Device to a User

As noted, a device 104 needs to be associated with a user 102 in order to operate within the system 100. When connecting a device 104 to a user 102, the client application 114 has to obtain and authenticate a foreign ID 148 from the user 102. Next the client application 114 has to use the foreign ID 148 and authentication data it obtained from the corresponding foreign service and request either a certificate 151 or an access token 152 from the backend 108.

Acquiring the Foreign ID

As some of these foreign services may be embedded into mobile devices, in presently preferred implementations it is the device's responsibility to perform authentication with the foreign service and to acquire the necessary data to allow the system to confirm successful authentication with the service.

Within an OAuth-based authorization service, authentication typically provides an access token. When proceeding with connecting the device, the application has to provide information about the foreign services authentication data as parameters of the request.

Acquiring a Client Certificate

In order to acquire a client certificate 151, a client/device 104 requests a certificate from the backend 108. The request is preferably in the form of a certificate signing request that is made of the backend 108. Preferably information about the foreign authentication is included in the request. In some cases the certificate request includes information about the device.

Managing the Requesting Device and its User

Information about authenticated devices may be stored in the device data 138 in the backend database(s) 110. Device information stored in the backend database(s) 110 in device data 138. The device information may include some or all of the following:

The optional Agent Information may include the following:

| Attribute | Description |
| --- | --- |
| System | An identification of the system (e.g., "ios", "android", "osx"). |
| Software | The software version of the device application. |
| Hardware | An optional string that can be used to describe the underlying hardware. |

An authenticated device 104 may find information about itself, its user, and operations directly related to the two from the backend 108. In a presently preferred implementation a device 104 may obtain some or all of the following information: user ID and device ID.

In addition the device may also obtain attributes of the user's profile. In a presently preferred implementation, as described in greater detail below, the device requests the information using an HTTPS GET request and the information is returned to the device in an object (e.g., a JSON response).

Conversations

Recall from above that a "conversation" is the term used herein to refer to an ongoing interaction between a set of one or more users. In some aspects, a conversation may be considered to be a time-ordered sequence of events and associated event information or messages. The first event occurs when the conversation is started, and subsequent events are added to the conversation. The time of an event in a conversation is the time at which the event occurred on the backend.

The Event Information Associated with an Event—Contents of Conversations

Events in a conversation may be represented as or considered to be objects (described in greater detail below), and thus a conversation may be considered to be a time-ordered sequence of objects. An object (and therefore a conversation) may include or represent text, images, video, audio, files, and other assets. As used herein, an asset refers to anything in a conversation, e.g., images, videos, audio, links (e.g., URIs) and other objects of interest related to a conversation.

Figure 4A:
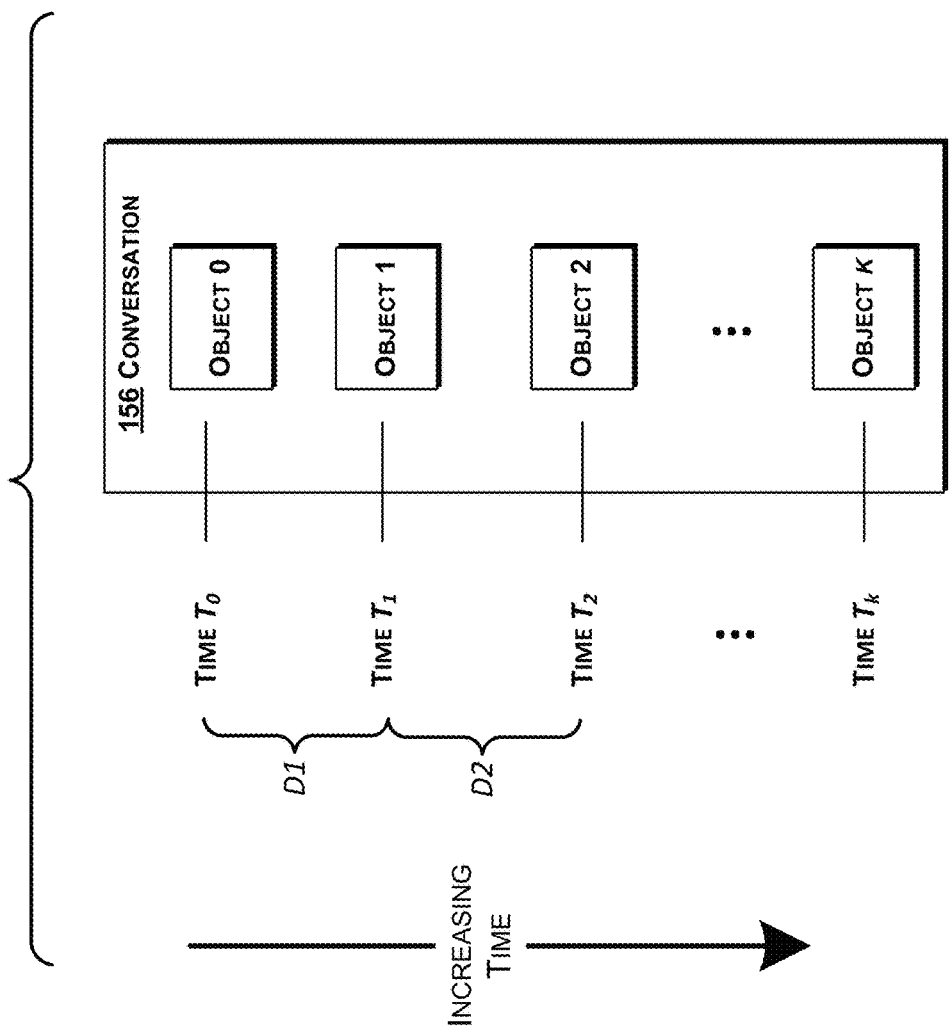

As will be understood and appreciated by those of ordinary skill in the art, upon reading this description, in some aspects, a conversation may be considered to be a timeline with associated objects. Thus, e.g., as shown in FIG. 4A, conversation 156 is a time-ordered sequence of objects (Object 0 at time $T_0$, Object 1 at time $T_1$, Object 2 at time

| Attribute | Description |
| --- | --- |
| User id. | The unique identifier of the user the device is connected to (146, FIG. 3A). |
| Device id. | An identifier for the connected device making the request (150, FIG. 3B). This device identifier is only guaranteed to be unique within a single user. |
| Connection type | The type of credential that was handed out for the device. This is either "certificate" or "token". |
| Certificate issuer | The contents of the issuer field of the certificate that should currently be used by the client. This attribute is only included if "connection type" is "certificate". |
| Certificate serial number | The serial number of the certificate that should currently be used by the device. This attribute is only included if "connection type" is "certificate". |
| Device Info. | A human-readable description of the device |
| Agent Information | An optional object containing information about the hardware and software the device runs on. |

$T_2$, and so on, with the last/most recent object in this particular conversation being Object k at time $T_k$). Each object in the conversation may represent or correspond to an event. Thus, in some aspects, an event may be considered to be a <time, object> pair, and a conversation is collection of such events for a particular user set.

It should be appreciated that the time interval between any two objects may differ. So, e.g., in the exemplary conversation 156 in FIG. 4A, the time interval D1 from time $T_0$ to time $T_1$ need not be the same as the time interval D2 from time $T_1$ to time $T_2$. The time intervals between events (including adjacent events) in a conversation may, e.g., fractions of a second, hours, days, weeks, months, years, etc.

An object may contain the actual data of the conversation (e.g., a text message) associated with the corresponding event, or it may contain a link or reference to the actual data or a way in which the actual data may be obtained. For the sake of this discussion, a conversation object that contains the actual conversation data is referred to as a direct object, and a conversation object that contains a link or reference to the data (or some other way to get the data) for the conversation is referred to as an indirect or reference object. A direct object contains, within the object, the information needed to render that portion of the conversation, whereas an indirect object requires additional access to obtain the information needed to render the corresponding portion of the conversation. Thus, using this terminology, an object may be a direct object or an indirect object.

As used herein, the term "render" (or "rendering") with respect to data refers to presenting those data in some manner, preferably appropriate for the data. For example, a device may render text data (data representing text) as text on a screen of the device, whereas the device may render image data (data representing an image) as an image on a screen of the display, and the device may render audio data (data representing an audio signal) as sound played through a speaker of the device (or through a speaker or driver somehow connected to the device), and a device may render video data (data representing video content) as video images on a screen of the device (or somehow connected to the device). The list of examples is not intended to limit the types of data that devices in the system can render, and the system is not limited by the manner in which content is rendered.

It should be appreciated that a particular implementation may use only direct objects, only indirect objects, or a combination thereof. It should also be appreciated that any particular implementation may comprise direct objects, indirect objects, or any combination thereof. The determination of which conversation data are treated as direct objects and which as indirect objects may be made, e.g., based on the size or kind of the data and on other factors affecting efficiency of transmission, storage, and/or access. For example, certain types of data may be treated as indirect objects because they are typically large (e.g., video or images) and/or because they require special rendering or delivery techniques (e.g., streaming).

As used herein, the term "message" refers to an object or its (direct or indirect) contents. Thus, for a direct object that includes text, the message is the text in that direct object, whereas for an indirect object that refers to an asset, the message is the asset referred to by the indirect object.

A presently preferred implementation uses a combination of direct and indirect objects, where the direct objects are used for text messages and the indirect objects are used for all other assets. In some cases, text messages may be indirect objects, depending on their size (that is, an asset may also include or comprise a text message). It should be appreciated that even though an asset may be referenced via an indirect object, that asset is considered to be contained in a conversation and may be rendered (e.g., displayed) as part of (or apart from) a conversation.

Each conversation has a unique conversation identifier (ID) that is preferably assigned by the backend 108 when a conversation between a set of users begins. (Conversation IDs and their creation/allocation are discussed in greater detail below).

A message can only belong to one conversation and should not move to another conversation. Note, however, that in some cases a conversation may become part of another (e.g., new) conversation (e.g., as its parent), in which case the messages in the conversation may be considered to be part of the new conversation.

As shown in FIG. 4B, a direct object 168 includes the actual contents 170 of the conversation (e.g., the message). A direct object 168 may also include some or all of the following attributes:

| Attribute | Description |
| --- | --- |
| Object/ message ID 172 | A unique identifier for this object (message). This unique identifier may be a Unicode string of unspecified length with no further semantics attached. The value is preferably chosen by the service upon creation of the message by a user and will never change. This object/message ID allows messages in a conversation to be individually addressable. In some implementations individual messages are not addressable, in which cases this attribute may not be provided. |
| Sequence Number 174 | A sequence number of this message. This sequence number should be unique within a conversation and may be used, e.g., for ordering, tracking the last read message, etc. |
| Creator Tag 176 | A value (e.g., a 64 bit hex encoded integer) that may be sent by the device. The value can be used, e.g., to check if the message was actually sent in cases where the response was lost. In some implementations this value may not be used and/or may only be visible to the sending device. |
| Sender 178 | The user ID of the sender of this message. |
| Origin 180 | The device ID of the device from which this message originated. |
| Conversation ID 182 | The conversation ID of the conversation to which this message belongs. |
| Received At Time 184 | The time at which the backend server received this message (preferably in Standard Time Format). |
| Type 186 | The type of this message (e.g., as a string). |

An indirect object (e.g., as shown in FIG. 4C) may have some of the same attributes as a direct object, except that instead of the actual contents 170 of the conversation, an indirect object 188 includes asset metadata 190.

Assets typically originate outside of the system 100. Preferably each asset is obtained and stored by the system 100 before (or while) being provided to users in a conversation. In this manner a conversation will be reproducible at future times, without reliance on the persistence of external content. Assets are maintained and stored by the backend 108 in assets 144 in the database(s) 110.

The asset metadata 190 may include some or all of the following:

| Attribute | Description |
| --- | --- |
| Published at time 192 | The time at which this message was published. A message is typically considered to be published once the upload starts. If an asset has not yet been uploaded, the "published at" attribute will be unset. |
| Location 194 | The canonical location of the asset data (e.g., in the form of a URI). |
| Content type 196 | The media type (e.g., MIME type) of this asset. |
| Content Length 198 | The length of this asset. This attribute, if present, may not be set until the upload is complete. |
| Visibility 200 | The visibility of this asset. In current implementations the attribute can be either "public", meaning it will be world visible, or "conversation", meaning it will only be available to members of the conversation to which it belongs. |

It will be appreciated, as discussed in greater detail below, that each device should be able to render each asset in some manner. The device may use the content type 196 to determine how the asset should be rendered. In some cases, a device may be able to determine from the location information 194 how to render the asset (e.g., the location information may have type information or other information encoded therein), or the device may determine the type of the asset after obtaining some of or the entire asset.

The conversation data 142 in the database(s) 110 on the backend 108 contains conversation metadata 202 and participant(s) list and may include some or all of the following attributes (with reference to FIG. 4D):

| Attribute | Description |
| --- | --- |
| Conversation Id. 204 | The unique identifier for this conversation. |
| Parent conversation ID 206 | The ID of the conversation from which this conversation originated, e.g. when adding a member to a multi-user conversation. This value will be present if this conversation originates from another one, and it can be used, e.g., to refer to the previous conversation at the start of the timeline of the first one. |
| Last Message Seq. 208 | The sequence number of the last message in this conversation. This will start off at zero and is incremented on every message posted to the conversation. |
| Last message time 210 | The time a message/event was last received in this conversation (preferably represented in the Standard Time Format). If there are no messages in the conversation yet, the value may be empty or missing. |
| Last modified time 212 | The last time the conversation was modified (which may correspond to the last time that the conversation metadata changed, preferably represented in the Standard Time Format). |
| Generated name 214 | A generated name for this conversation. This may be a list of the names of the participants (e.g., separated by "," or "&" as appropriate). Creation and formatting of this name is discussed in greater detail below. The name may differ for different users in the conversation. |
| Users 216 | A list of participants in this conversation, including the authenticated user, and conversation specific information about them. |

Each item on the users attribute 216 is an object containing the following attributes:

| Attribute | Description |
| --- | --- |
| User Id. 218 | The user ID of the participant. |
| Name 220 | The name of the conversation, if set. It is preferably not possible to set this for self or 1:1 conversations. As noted above, each participant user may have a different name for the same conversation. |
| Last read seq. 222 | The sequence number of the last message read by this user in this conversation. |
| Last message received before muting time 224 | A timestamp representing the last time that the user received a message before he muted the conversation. (This value may be used, e.g., for the client side to do proper sorting of the conversations.) |
| Last modified before muting time 226 | Similar to "last message received before muting time", a timestamp representing the last time that the conversation state was updated while the user was not muted |
| archived 228 | A value indicating whether or not the user has archived this conversation. The server will set this to "false" if a message is received in an archived conversation. |
| muted 230 | A value indicating whether or not the user has muted this conversation. |

Figure 4D:
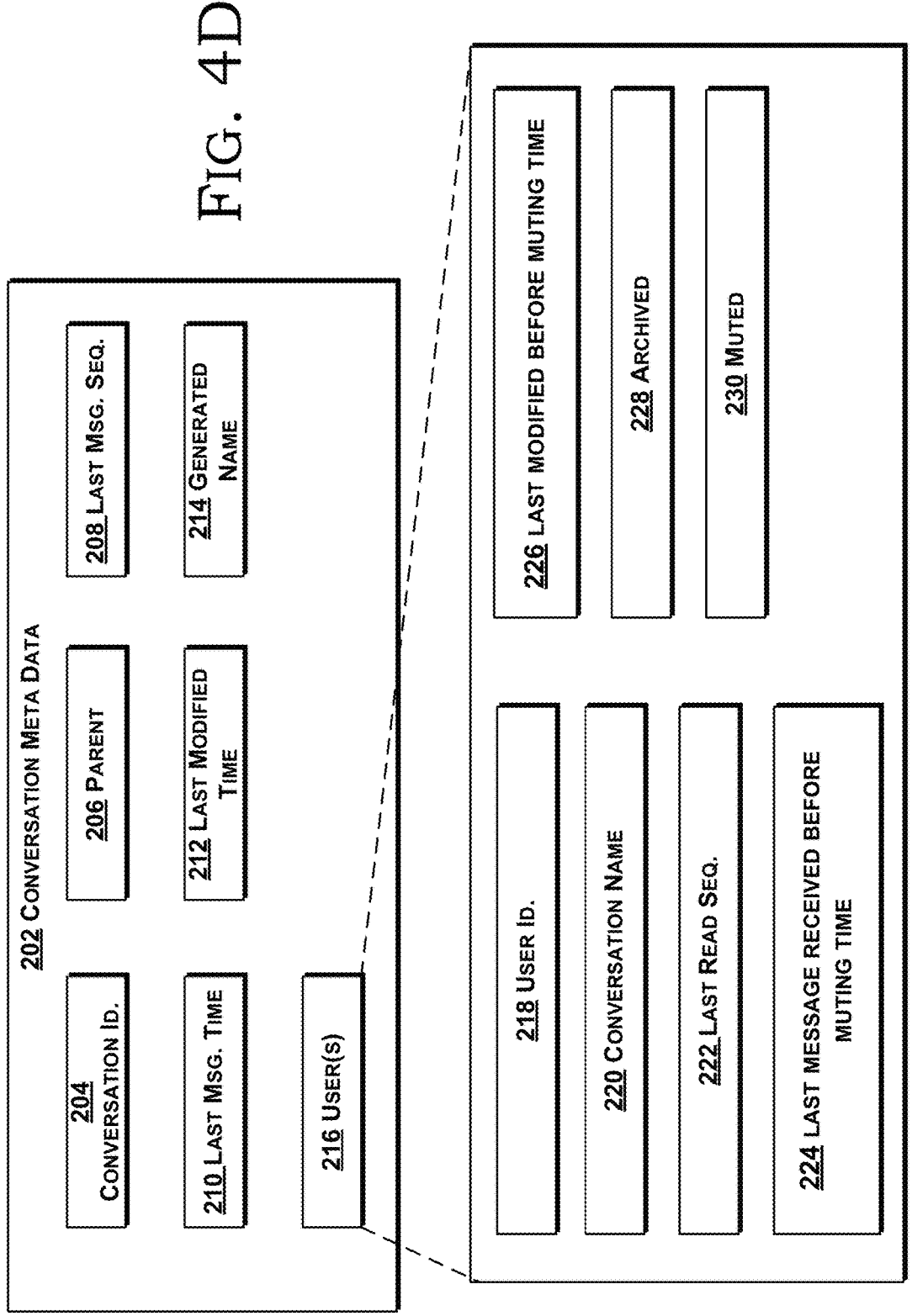
Figure 4E:
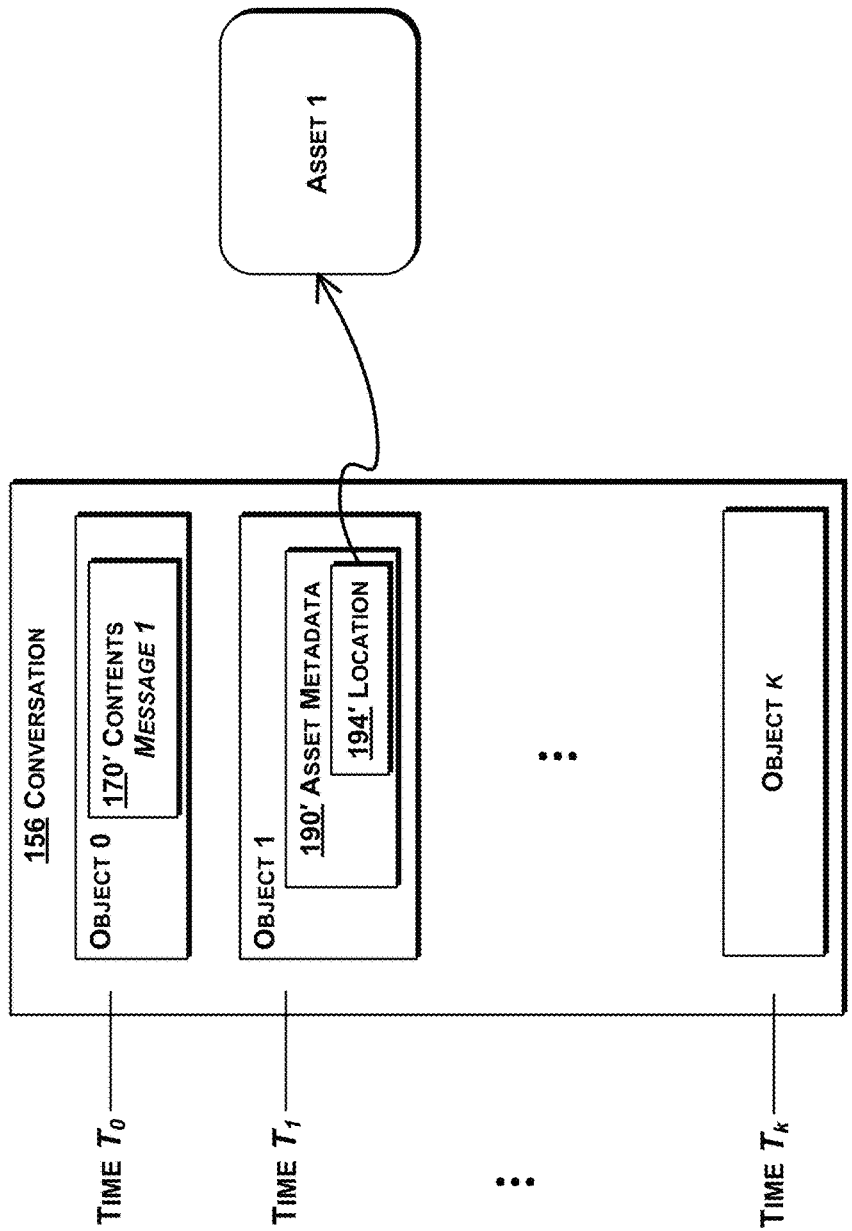

FIG. 4E shows parts of the conversation 156 of FIG. 4A in which Object 0 (the first object in the conversation) is a direct object, including contents 170' comprising the text message "Message 1". Object 1 in this conversation is an indirect object having asset metadata 190', including location information 194' that, in some manner, refers to Asset 1.

The messages in this conversation are Message 1, Asset 1, etc.

It should be appreciated that various techniques may be used to point to the location of an asset. For example, the location data 194 may be a URL or a URI. Those of ordinary skill in the art will appreciate and understand, upon reading this description, that different and/or other ways of pointing to or referring to assets may be used, and that the system is not limited by the manner or location(s) in which asset locations are specified. It should further be appreciated that a particular system may use more than one technique to refer to assets. The different techniques may depend, e.g., on the type or size of an asset.

Figure 4F:
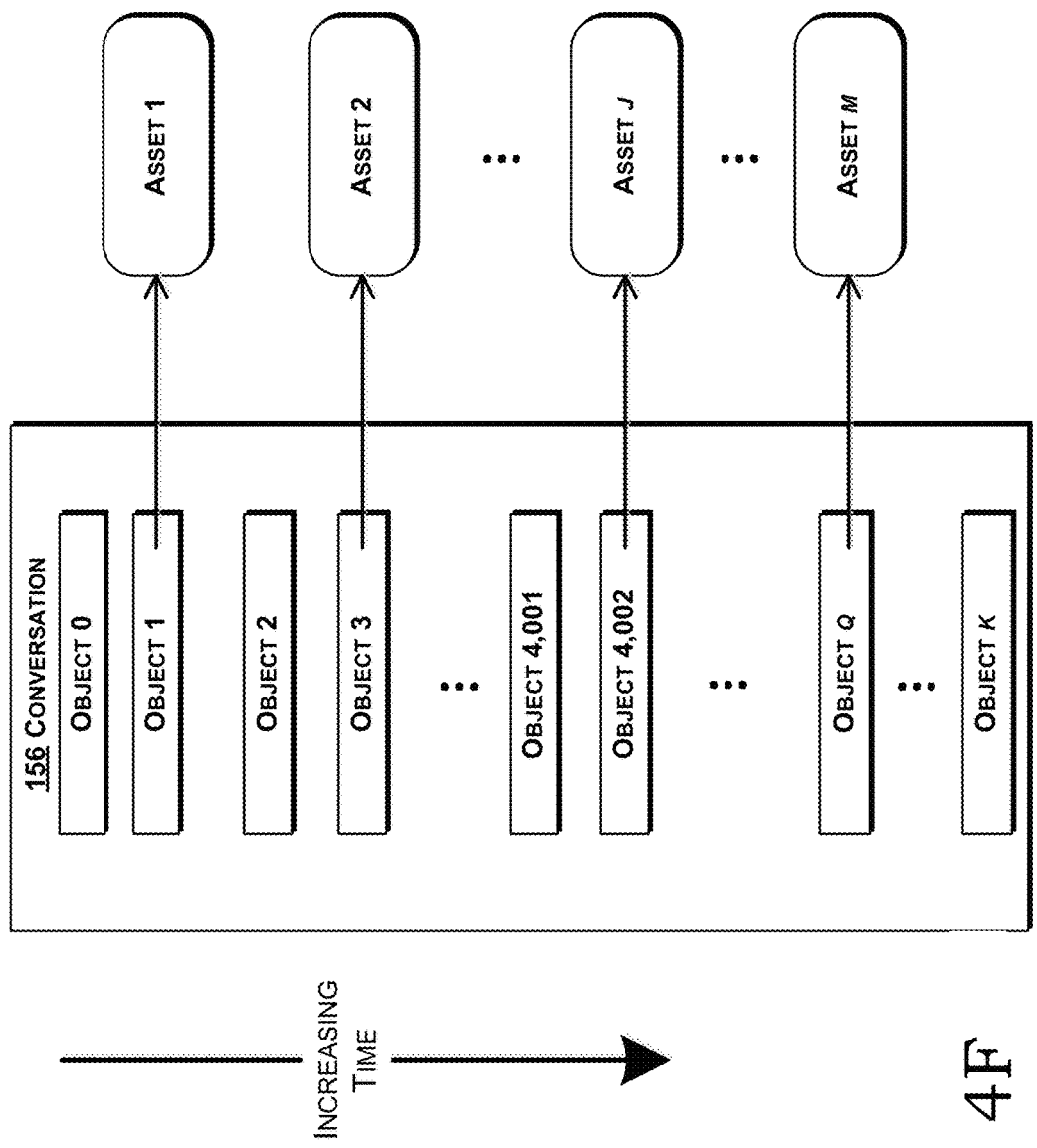

FIG. 4F shows other parts of the exemplary conversation 156 of FIGS. 4A and 4E. As shown in the conversation 156 in FIG. 4F, Object 1 is an indirect object referring to Asset 1, Object 3 is an indirect object referring to Asset 2, Object 4,002 is an indirect object referring to Asset j, and Object Q is an indirect object referring to Asset m.

It should be appreciated that the assets in a conversation (i.e., the assets referenced by indirect objects in the conversation) may be of different types (e.g., audio, pictures, video, files, etc.), and that the assets may not all be of the same size, or stored in the same place or in the same way. Thus, for example, with reference to the exemplary conversation in FIG. 4F, Asset 1 may be a photograph, Asset 2 may be a video, Asset j may be a PDF file, and so on.

Those of ordinary skill in the art will appreciate and understand, upon reading this description, that the phrase "Asset 2 may be a video" means that "Asset 2 may refer to content that represents a video." In general, referring to an asset as being of some type (e.g., audio, picture, video, file, text, etc.), means that the asset comprises data representing something of that type. So that, e.g., if an asset is an audio asset, this means that the asset comprises data representing audio content, if an asset is an image, this means that the asset comprises data representing video content, and so on.

It should be appreciated that all assets are essentially data, possibly with associated metadata, and that the type of an asset will affect what the data in an asset represent and, possibly, how those data are to be rendered. For example, when an asset is a video, the asset comprises data (and possibly metadata) representing video content in some form. When appropriately rendered, the video asset data will comprise a video (video images, possibly including audio).

The system may store multiple copies of the same asset.

As used herein, a user participating in a conversation is said to be conversing or engaging in that conversation. The term "converse" or "conversing" includes, without any limitation, adding any kind of content or object to the conversation. It should be appreciated that the terms "converse" and "conversing" include active and passive participation (e.g., viewing or reading a conversation). It should further be appreciated that the system is not limited by the type of objects in a conversation or by the manner in which such objects are included in or rendered within a conversation.

It should be appreciated that a conversation may also include conversation metadata (e.g., data about when events occur within the conversation). Conversation metadata may be treated as conversation objects, with their rendering (if at all) being dependent, e.g., on system policies. For example, when a user Jane leaves a conversation, that event may be a conversation object with the text "Jane has left the conversation." In this example, a device may render the object as text on a display. Some other metadata (e.g., system status information) may be stored as part of the conversation but not rendered by any device.

Identifying Conversations

Within the system 100, a conversation may have one or more participants and is uniquely identified (e.g., using a conversation ID 204 in FIG. 4D) by or, at least, as a function of its participants. In some presently preferred implementations a conversation may be uniquely identified by a function of a set of one or more user IDs, and consists of the interaction/communication between/among the users in the set. A special case of a conversation is defined by a set containing a single user ID—a so-called "self-conversation." A conversation preferably consists of the entire interaction/communication between/among the user(s) in the set that define the conversation, beginning at time of the first interaction/communication between the user(s) in the set. Thus, e.g., an interaction/communication between two users A and B defines a first conversation, whereas another interaction/communication between users A, B, and C defines a second and distinct conversation. In other words, the conversation "AB" between users A and B is not the same as the conversation "ABC" between users A, B, and C. A conversation may be between an arbitrary number of users. For the sake of this discussion, the user set that define a particular conversation may be referred to as the member(s) of that conversation, so that a conversation in the system is said to be uniquely defined, at least in part, by its member(s).

Note that the set of users in a conversation is preferably unordered, so that a conversation between users A and B may be considered to be the same as the conversation between users B and A.

Users can be added to and/or removed from a conversation, and the manner of doing so is described in greater detail below.

As noted above, when a conversation between a set of users begins, that conversation is given a unique conversation identifier (conversation ID, e.g., 204 in FIG. 4D). The conversation ID may be generated, e.g., based on the user ID(s) of the user(s) in the set. For example, the conversation ID may be a message digest or hash (e.g., MD5 or SHA) of the concatenated sorted user ID(s) in the set of participants. It should be appreciated the different and/or other functions may be used to generate conversation IDs. The function should be defined to ensure uniqueness of conversation identifiers within the system, so that every two distinct sets of users will have a distinct conversation ID. Since user IDs are unique, a conversation ID formed by concatenating an ordered list of the user IDs in a set will always produce a unique value. However, given that an arbitrary number of users may be in any conversation, this concatenation approach may not be optimal, and another, more compact conversation ID may need to be determined. It should be understood that the conversation ID is used internally by the system 100 to uniquely identify each conversation. Each conversation may also have one or more names (e.g., conversation name 220, FIG. 4D) that can be presented to users (via the user interfaces) to help them identify and distinguish conversations. Such naming schemes are described in greater detail below.

Figure 5A:
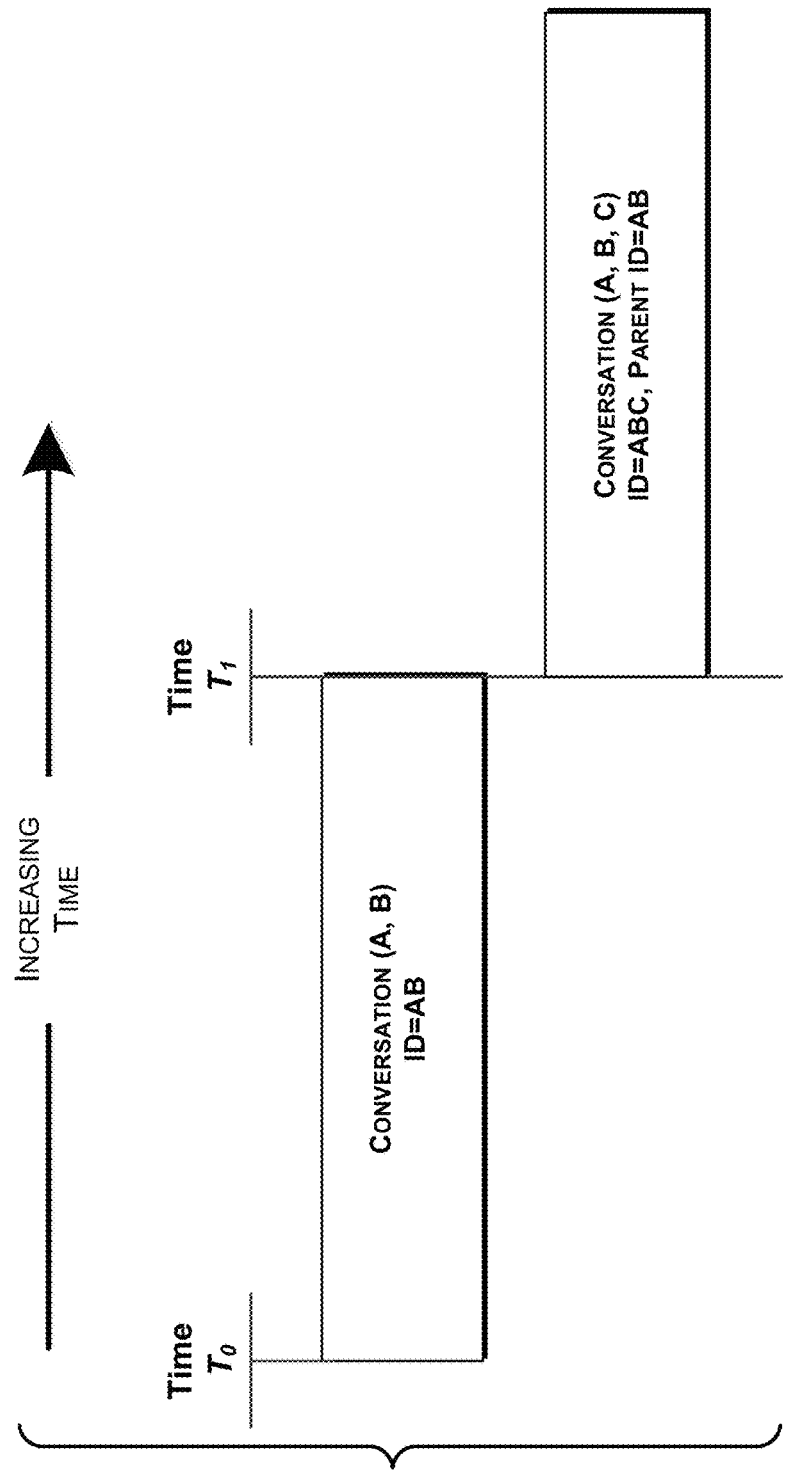

Users may be added to (or removed from) a conversation. A change in the membership of a conversation may cause a new conversation ID to be generated, based on the new membership. In order to facilitate access to the entire interaction/communication history, for each conversation the system may also maintain information about conversation(s) from which a current conversation originated (e.g., a parent conversation). For example, as shown in FIG. 5A, a first conversation starts at time $T_0$ between user A and user B. That first conversation is given conversation ID "AB". At time $T_1$ user C is added to the conversation between user A and user B. The new conversation is given conversation ID "ABC", and its parent ID is set to refer to conversation "AB". With reference again to FIG. 4D, the conversation metadata 202 for the conversation with users A and B would have conversation ID 204 set to "AB" and parent 206 unset (or null). The user(s) 216 would be set to "{A, B}". For user A, the conversation name 220 may be set to "B", whereas for user B, the conversation name 220 may be set to "A". When user C is added to the conversation (at time $T_1$), the conversation ID for the new conversation may be set to "ABC", the parent 206 for the new conversation may be set to "AB" (previously it was null or unset), and the users 216 may be set to "{A, B, C}". The conversation name 220 for conversation "ABC" for user A may be set to "B and C", conversation name 220 for user B to "A and C", and conversation name 220 for user C to "A and B".

It should be appreciated that these settings are provided only by way of example, and are not intended to limit the scope of the system in any way.

In some embodiments there may only be (or the system may only allow) one conversation for any set of users. That is, in some embodiments, a set of users defines (and may only define) one and only one conversation. For example, in such embodiments, there can only be one conversation between users A and B. Some other embodiments may allow for multiple conversations with the same set of participants. In such embodiments a set of users may define more than one conversation, so, e.g., in such embodiments there may be multiple conversations between users A and B. Those of ordinary skill in the art will realize and appreciate, upon reading this description, that when the system allows multiple conversations between identical participants, the internal naming of conversations (the conversation ID) will be a function of more than just the user IDs of its participants. An exemplary function to generate a unique conversation ID may use time of day as an input along with the user IDs.

Techniques and policies for merging and splitting conversations between and among users and for adding and removing users from conversations are described in greater detail below.

As described above, the backend 108 (backend application(s) 112) maintains conversations (as identified by the user IDs of the users having the conversation—i.e., the participants) in a conversation database 142 in database(s) 110 (FIG. 2B). Thus, the conversation data 142 in database(s) 110 in the backend 108 may be maintained indexed, e.g., using conversation IDs.

Each user 102 in a conversation may interact with that conversation using any device 104 associated with that user (as identified by the user ID), and changes to a conversation are preferably reflected in each present device 104 associated with all users present in the conversation, with the version of the conversation in the conversation database 152 being considered to be the true version of the conversation.

As used herein, a device is "present" if it is online and accessing (or has access to and/or is accessible from) the backend 108. Whether a particular device is present or not present in the system is sometimes referred to as the device's "presence" in the system. A device's presence may be determined in a number of ways. For example, in some case the system may maintain persistent connections with some devices, and, in those cases, the existence of a persistent connection with a device may be used to determine that the device is present. Those of ordinary skill in the art will appreciate and understand that different and/or other techniques may be used to determine whether a device's presence, and that the system is not limited by the manner in which presence is determined.

Figure 5B:
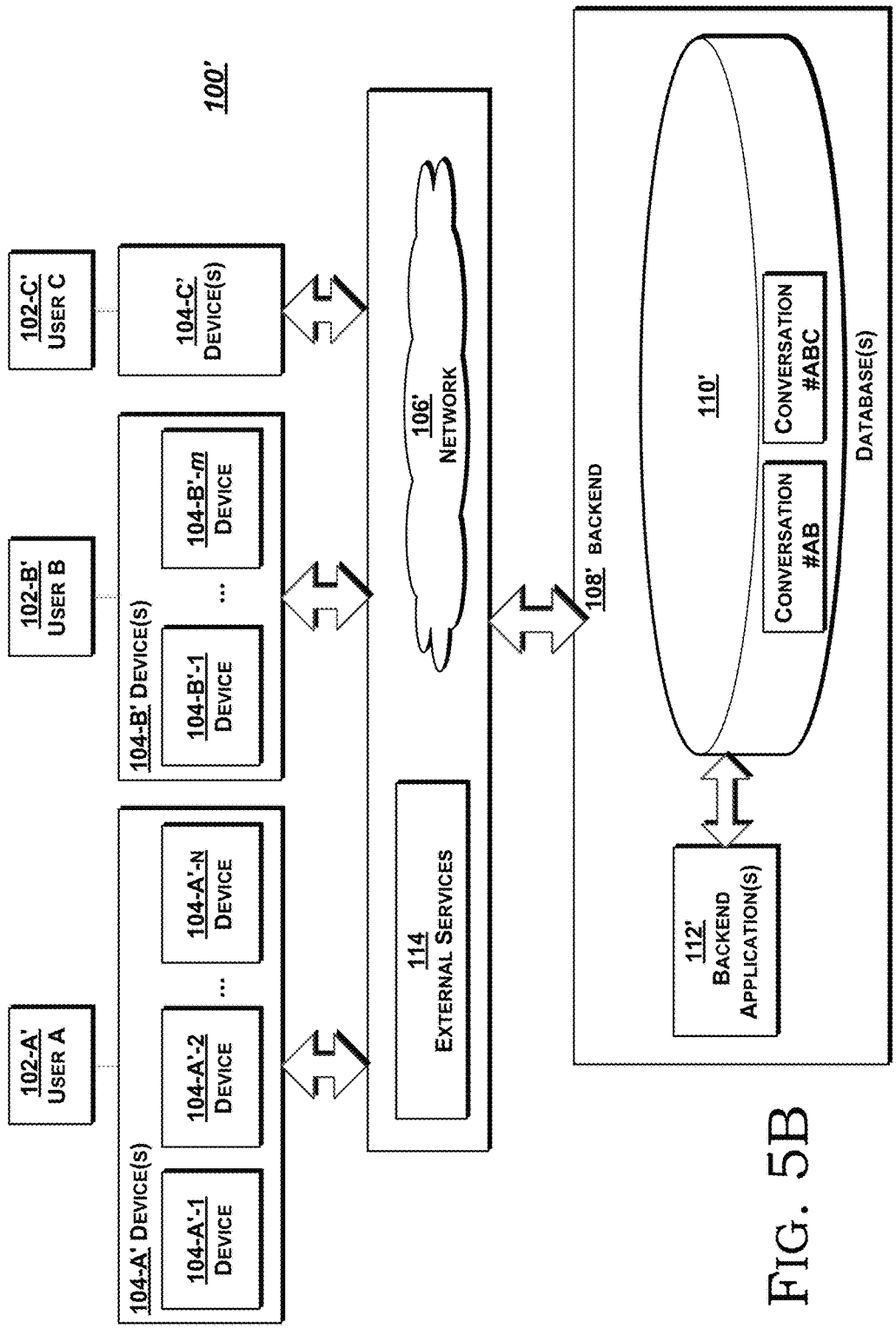

By way of example, with reference to FIGS. 5A-5B, in the example described above, user A 102-A' may have n devices 104-A' (device 104-A'-1, device 104-A'-2, . . . device 104-A'-n) associated therewith; user B 102-B' may have in devices 104-B' (device 104-A'-1, device 104-A'-2, device 104-A'-n) associated therewith; and user C 102-C' may have devices 104-C' associated therewith. At any time, some or all of user A's devices may be online (or offline). Similarly for user B's devices 104-B' and user C's devices 104-C'. User A's devices that are offline (whether turned on or off) are considered to be not present, whereas user A's devices that are online may be considered to be present.

When users A 102-A' and user B 102-B' converse in the conversation AB, the messages of that conversation and any other changes to that conversation are preferably reflected in each present device 104-A', 104-B' associated with users A and B. The backend 108' maintains conversation AB in the database(s) 110', and each present device of each participant in that conversation (users A and B) preferably has a view of the conversation AB consistent with the version in the backend database(s) 110'.

When user C joins the conversation (as conversation ABC), the messages of that conversation and any other changes to that conversation are preferably reflected in each present device 104-A', 104-B', and 104-C associated with users A, B, and C. The backend 108' maintains conversation ABC in the database(s) 110', and each present device of each participant in that conversation (users A, B, and C) preferably has a view of the conversation ABC consistent with the version in the backend database(s) 110'.

Users may interact with and view conversations on their devices 104 via user interfaces (UIs) 128 on the respective devices. A user interface 128 provides a view or rendering of an aspect or portion of a conversation (possibly the entire conversation). A view of a conversation within a time period is a view of the objects in that conversation in that time period.

While each present device of each user in a conversation should have the same conversation data, it should be appreciated that the UI of each device 104 of each user associated with a particular conversation may be viewing a different portion of the conversation.

Figure 6A:
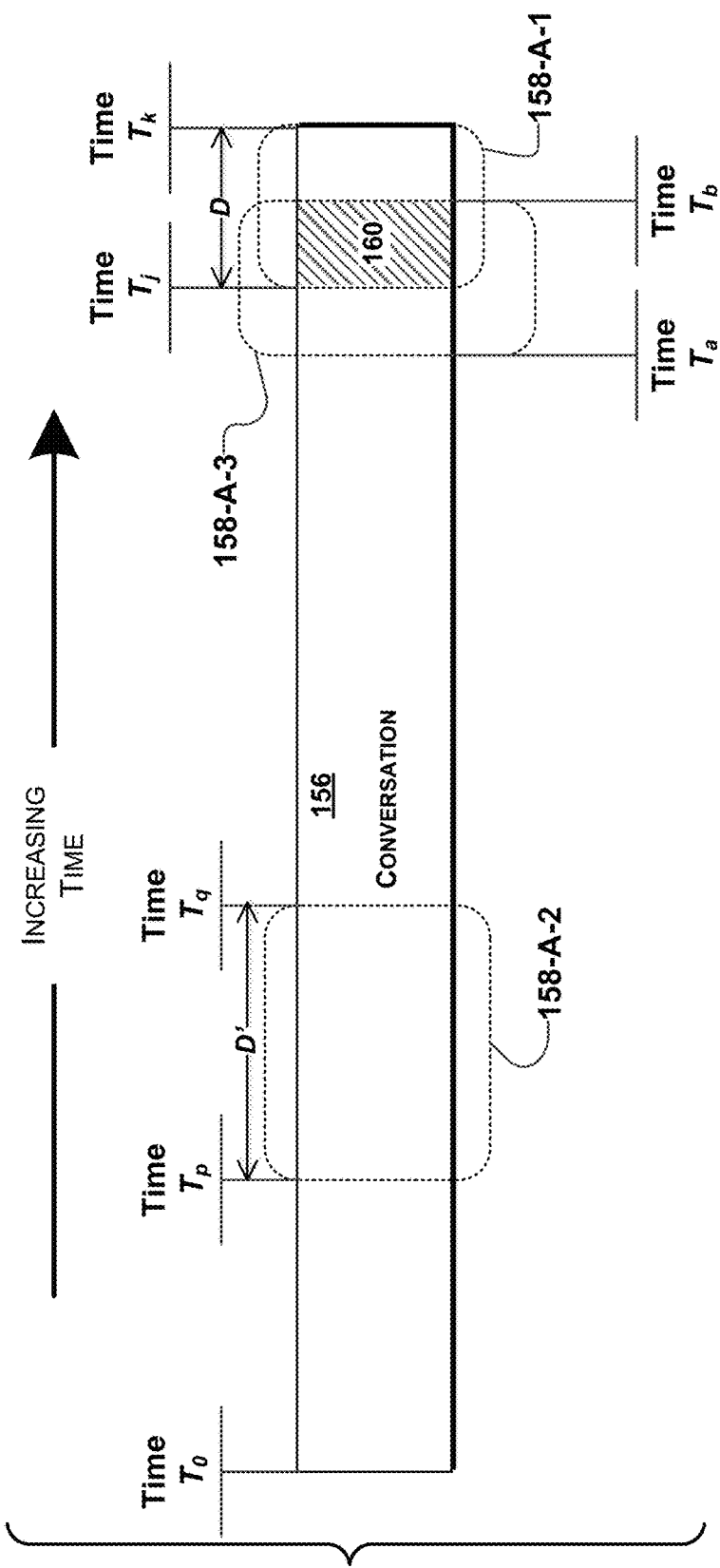

For example, FIG. 6A shows a conversation 156 between users 102-A and 102-B (of FIG. 1). Conversation 156 may correspond, e.g., to Conversation #AB in the conversation data 142 in the database(s) 110 of backend 108. The conversation between the two users (102-A and 102-B) started at time $T_0$ (shown on the left side of the drawing), and the most recent event in this conversation occurred at time $T_k$ (on the right side of the drawing). (With reference, e.g., to the conversation 156 shown in FIG. 4E, the event at time $T_0$ corresponds to object 0, and the event at time $T_k$ corresponds to the object k.)

Each of user 102-A's present devices (104-A) may have a view, via its user interface 128, of some or all of the conversation 156 (i.e., of some or all of the objects in conversation 156). For example, as shown in FIG. 6A, device 104-A-1 may have the view 158-A-1 of the conversation from time $T_j$ to time $T_k$ (the most recent event). That is, device 104-A-1 has a view of the events and/or messages in the conversation between times $T_j$ and $T_k$. At the same time, device 104-A-2 may have the view 158-A-2 of the conversation 156 from time $T_p$ to time $T_q$ (that is, device 104-A-2 has a view of the events and/or messages in the conversation between times $T_p$ and $T_q$).

In the drawings, in order to aid in the discussion herein, the view of the conversation is sometimes depicted as a rounded rectangle with dotted or dashed outlines. Those of ordinary skill in the art will realize and understand, upon reading this description, that a view of a conversation may, in some aspects, be considered to be a sliding window of arbitrary duration over that conversation and at an arbitrary location or time in the conversation. Thus, e.g., the view 158-A-1 in FIG. 6A may be considered to be a window of duration $D=T_k-T_j$ starting at time $T_j$ in the conversation 156, whereas the view 158-A-2 may be considered to be a window of duration $D'=T_q-T_p$ and starting at time $T_p$ in the same conversation, where there is no requirement that D be equal to D' or that $T_p=T_j$.

Although depicted in the drawing as a continuous rectangle, those of ordinary skill in the art will realize and appreciate, upon reading this description, that conversation 156 in FIG. 6A consists of a time ordered sequence of events (as shown, e.g., in FIG. 4A), and that some time periods within this conversation (i.e., within $T_0$ to $T_k$) may not contain any events.

Note that the views of the conversation 156 may cover non-overlapping time periods (as in the example just described), and that the time periods need not be of the same duration or contain the same number of events. That is, each device that has a view of a conversation may have a different view, starting at a different and arbitrary time within the conversation and having an arbitrary duration. However, when two or more devices do have overlapping views of a conversation, the overlapping portions of those views are preferably the same (or contain the same information, however rendered). That is, when two or more devices have views of the same time period of a particular conversation, those views are preferably of the same events/messages, however rendered.

As noted above, while it should be appreciated that while the two devices should have a consistent view of any overlapping data, those of ordinary skill in the art will realize and appreciate, upon reading this description, that actual rendering of that view on different devices may differ. In other words, while the data (objects) corresponding to a view may be identical for two devices, each of those devices may render or present those data differently to the user. For example, the format of the data (e.g., video data or audio data or text data or image data) presented may differ for different devices, even though they are rendering the same data.

Thus, e.g., as shown in FIG. 6A, device 104-A-3 has a view 158-A-3 of the conversation 156 from time $T_a$ to time $T_b$ that overlaps at least partially with the view 158-A-1 of that conversation. The overlapping portion of the views 158-A-1 and 158-A-3 (from time $T_j$ to time $T_b$—depicted in the drawing as the shaded portion 160 of the conversation 156) is preferably the same for both devices 104-A-1 and 104-A-3.

While the example in FIG. 6A shows two partially overlapping views of the conversation 146 for a particular user 102-A, those of ordinary skill in the art will realize and appreciate, upon reading this description, that fully overlapping views of the same conversation data will be the same (although they may be presented differently, e.g., due to device differences, rendering differences, etc.). Furthermore, although the example in FIG. 6A only shows the views of one participant (user 102-A), overlapping views of different participant users in the same conversation will preferably also be the same.

Figure 6B:
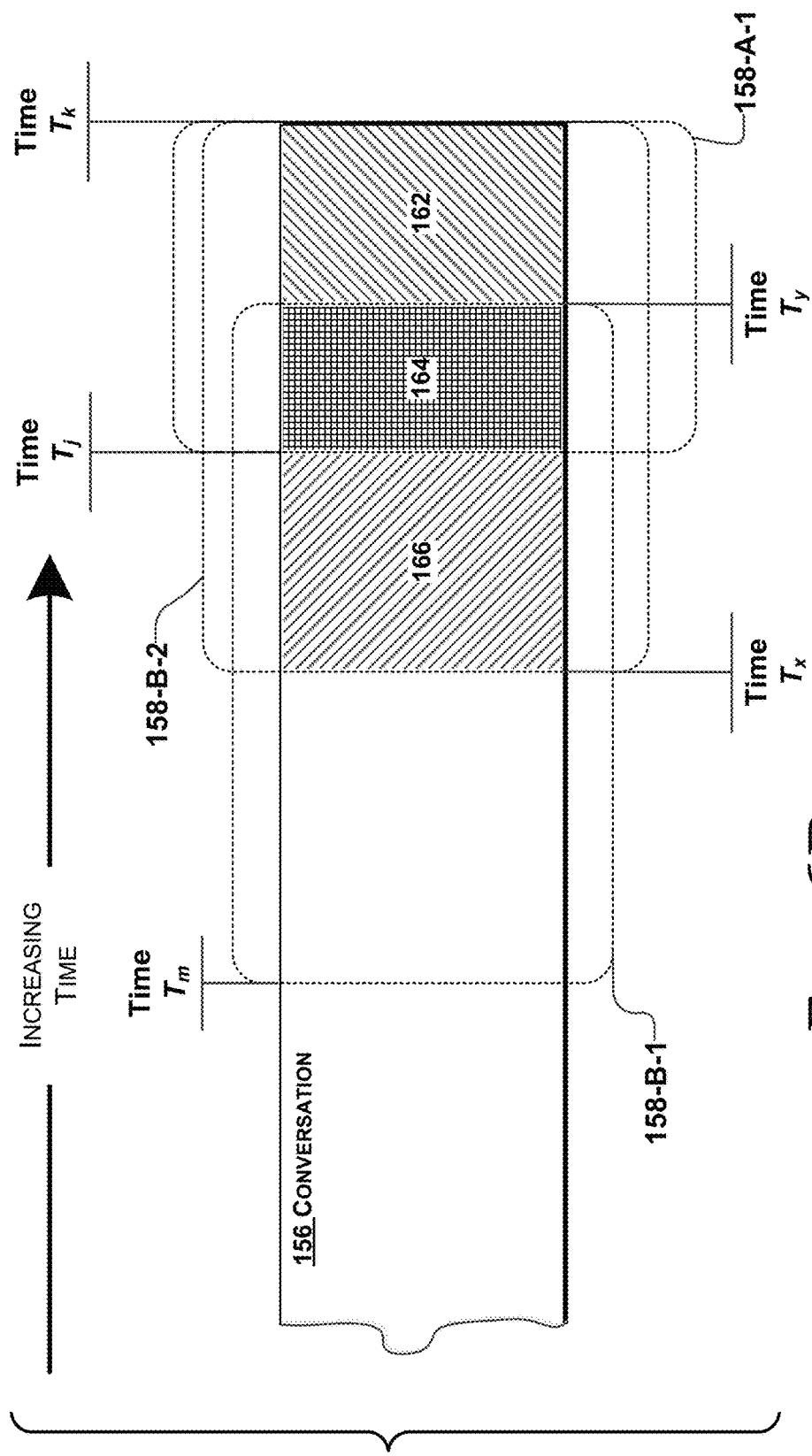

FIG. 6B shows a portion of the conversation 156 of FIG. 6A. As shown in FIG. 6B, device 104-A-1 associated with user 102-A has a view 158-A-1 (via its user interface) of the conversation 156 from time $T_j$ to time $T_k$. At the same time, device 104-B-2, associated with user 102-B, has a view 158-B-2 (via its user interface) of the conversation 156 from time $T_j$ to time $T_k$. And at the same time, device 104-B-1, associated with user 102-B, has a view 158-B-1 (via its user interface) of conversation 156 from time $T_x$ to time $T_y$. In this example, time $T_j < T_y < T_k$, and so view 158-B-1 overlaps with view 158-A-1 (in the shaded region denoted 164 in the drawing). As can also be seen from the drawing, view 158-B-1 overlaps with view 158-B-2 in the region from time $T_x$ to time $T_y$ (shaded portions 164, 166); and the three views 158-A-1, 158-B-1, and 158-B-2 all overlap from time $T_j$ to time $T_y$ (shaded portion 164). As the conversations are consistent on all devices, the overlapping views show the same information (regardless of how formatted or rendered). Those of ordinary skill in the art will realize and appreciate, upon reading this description, that the same information may be presented in different manners on different devices, especially on devices of different types. For example, the region 154, which is common to all three views, may be presented or rendered differently on a device that is a mobile phone from a device that is running a web-based application using a laptop computer.

Exemplary Conversation Scenarios and Processing

This section discusses and describes aspects of conversations and exemplary techniques and policies for merging and splitting conversations between and among users and for adding and removing users from conversations.

As used herein, the term "mechanism" refers to any device(s), process(es), service(s), or combination thereof. A mechanism may be implemented in hardware, software, firmware, using a special-purpose device, or any combination thereof. A mechanism may be integrated into a single device or it may be distributed over multiple devices. The various components of a mechanism may be co-located or distributed. The mechanism may be formed from other mechanisms. In general, as used herein, the term "mechanism" may thus be considered to be shorthand for the term device(s) and/or process(es) and/or service(s).

The system 100 may provide users with one or more mechanisms to do one or more of the following:

1. create a two-user (one-to-one) conversation;
2. create an n-user conversation (n>2)—an n-to-n or group conversation;
3. add a user to a conversation;
4. engage in a conversation (converse);
5. leave a conversation (an n-user conversation, n>2—i.e., a group conversation);
6. block or unblock another user;
7. hide or unhide a conversation;
8. mute or unmute a conversation;
9. delete a conversation; and
10. mute or unmute the entire system.

It should be appreciated that not every implementation of the system will provide all of these features, and not every feature need be provided to all users of a particular system. In addition, a system 100 may provide additional and/or different features.

Blocking a User

A user may block another user in the system. The user will not receive any messages or calls from a user they have blocked in any one-to-one conversations or any new or existing group conversations created by the blocked user.

Preferably, blocking effects are not applied in the case of a blocked user being involved in a group conversation not created by the blocked. However, in some implementations, depending on policy, the system may block all messages from a blocked user, regardless of which user created a conversation. In such implementations, the system may prevent creation of a group conversation that includes a participant blocked by one of the other participants. Preferably, a user cannot be added to a group conversation by a user they have blocked.

Group conversations created by a blocked user do not appear in a user's conversation list or in search results.

Unblocking a User

A user may unblock a user they previously blocked. Once a user is unblocked, effects of having been blocked or removed.

One-to-One (1:1, Two-User) Conversations

A one-to-one conversation involves exactly two participants. In preferred embodiments, only one instance of a two-user conversation can exist for any two participants, although other embodiments may permit multiple two-user conversations between the same pair of users.

The process of starting a new one-to-one conversation between two users is described here. For the sake of the examples discussed here, it is assumed that each of the participants is already a user of the system, and so each participant has a unique user ID within the system (as discussed above). In addition, for these examples, it is assumed that each participant has at least one device and that the participant's device is registered with the system, and that each such device has a device identifier (Device ID) that is unique to the corresponding user.

A User's Self-Conversation

The system 100 preferably forms and maintains a special one-to-one conversation between each user and himself/herself. This "self" conversation starts when the user joins the system, and preferably there is only one conversation between each user and himself/herself. Thus, e.g., when user $U_1$ initially joins the system 100 a conversation $U_1$-$U_1$ is started. A user cannot add any other users to his/her self-conversation. In most other respects, a self-conversation is like other conversations. Those of ordinary skill in the art will realize and understand, upon reading this description, that certain operations and functions do not make sense and/or should not be performed in a self-conversation. For example, a user cannot block him/herself; a user cannot leave or delete their self-conversation. Furthermore, a user cannot add other users to their self-conversation, and no new conversation should link back to the self-conversation (i.e., a self-conversation should not be a parent conversation).

Starting a One-to-One Conversation

Assume that user $U_1$ wants to have a one-to-one (1:1) conversation with user $U_2$. Assume that user $U_1$ has devices $D_1$ and $D_2$, and that user $U_2$ has devices $D_3$ and $D_4$. For the sake of this discussion, the user ID of user UI will be referred to as "UI", and the device ID of device will be referred to as "$D_j$".

The system preferably provides a way for users to locate other users, e.g., by browsing a directory or users or searching by name or some other criteria. With reference to the flowchart in FIG. 7A, using one of his devices (e.g., device $D_1$), user $U_1$ finds user $U_2$ in the system (at S702). This act may use a user interface (UI) that is running on user $U_1$'s device $D_1$. (An exemplary UI is described in greater detail below.)

Recall that, as used herein, a device is said to be "present" if the device is online and accessing (or has access to and/or is accessible from) the backend 108. It should be appreciated that user $U_2$ need not have a device present in the system when user $U_1$ tries to find user $U_2$ (at S702) or at any time during the process described with reference to FIG. 7A to start a conversation that includes user $U_2$.

There may be reasons why two users cannot converse within the system (for example, in some cases the system may allow users to block other users). Accordingly, in some cases the system may check (at S704) whether user $U_1$ can converse with user $U_2$. If users $U_1$ and $U_2$ cannot converse (as determined at S704), then user $U_1$ may be notified in some manner (at S706) and the process terminates. In preferred implementations, if a particular user blocks another user, then the blocked user may not be able to even see or find the particular user in the system (in step S702).

If users $U_1$ and $U_2$ can converse (as determined at S704), then, the system determines whether $U_1$ and $U_2$ are already in a one-to-one conversation (at S708). The system may, e.g., determine the unique conversation identifier (conversation ID) for a conversation between $U_1$ and $U_2$ and then determine whether such a conversation already exists in the system. In a system which allows multiple distinct conversations between the same participants (including between pairs of users), the system may maintain a list of all conversations between sets of participants, where the list may be indexed, e.g., by a function of the user IDs of the participants. Recall that the conversation ID may be determined in a number of ways, e.g., using a message digest or hash (e.g., MD5 or SHA) of the concatenated sorted user IDs.

If no conversation already exists between users $U_1$ and $U_2$ (as determined at S708), then the system starts a new conversation between them (at S710), assigning that new conversation a conversation ID. For a new conversation, the system (backend application(s) 112 creates a new conversation record in conversations data 142 in the database(s) 110, setting the conversation ID 204 in the conversation metadata 202 to the conversation ID for users $U_1$ and $U_2$. The users 216 of this new conversation are users $U_1$ and $U_2$. If a one-to-one conversation already existed between $U_1$ and $U_2$, then there would already be such a record in the database(s) 110.

If a conversation does already exists between users $U_1$ and $U_2$ (as determined at S708), then, depending on system policy (e.g., whether the system permits multiple conversations between the same pair of users), the system may use an existing conversation or allow the user to create a new conversation. Accordingly, the system determines (at S709) whether to use an existing conversation (at S712) or to create a new one (at S710, as described above).

If the system only permits one two-person conversation between any pair of users, and there is an existing such conversation (as determined at S708), then the determination (at S709) will be to use the existing conversation (at S712). On the other hand, if multiple conversations are permitted between the same pair of users, and there are already one or more existing conversations between users $U_1$ and $U_2$ (as determined at S708), then user $U_1$ may converse with user $U_2$ using an existing conversation (at S709, S712) or start a new conversation between them (at S710).

If the user(s) do not chose to start a new conversation (at S709, S710), and there is more than one conversation between users $U_1$ and $U_2$, then one of those conversations is selected to be used. The determination of which of those conversations to use may be made by the system, the users, or both. In one exemplary implementation, the system may present user $U_1$ (the user initiating the conversation) with a list of ongoing conversations between $U_1$ and $U_2$, and allow that user to select which conversation to use.

In preferred implementations that permit multiple conversations between the same pair of users, the user initiating the conversation gets to choose whether to create a new conversation (at S709) or whether to use an existing conversation (at S712). Further, in such preferred implementations, the user initiating the conversation gets to choose which existing conversation to use (at S712). It should be appreciated that this is an implementation option, and that the system may provide for different and/or other approaches to decide (at S709) and/or select (at S712).

Group Conversations

A group conversation (also referred to herein as an "n:n" conversation) involves more than two participants. Participants can be active or past participants. A past participant is one who has joined but then left the n:n conversation. And n:n conversation can be created from scratch by selecting multiple participants or by adding one or more participants to a 1:1 conversation. Preferably, adding participants to an n:n conversation does not create a new one, but updates an existing conversation with the new participants.

Starting a Group Conversation

The process of starting a group conversation is similar to that of starting a one-to-one conversation except that certain checks must be made for all users in the group. For the purposes of this description, a "group" of users includes more than 2 users. For this case, assume that user $U_1$ wants to have a conversation with users $U_2, \ldots U_k$ (the group for this conversation will be $U_1, U_2, \ldots U_k$).

With reference to the flowchart in FIG. 7B, using one of his devices (e.g., D1), user $U_1$ finds the other group users $(U_2 \ldots U_k)$ in the system (at S714). Here again, the system preferably provides a way for users to find (e.g., search for) other users, e.g., using a user interface (UI) that is running on the users' devices. The UI preferably provides a way for a user to select multiple other users to join a conversation.

As with one-to-one conversations, it should be appreciated that users $U_2 \ldots U_k$ need not have devices present in the system when user $U_1$ tries to find them (at S714) or at any time during the process described with reference to FIG. 7B to start a conversation that includes users $U_2 \ldots U_k$.

Having found the other group users $(U_2 \ldots U_k)$, the system then determines (at S716) whether all of the users in the group can converse with each other. Those of ordinary skill in the art will realize and appreciate, upon reading this description, that different policy and other considerations come in to play in the case of blocked users, and a system may choose to implement one or more different solutions to deal with blocked users.

For example, user $U_2$ may have blocked user $U_1$, in which case the system may not permit any conversation that includes both of them. As another example, user $U_2$ may have blocked user $U_3$, and even though neither of them initiated the conversation, the system may not permit a group conversation that includes them. This prevents a situation where user $U_3$ tries to bypass a block from user $U_2$ by creating another user ID—user $U_1$—and then using that other ID to converse with user $U_2$ in a group conversation.

As described above, in a preferred implementation, a specific user may not create a group conversation that includes a participant blocked by that specific user. System policy may determine whether to create a group conversation of some members of a group in the case where one or more of the invited members have blocked the creator. For example, suppose that user A tries to create a group conversation with users B, C, D, and E. Suppose further, that user D has blocked user A. As a matter of policy in preferred implementations, user A cannot add user D to any group conversation. In this case, system policy may determine whether user A's attempts to create the group conversation with users B, C, D, and E will fail completely or create a group conversation with users B, C, and E. In addition, system policy may determine whether a user not blocked by user D can then add user D to this group conversation. In some implementations, users may be provided with an option to join conversations that include users they have blocked.

Using whatever policy it has in place, if the system determines (at S716) that the group of users $U_1, U_2 \ldots U_k$ cannot all converse with each other in a group conversation, then the system notifies user $U_1$ (at S718) and then terminates.

On the other hand, if the system determines (at S716) that the users $U_1, U_2 \ldots U_k$ can all converse with each other in a group conversation, then the system determines (at S720) whether such a conversation already exists in the system.

If there is not already a conversation with the group of users $U_1, U_2 \ldots U_k$ (as determined at S720), then the system starts a new conversation between them (at S724), assigning that new conversation a conversation ID based on the user IDs of the participants. For a new conversation, the system (backend application(s) 112) creates a new conversation record in conversations data 142 in the database(s) 110, setting the conversation ID 204 in the conversation metadata 202 to the conversation ID for users $U_1, U_2 \ldots U_k$. The users 216 of this new conversation are users $U_1, U_2 \ldots U_k$. If a conversation already existed between/for users $U_1, U_2 \ldots U_k$, then there would already be such a record in the database(s) 110.

If a conversation already exists between users $U_1$ and $U_2 \ldots U_k$ (as determined at S720), then continued processing depends on whether the system permits multiple conversations between identical sets of users. Accordingly, the system determines (at S721) whether to use an(the) existing conversation (at S724) or whether to start a new one (at S722, as described above).

As with the one-to-one conversations described above, if the system allows more than one conversation between the same set of users then one of these conversations may be used (e.g., selected by the initiating user).

Figure 7A:
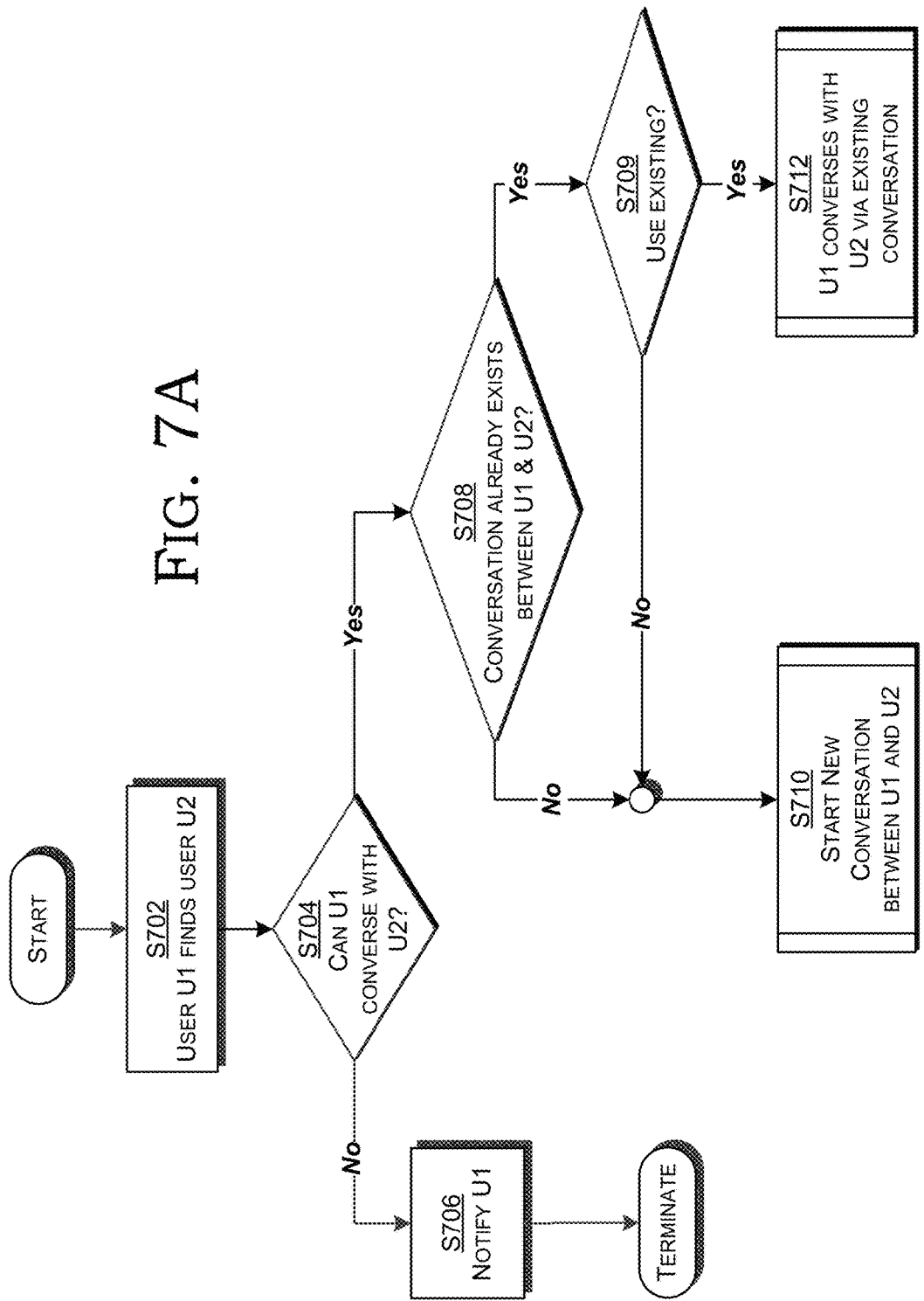

As will be apparent to those of ordinary skill in the art from the above and the flowcharts in FIGS. 7A-7B, the processing of a one-to-one conversation (FIG. 7A) is essentially a special case of the processing of a group conversation (FIG. 7B), and a particular system or implementation may implement these using the same processing mechanisms.

Preferably the system (via a UI) can display a list of ongoing/existing conversations, so that a user can select from that list to continue an existing conversation. To each user (e.g., user $U_1$), the name of an existing or ongoing one-to-one conversation with another user (e.g., user $U_2$) is preferably just the name of other user. In this manner, the UI can present a user with a list of user names of other users in order to name or list ongoing conversations. The name of an existing or ongoing multi-party conversation may be a listing of some/all of the participants. The actual manner of listing the names may depend on the number of names, the UI, and other factors. In some implementations the system may allow users to name conversations based on their participants or using some other naming scheme.

Adding a User to an Existing Conversation

In some embodiments, a user may be added to an existing conversation. For this example, with reference to FIG. 7C, assume that there is an existing conversation $C_1$ between users $U_1, \ldots U_k$, and that at least one of the participants (e.g., user $U_1$) wants to add a user who is not already in the conversation (e.g., user $U_q$) to the conversation (at S724). User $U_1$ may select user $U_q$ in some manner, e.g., by selecting user $U_q$ from a list of users presented in a user interface. The process of finding/selecting user $U_q$ may be the same as that used to find a user (at S702 in FIG. 7A) or to find users (at S714 in FIG. 7B).

The system may check (at S726) to determine whether user $U_q$ can join the conversation $C_1$. For example, the system may check (at S726) whether user $U_q$ may converse with each user already in the conversation $C_1$. Based on the determination (at S726), if there is some reason that $C_1$ cannot join the conversation, then the user $U_1$ is notified (at S728). If user $U_q$ may join the conversation $C_1$, the system may then determine (at S730) whether there is already a conversation with users $U_1 \ldots U_k$ and $U_q$. If no existing conversation is found then a new conversation $C_2$ is started (at S732) with users $U_1 \ldots U_k$ and $U_q$. Conversation $C_2$ may be linked back to conversation $C_1$ (e.g., using the parent field 206, FIG. 4D). This may allow users in conversation $C_2$ to treat the conversation $C_2$ as starting at the start of conversation $C_1$. (As should be appreciated, conversation $C_1$ may, itself, have a parent, and so on.)

If one or more existing conversations already exist with users $U_1 \ldots U_k$ and $U_q$ (as determined at S730), then the system may switch (at S734) to one of the existing conversations or it may allow the user to start a new conversation with the group $U_1 \ldots U_k$, and $U_q$. In any case, the existing conversation will link back to $C_1$.

In some cases the system may determine which existing conversation to use based on whether the user being added (e.g., user $U_q$) was previously part of a conversation with the other users $U_1 \ldots U_k$. In that case the system preferably uses the previous version of their conversation. For example, if there is a conversation C1 with users A, B, C, and D, and then D leaves that conversation, leaving conversation C2 (with users A, B, and C). Subsequently user D is invited back into the conversation C2. Even if there are other conversations with users A, B, C, and D in the system, preferably the system uses conversation C1.

As with the case of starting a new group conversation, the choice of whether or not to use an existing conversation (at S731) may be based on whether or not the system permits multiple conversations with identical sets of users. If no such conversations are permitted then there can only be one conversation with the group $U_1 \ldots U_k$, and $U_q$, and the decision (at S731) will always be to use that existing conversation.

Those of ordinary skill in the art will realize and appreciate, upon reading this description, that multiple conversations may be so linked, as parties are added to a conversation.

Those of ordinary skill in the art will realize and understand, upon reading this description, that aspects of adding a user $U_q$ to an existing conversation with group $U_1 \ldots U_k$ are similar to forming a conversation with the group $U_1 \ldots U_k, U_q$. However, if $U_q$ cannot be added to the existing conversation $C_1$ then conversation $C_1$ can continue to exist, and if $U_q$ is added to a conversation (to form a new conversation $C_2$), then conversation $C_1$ effectively becomes inactive and merges with new conversation $C_2$.

As with formation of one-to-one and group conversations, it should be appreciated that users $U_2 \ldots U_k$ and $U_q$ need not have devices present in the system when user $U_1$ tries to add user $U_q$ to the conversation or at any time during the process described with reference to FIG. 7C to add user $U_q$ to a conversation that already includes users $U_2 \ldots U_k$.

Figure 7C:
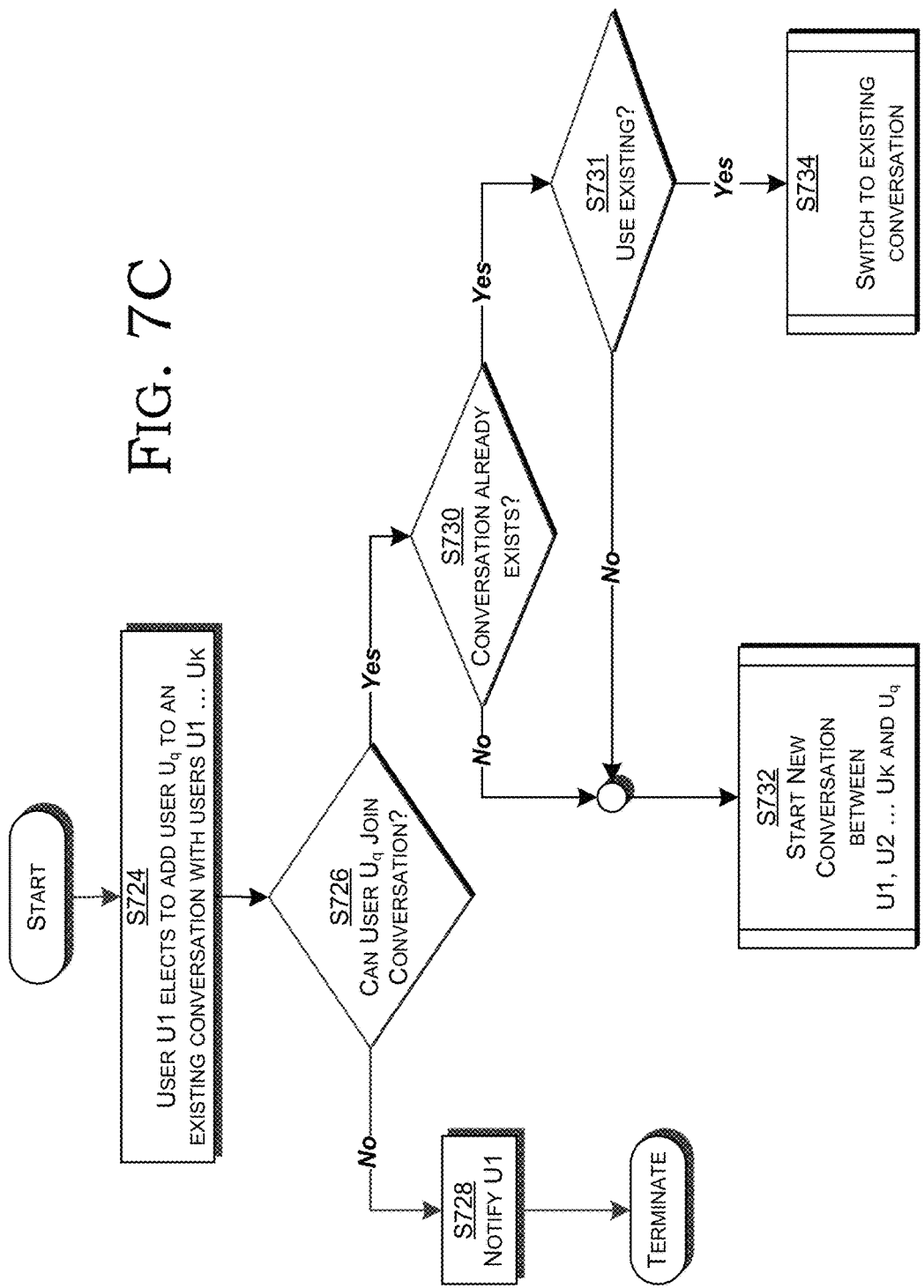

Multiple users can be added to an existing conversation by repeating the process described here and shown in FIG. 7C for each of the users.

Removing a User from a Conversation

A user may be removed from an existing conversation. In preferred implementations a user can chose to leave a conversation, effectively removing him/herself from the conversation. By leaving a conversation, the user removes herself and changes status from being an active participant to being a past (or inactive) participant.

As used herein, the term "active participant" with respect to a particular user and a particular conversation means that that particular user is a member of that particular conversation. The term "active participant" is not meant to imply that the user actually take part contributions in any way to the conversation.

Preferably a past participant does not receive messages from any conversation she has left. Similarly, a past participant cannot send messages to any conversation she has left. In order for a possible participant to send or receive messages from a conversation she has left, she needs to be added back into that conversation. As will be described below with reference to the user interface, users are presented with list of the conversations in which they are currently participating. When a user leaves a conversation, that conversation is no longer presented in that list. However, in preferred implementations, conversations from which a user has removed herself (and in which the user is therefore not active) may appear in a list of hidden conversations and may show up in search results. It should be appreciated that if a user becomes an active participant in a conversation from which she was previously removed, that conversation will again show up in the user's conversation list. If the number of active participants in a group conversation decreases to two or fewer, the conversation remains as a group conversation, given that there are still tossed participants involved.

Figure 7D:
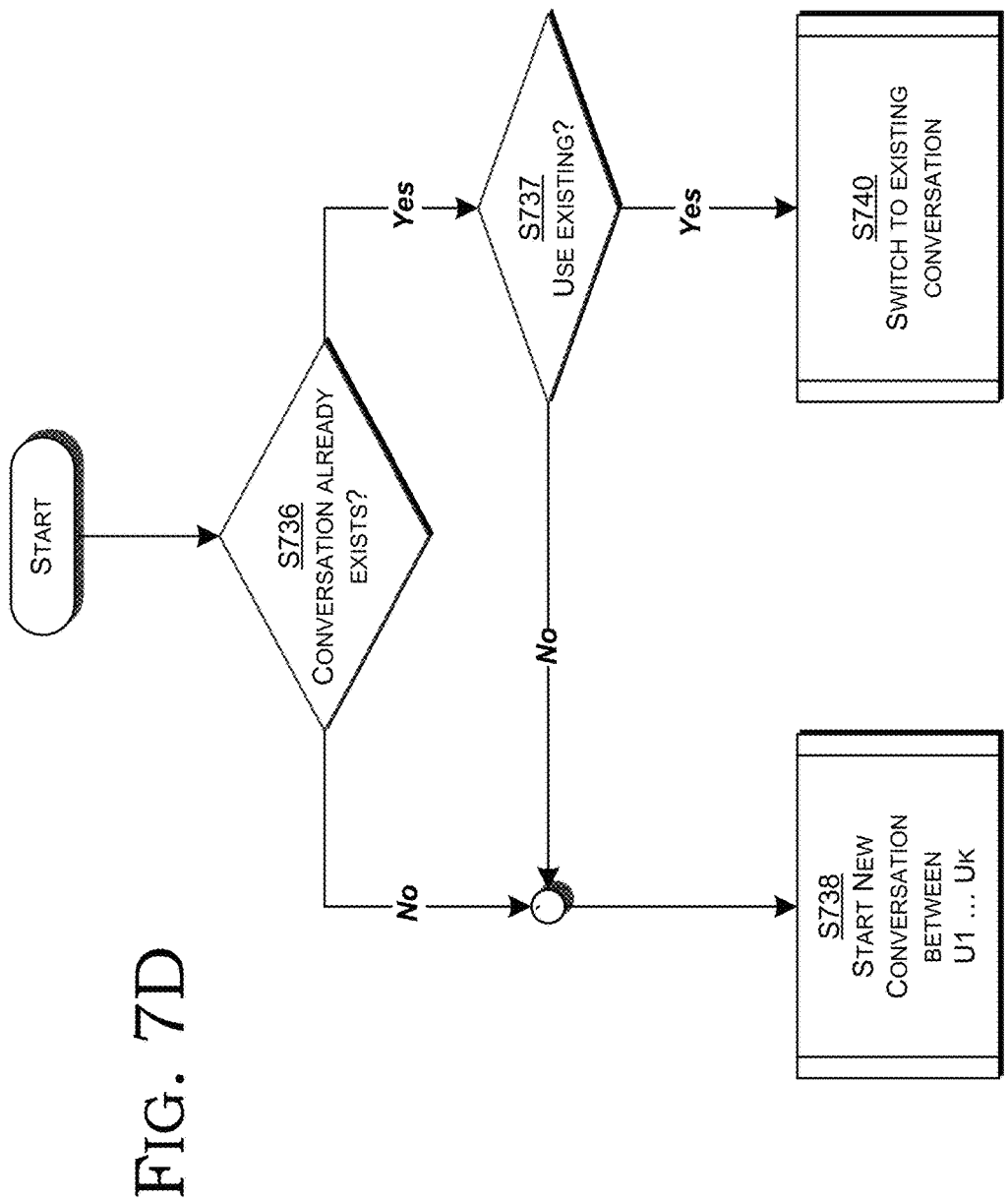

For this example, with reference to FIG. 7D, assume that there is an existing group conversation $C_1$ between users $U_1, \ldots U_j$, and $U_k$, and that user $U_k$ is to be removed. If there are only two users in the group then nothing need be done.

First the system determines (at S736) whether there is already a conversation with only users $U_1 \ldots$ (the remaining users in conversation $C_1$ after removal of user $U_k$). If no such conversation already exists then (at S738) a new conversation $C_2$ is started with members $U_1 \ldots U_j$. Conversation $C_2$ may be linked back to conversation $C_1$.

If one or more conversations already exist with only users $U_1 \ldots U_j$ then one of those may be selected (at S740), or a new conversation may be started (at S738). In some cases formation of a new conversation may require agreement of remaining users ($U_1 \ldots U_j$). In some embodiments, if there is an existing conversation that was a parent of conversation $C_1$ then that conversation may preferably be used as conversation $C_2$.

If the system does not allow multiple conversations with identical sets of users then the decision to use the existing conversation (at S737) will be positive ("yes"), and the system will switch (at S740) to the existing conversation.

Rejoining a Group Conversation

Preferably a user cannot rejoin a conversation that she has left by sending a message herself (or making a call) to the conversation. In preferred implementations, a current participant of a conversation can add another user to the group conversation. Like any participant who joins a group conversation, the rejoining user is preferably able to see the history of the conversation including those parts of the conversation that occurred while she was not an active participant.

Deleting a Conversation

In some implementations, a user can delete a conversation of which that user has been or is a member. Various policy decisions must be made when a user tries to delete a conversation. These decisions may include:

1. Which objects to delete (e.g., only the user's or all);
2. Whether the conversation is to be deleted on the client side only or on the server side;
3. What to do if the user tries to rejoin the conversation.

When a user chooses to delete a conversation, preferably that user is removed from the conversation (as described above) and at least that user's contribution to the conversation is deleted (or made inaccessible to the remaining conversation members). This may be achieved, e.g., by leaving all objects in the conversation, but by removing (or in some way obfuscating) the content from the objects that were created by or added to the conversation by the departing user. For example, for direct objects, the contents (or message) may be set to null or marked in some way as private. Similarly, for direct objects, the asset metadata may be marked as private or removed. It should be appreciated that removing the data from the objects may mean that they cannot later be restored, whereas marking them as private or obfuscating the data in some way means that the conversation can be restored if needed (e.g., if the user tries to un-delete or rejoin the conversation).

When a user deletes a two-user, one-to-one conversation, the conversation effectively ends, as there is only one user remaining. The remaining single user cannot contribute further to or participate further in the conversation, but may, in some implementations, be able to view at least their side of the conversation.

When a user deletes a group (n-to-n, n>2) conversation, that user effectively leaves the conversation, but the conversation does not end. The remaining members may contribute further to and participate further in surviving conversation.

Those of ordinary skill in the art will realize and understand, upon reading this description, that different and/or other approaches may be used to delete a conversation.

EXAMPLES

The following examples reflect various scenarios with respect to conversations.

Figure 7E:
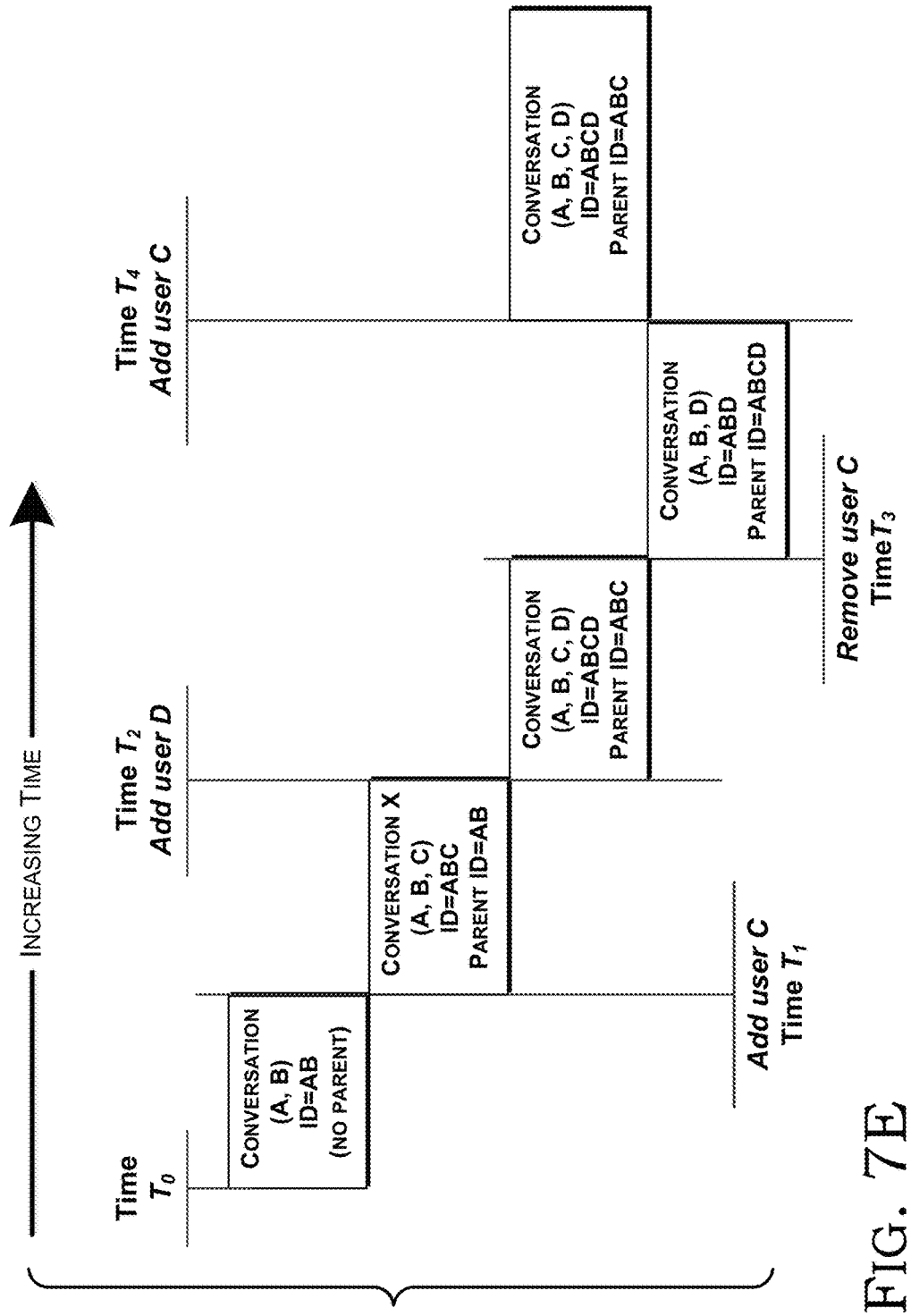

Example 1 (FIG. 7E)

With reference to the example shown in FIG. 7E, users A and B are in a one-to-one conversation (started at time $T_0$). At time $T_1$ users A and B create a group conversation X (ID=ABC) by adding user C. At a later time $T_2$ user C adds user D to group conversation X (ID=ABCD). Still later (at time $T_3$), user C leaves conversation X (ID=ABD). After a while (at time $T_4$) user A adds user C back to conversation X.

Example 2 (FIG. 7F)

With reference to the example shown in FIG. 7F, users A and B are in a one-to-one conversation (ID=AB). Separately, users A and C are in a one-to-one conversation (ID=AC). Users A and B create a group conversation X (ID=ABC, at time $T_1$) by adding user C to conversation AB. Later, at time $T_2$, user A adds user B to the conversation (ID=AC). The user A is informed that a conversation involving A, B and C (conversation X) already exists and is asked to open it or create a new one. The user decides to open the existing group conversation X.

Figure 7G:
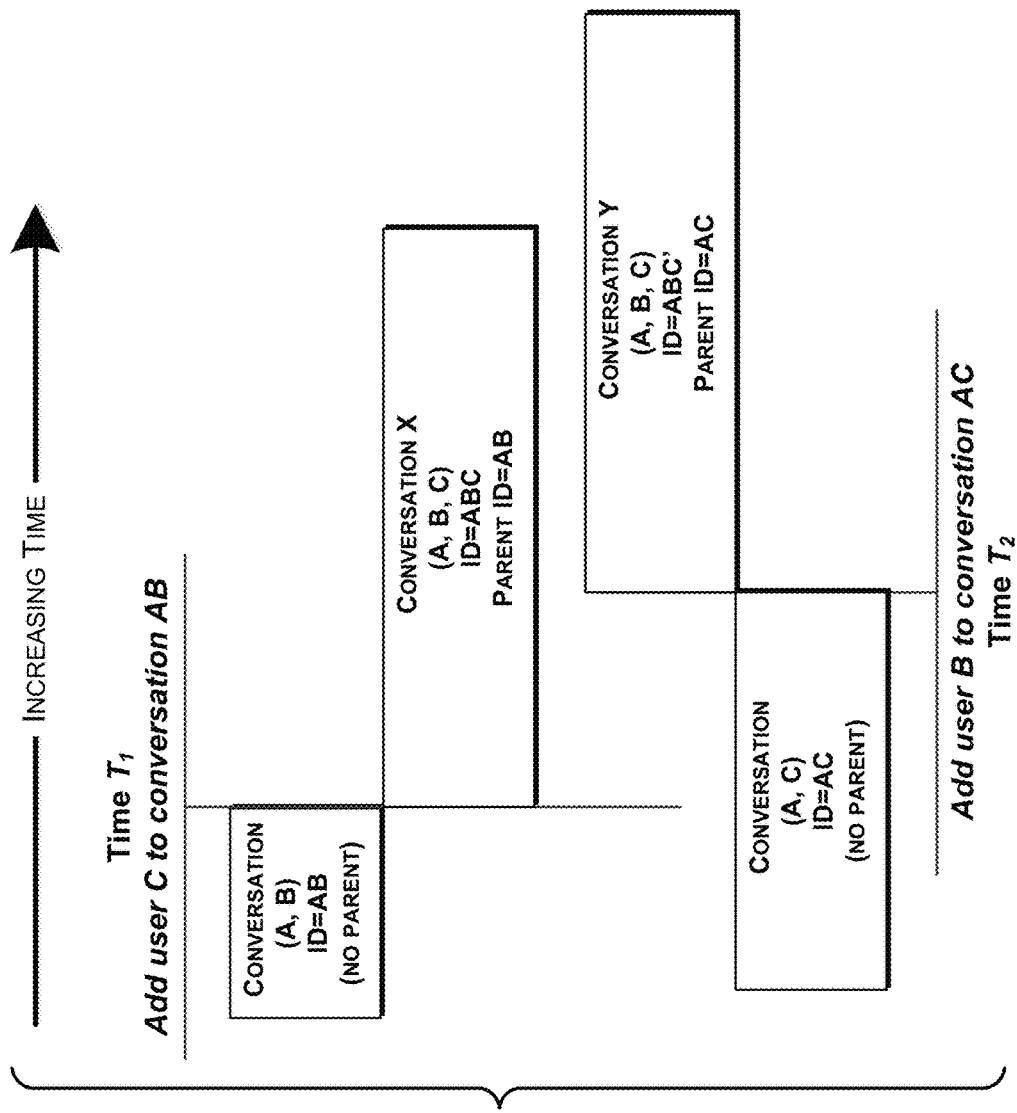

Example 3 (FIG. 7G)

With reference to the example shown in FIG. 7G, users A and B are in a one-to-one conversation (ID=AB). Separately, users A and C are in a one-to-one conversation (ID=AC). At time $T_1$ users A and B (in conversation ID=AB) create a group conversation X by adding user C (ID=ABC). Later, at time $T_2$, user A adds user B to the conversation (ID=AC). The user A is informed that a conversation involving A, B and C already exists (conversation X) and is asked to open it or create a new one. The user A decides to create a new group conversation Y (ID=ABC').

Figure 7H:
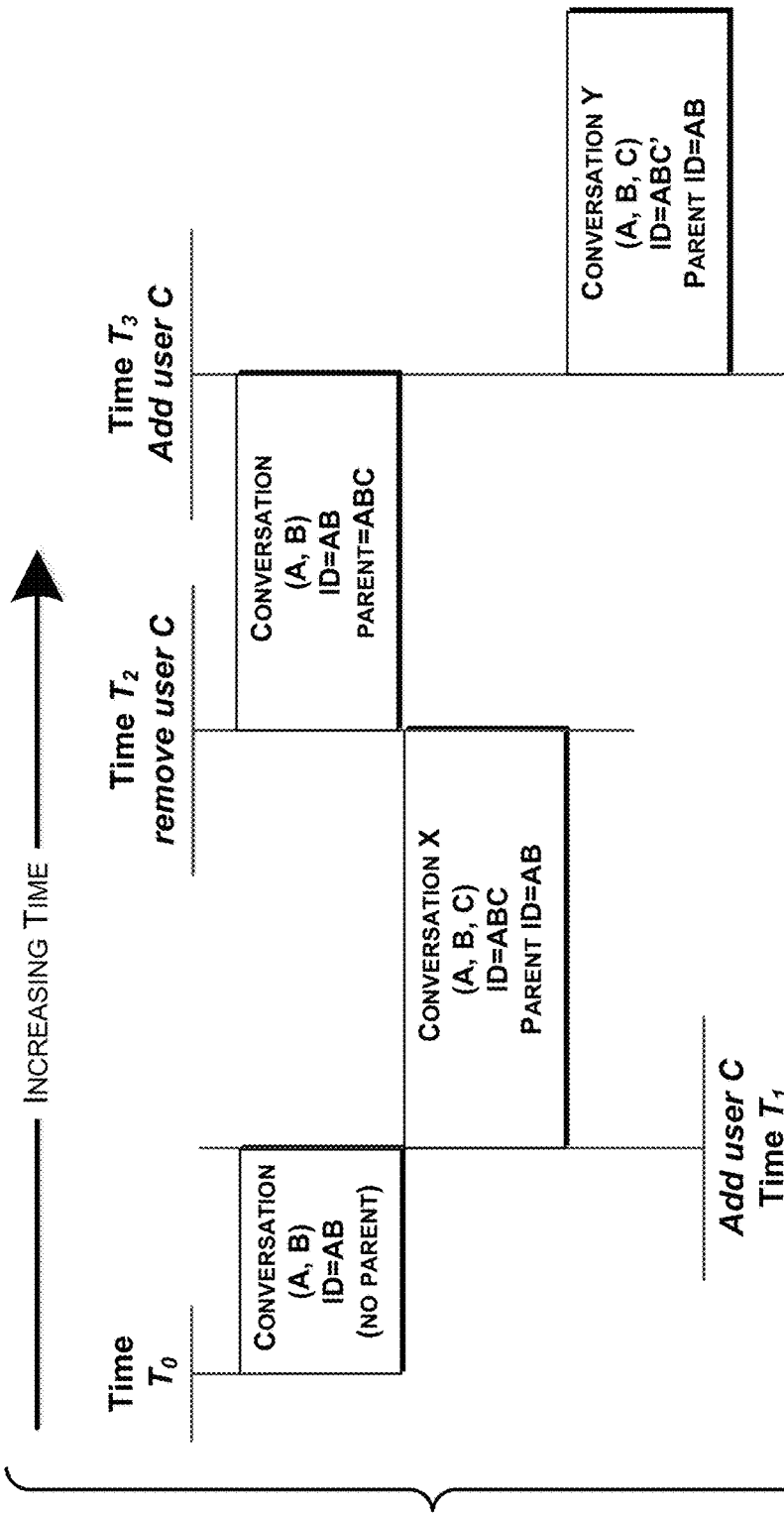

Example 4 (FIG. 7H)

With reference to the example shown in FIG. 7H, users A and B are in a one-to-one conversation (ID=AB) and create a group conversation X (ID=ABC) by adding user C (at time $T_1$). After a while (at time $T_2$), user C leaves conversation X. Later (at time $T_3$), while conversing with user B, user A adds user C again. A new conversation Y (ID=ABC') is created. (Note: in this example, since C left conversation X, it is not identified as an existing ABC conversation).

Example 5 (FIG. 7I)

With reference to the example shown in FIG. 7I, users A and B are in a one-to-one conversation (started at time $T_0$) and create a group conversation X (ID=ABC, at time $T_1$) by adding user C. Later (at time $T_2$) user C adds user D to conversation X. While conversation X is ongoing and user A keeps the conversation with user B, (at time $T_3$) user A adds user C, and a new group conversation Y is created (ID=ABC'). From conversation Y, user A adds user D. Because there is an ongoing conversation X with ABCD, the user is asked to open it or to add user D to conversation Y. In this example, the user decides to switch to the existing conversation.

Exemplary Implementation

Figure 8A:
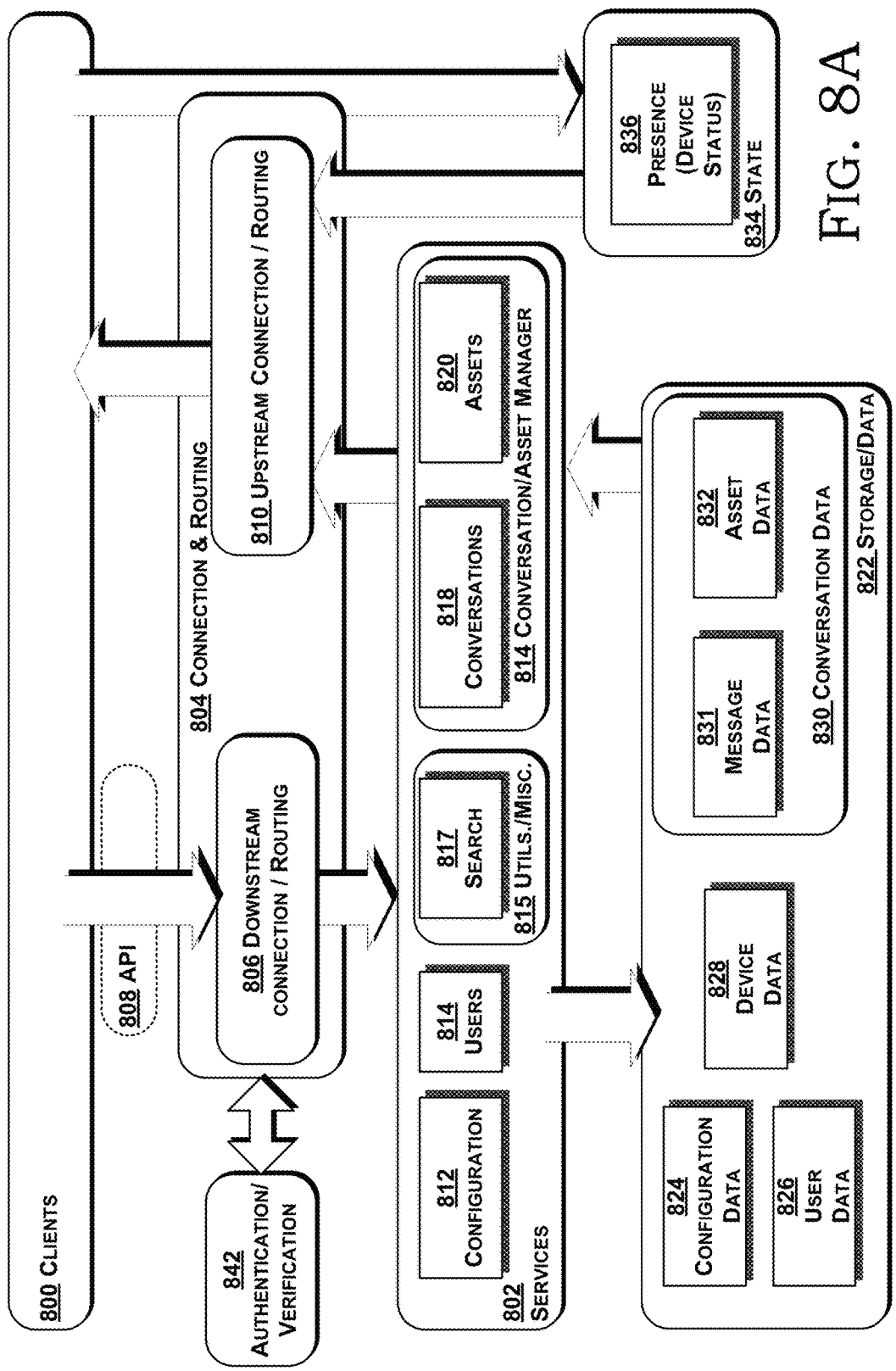
FIGS. 8A-8E depict aspects of an exemplary system architecture in accordance with an embodiment.

The architecture of an exemplary implementation of system 100 is described here. FIG. 8A, which depicts a logical view of an exemplary architecture of system 100. The architecture is described here in terms of various logical components or divisions, and in terms of data flow. As will be appreciated by those of ordinary skill in the art, upon reading this description, different and/or other organizations and structures are possible and are contemplated herein. It should be appreciated that the logical structure shown in the drawings is used as an aid in this description, and that the system 100 is not limited by the logical structure used here to describe it.

Clients 800 in FIG. 8A may correspond to user devices 104 (FIGS. 1 and 2A) that have been registered with the system 100 (that is, user devices to which the system 100 has assigned a device ID). A client need not be present. A client may be any kind of device including a device such as a smartphone (e.g., an IOS or android device, etc.), a handheld tablet device (e.g., an Apple iPad or the like), a special-purpose device program specifically to operate within the system 100, and application running on a general purpose or special purpose computer device, or a web-based application.

As used herein for this description, "downstream" refers to the direction from devices to the backend, whereas "upstream" refers to the direction from the backend to one or more devices.

Clients 800 communicate with the backend 108 and with each other via the backend. In order to communicate with the backend or with other clients, a client may communicate with one or more backend services 802 via connection and routing mechanism(s) 804. Connection and routing between clients and backend services in the downstream direction may use downstream connection and routing mechanism(s) 806. Clients 800 may use API 808 in order to communicate downstream. It should be appreciated that not all backend system services 802 need be directly visible to or accessible directly by clients 800, even using the API 808. Connection and routing between the backend services and clients in the upstream direction may use upstream connection and routing mechanism(s) 810.

The backend system services 802 may include configuration services 812, user services 814, utilities and miscellaneous services 815, and conversation/asset manager services 816. The conversation/asset manager services 816 may include conversation services 818 and asset services 820. The utilities and miscellaneous services 815 may include search services 817. The backend system services 802 may correspond to, or be implemented by, backend applications 112 in FIGS. 1 and 2B.

The backend system services 802 may maintain and access storage/data 822. The storage/data 822 may be stored/maintained in the backend databases 110 of FIG. 1. Storage/data 822 may include configuration data 824, user data 826, device data 828, and conversation data 830. Conversation data 830 may include message data 831 and asset data 832.

The backend system preferably maintains and can access state information via state mechanism(s) 834. State mechanism(s) 834 may include presence (device or client status) mechanisms 836. The state mechanism(s) 834 preferably provide state information (for example, presence information about devices) to the upstream connection/routing mechanism(s) 810. The state mechanism(s) 834 may obtain or determine state information directly from clients 800 and/or via connection and routing mechanism(s) 804 (for this reason, in the drawing in FIG. 8A the downstream arrow connecting clients 802 state 834 is shown partially overlapping connection and routing mechanism(s) 804).

The connection and routing mechanism(s) 804 may use authentication/verification mechanism(s) 842, e.g., to authenticate client downstream requests to the backend and/or backend upstream communications to clients. It is preferable and desirable that clients authenticate themselves when communicating downstream with the backend. Likewise, it is preferable and desirable that backend upstream communication with clients be authenticated and/or verified. Various authentication techniques may be used, including certificate-based and token-based authentication, and it should be appreciated that the system is not limited by the authentication/verification scheme(s) used. The authentication/verification mechanism(s) 842 may include, for example, CA(s) 119 (FIG. 1). In order to support operation of the system without continuous access to CA(s) 119, the authentication/verification mechanism(s) 842 may include some way of determining the revocation status of digital certificates while offline, for example, using an OCSP service (OCSP is an Internet protocol for obtaining the revocation status of X.509 digital certificates).

Figure 8B:
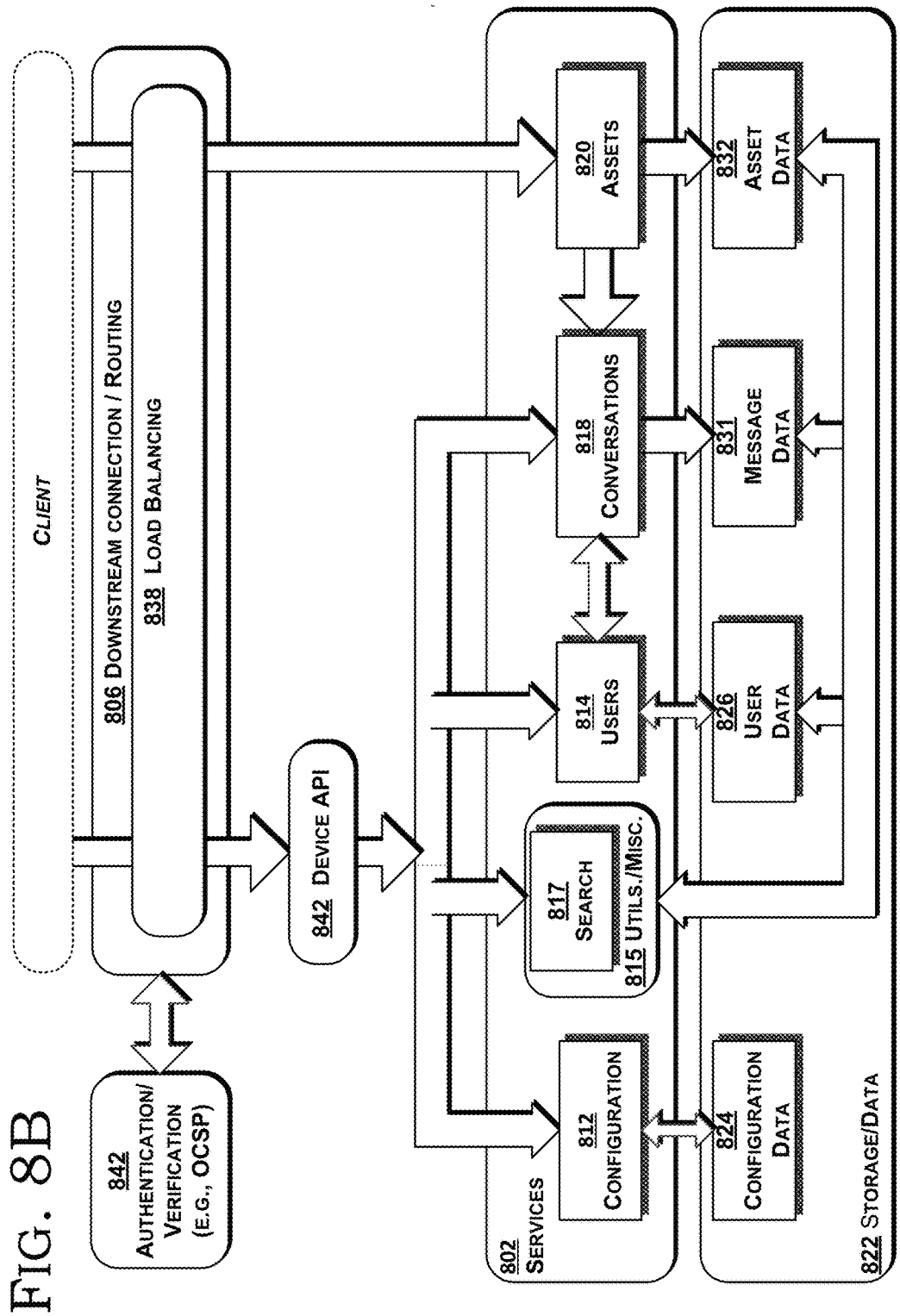
Figure 8C:
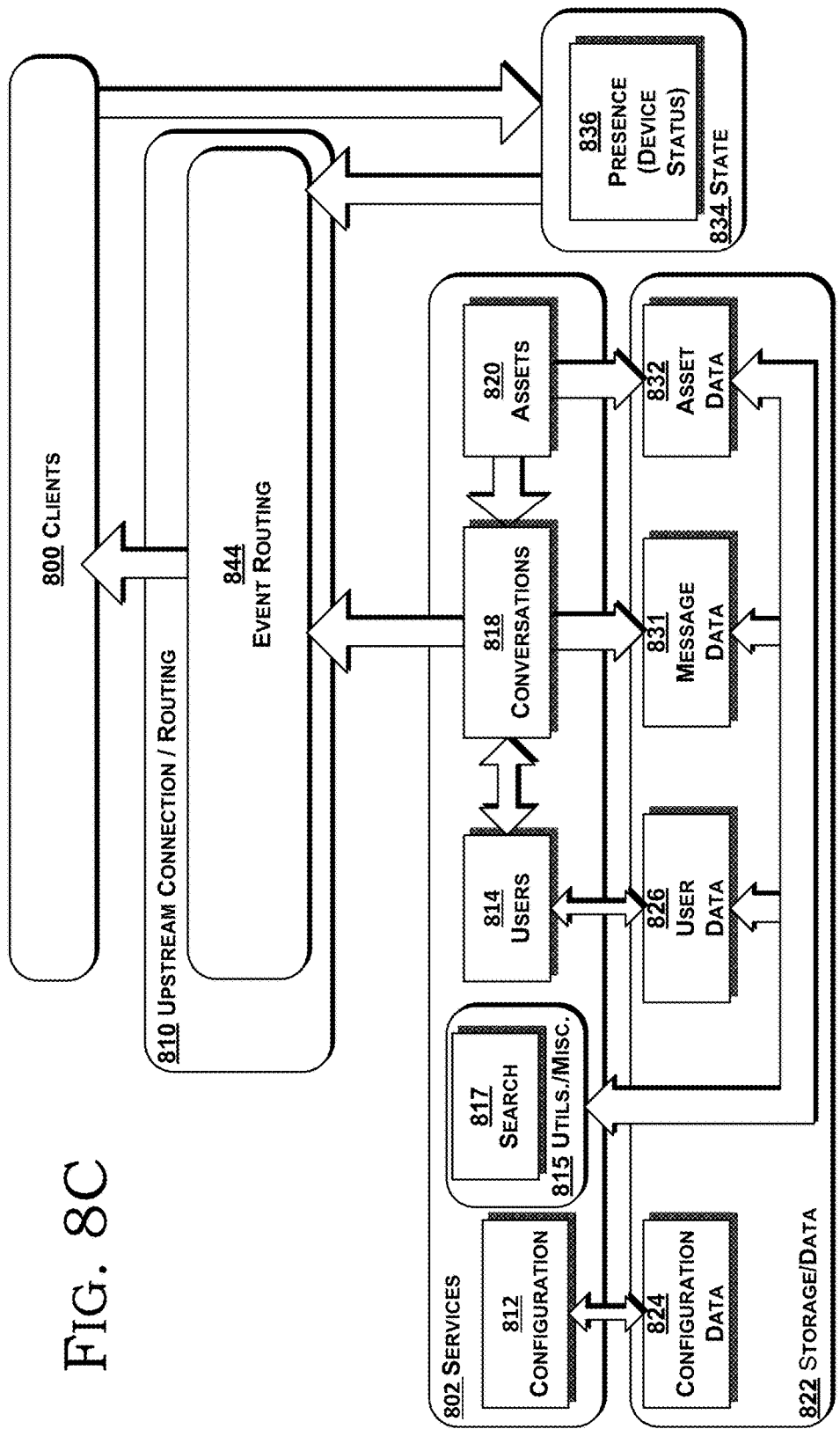

To aid in this description, FIG. 8B shows aspects of the system in FIG. 8A dealing primarily with downstream processing (from clients to the backend), and FIG. 8C shows aspects of the system FIG. 8A dealing primarily with upstream processing (from the backend to clients). As shown in FIG. 8B, the downstream connection and routing mechanism(s) 806 may include load-balancing mechanism(s) 838. As shown in FIG. 8C, the upstream connection and routing mechanism(s) 810 may include event routing mechanism(s) 844.

Figure 8D:
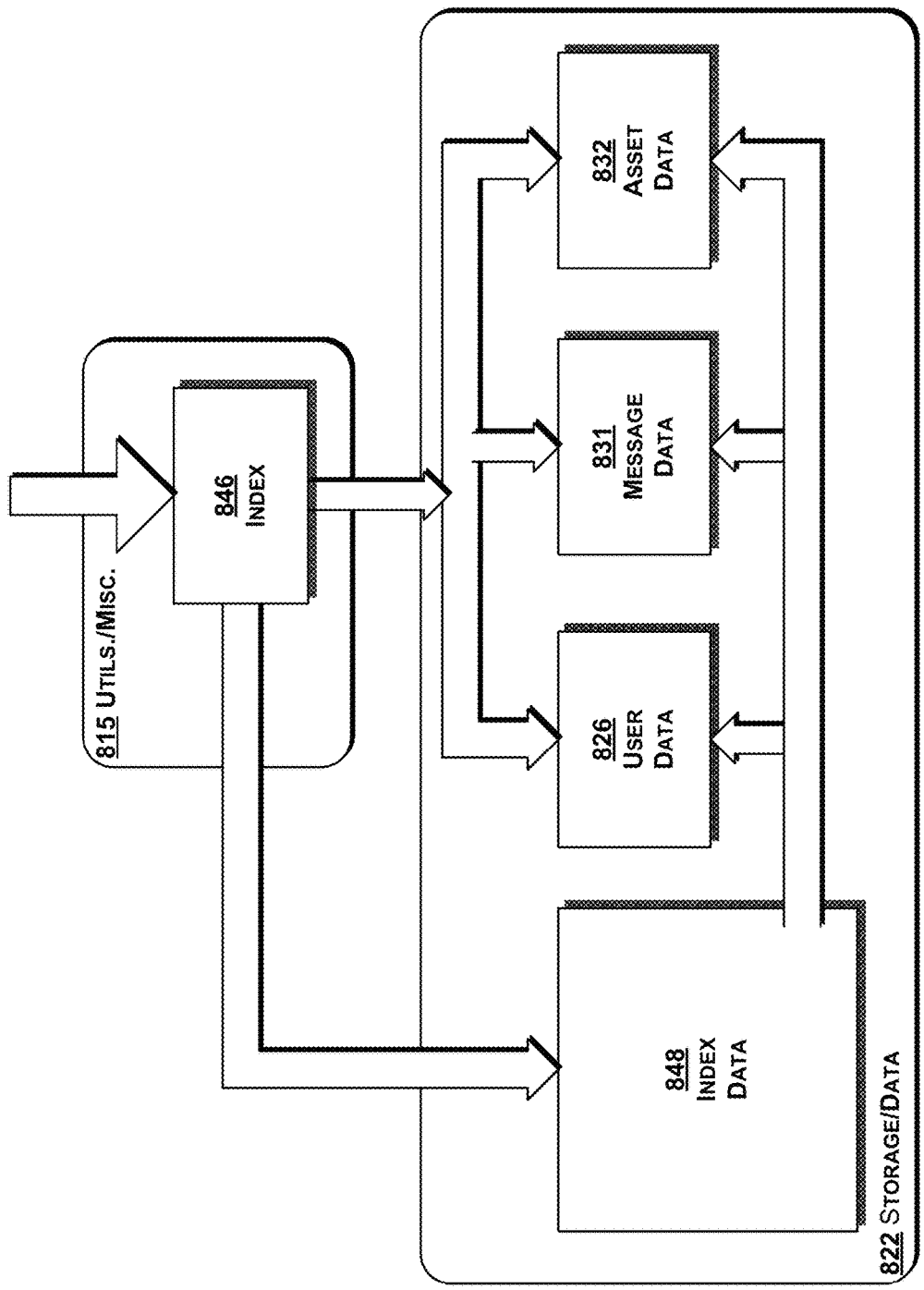
Figure 8E:
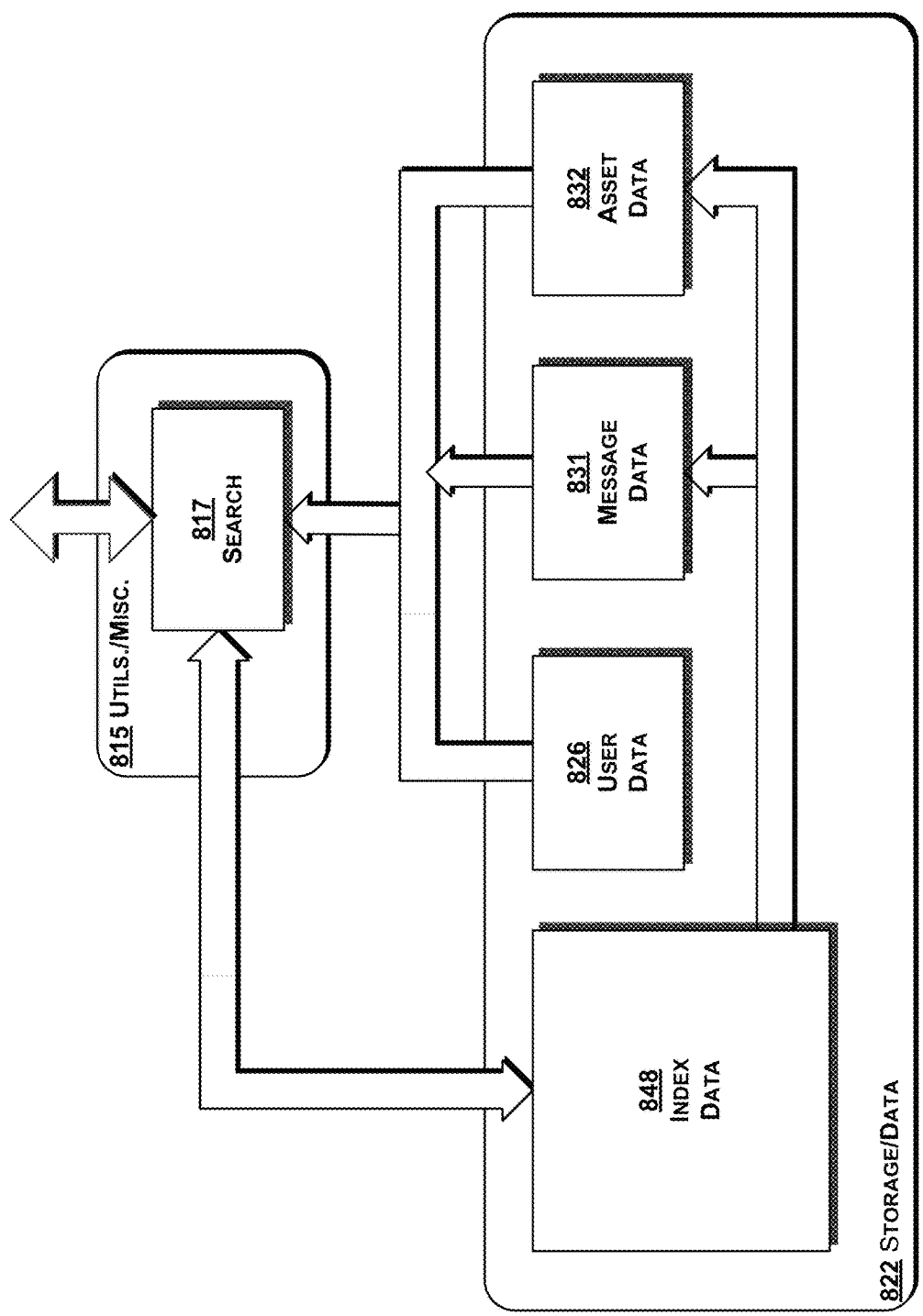

FIGS. 8D-8E show aspects of the utilities/miscellaneous mechanism(s) 815 of the backend services 802. As shown in FIG. 8D, the utilities/miscellaneous mechanism(s) 815 includes index mechanism(s) 846.

Various mechanisms in FIGS. 8A-8E are described in greater detail below.

A User Interface (UI)

Clients (users' devices) interact with each other and the system 100 via the backend 108. These interactions take place using a user interface (UI) application 128 running on each client (device 104, FIG. 2A).

Devices

As noted above, a device can be any kind of computing device, including mobile devices (e.g., phones, tablets, etc.), computers (e.g., desktops, laptops, TVs, etc.), and the like. Each device preferably includes at least at one display and at least some input mechanism. The display and input mechanism may be separate (as in the case, e.g., of a desktop computer and detached keyboard and mouse), or integrated (as in the case, e.g., of a tablet device such as an iPad or the like). The term "mouse" is used here to refer to any component or mechanism the may be used to position a cursor on a display and, optionally, to interact with the computer. A mouse may include a touchpad that supports various gestures. A mouse may be integrated into or separate from the other parts of the device. A device may have multiple displays and multiple input devices.

FIGS. 9A-9C show examples of devices 104-1, 104-2, and 104-3 that may be used within the system 100. These may correspond, e.g., to some of the devices 104 in FIG. 1. Device 104-1 (FIG. 9A) has an integrated display and input mechanism in the form of touch screen 902. The device 104-1 is integrated into a single component, e.g., a smartphone, a tablet computer, or the like. Device 104-2 (FIG. 9B) is also integrated into a single component, but, in addition to a screen 914, it includes a keyboard 906 and an integrated mouse 908. The keyboard may be a hardware keyboard (e.g., as in the case of a BlackBerry phone). The screen 904 may be a touch screen and the keyboard may be implemented as a software (or virtual) keyboard. Device 104-3 (FIG. 9C) comprises multiple components, including a computer 910, a computer monitor 912, and input/interaction mechanism(s) 914, such as, e.g., a keyboard 916 and/or a mouse 918. The device 104-3 may also include gesture recognition mechanism 920. Some or all of these components may be integrated into a single physical device or appliance (e.g., a laptop computer), or they may all be separate components (e.g., a desktop computer). Although the various components of device 104-3 are shown connected by lines in the drawing, it should be appreciated the connection between some or all of the components may be wireless.

As another example, a device may be integrated into a television or a set-top box or the like. Thus, e.g., with reference again to FIG. 9C, the display 912 may be a television monitor and the computer 910 may be integrated fully or partially into the monitor. In this example, the input/interaction mechanisms 918 (e.g., keyboard 916 and mouse 918) may be separate components connecting to the computer 910 via wired and/or wireless communication (e.g., via Bluetooth or the like). In some cases, the input/interaction mechanisms 918 may be fully or partially integrated into a remote control device or the like. These input/interaction mechanisms 918 may use virtual keyboards generated by the computer 910 on the display 912.

These exemplary devices are shown here to aid in this description, and are not intended to limit the scope of the system in any way. Other devices may be used and are contemplated herein.

A UI is implemented, at least in part, on a device 104, and preferably uses the device's display(s) and input/interaction mechanism(s). Use of a UI may require selection of items, navigation between views, and input of information. It should be appreciated that different devices support different techniques for presentation of and user interaction with the UI. For example, a device with an integrated touch screen (e.g., device 104-1 as shown in FIG. 9A) may display UI information on the touch screen 902, and accept user input (for navigation, selection, input, etc.) using the touch screen (perhaps with a software/virtual keyboard for some types of input). A device with an integrated screen, keyboard, and mouse (e.g., device 104-2 as shown in FIG. 9B) may display UI information on the screen 904, and accept user input using the hardware keyboard 906 and hardware mouse 908. If the screen/display 904 is also a touch screen display, then user interactions with the UI may use the screen instead of or in addition to the keyboard 906 and mouse 908. A device with separate components (e.g., device 104-3 of FIG. 9C) may display UI information on the display 912 and accept user input to the UI using the keyboard 914, mouse 916 (and possibly via gesture mechanism 918).

UI Interactions

A UI presents information to a user, preferably in the form of text and/or graphics (including drawings, pictures, icons, photographs, etc.) on the display(s) of the user's device(s). The user may interact with the UI by variously selecting regions of the UI (e.g., corresponding to certain desired choices or functionality), by inputting information via the UI (e.g., entering text, pictures, etc.), and performing acts (e.g., with the mouse or keyboard) to affect movement within the UI (e.g., navigation within and among different views offered by the UI).

The UI application(s) 128 (FIG. 2A) preferably determines (or knows) the type and capability of the device on which it is running, and the UI may vary its presentation of views depending on the device. For example, the UI presented on a touch screen display on a smartphone may have the same functionality as the UI presented on the display of general-purpose desktop or laptop computer, but the navigation choices and other information may be presented differently.

It should be appreciated that, depending on the device, the UI may not actually display information corresponding to navigation, and may rely on parts of the screen and/or gestures to provide navigation support. For example, different areas of a screen may be allocated for various functions (e.g., bottom for input, top for search, etc.), and the UI may not actually display information about these regions or their potential functionality.

As has been explained, and as will be apparent to those of ordinary skill in the art, upon reading this description, the manner in which UI interactions take place will depend on the type of device and interface mechanisms it provides.

As used herein, in the context of a UI, the term "select" (or "selecting") refers to the act of a user selecting an item or region of a UI view displayed on a display/screen of the user's device. The user may use whatever mechanism(s) the device provides to position the cursor appropriately and to make the desired selection. For example, a touch screen 902 on device 104-1 may be used for both positioning and selection, whereas device 104-3 may require the mouse 916 (and/or keyboard 914) to position a cursor on the display 912 and then to select an item or region on that display. In the case of a touch screen display, selection may be made by tapping the display in the appropriate region. In the case of a device such as 104-3, selection may be made using a mouse click or the like.

Touch Screen Interfaces and Gestures

Touch-screen devices (e.g., an iPad, iPhone, etc.) may recognize and support various kinds of touch interactions, including gestures, such as touching, pinching, tapping, and swiping. These gestures may be used to move within and among views of a UI.

Role and Requirements of a UI for the System

Figure 10A:
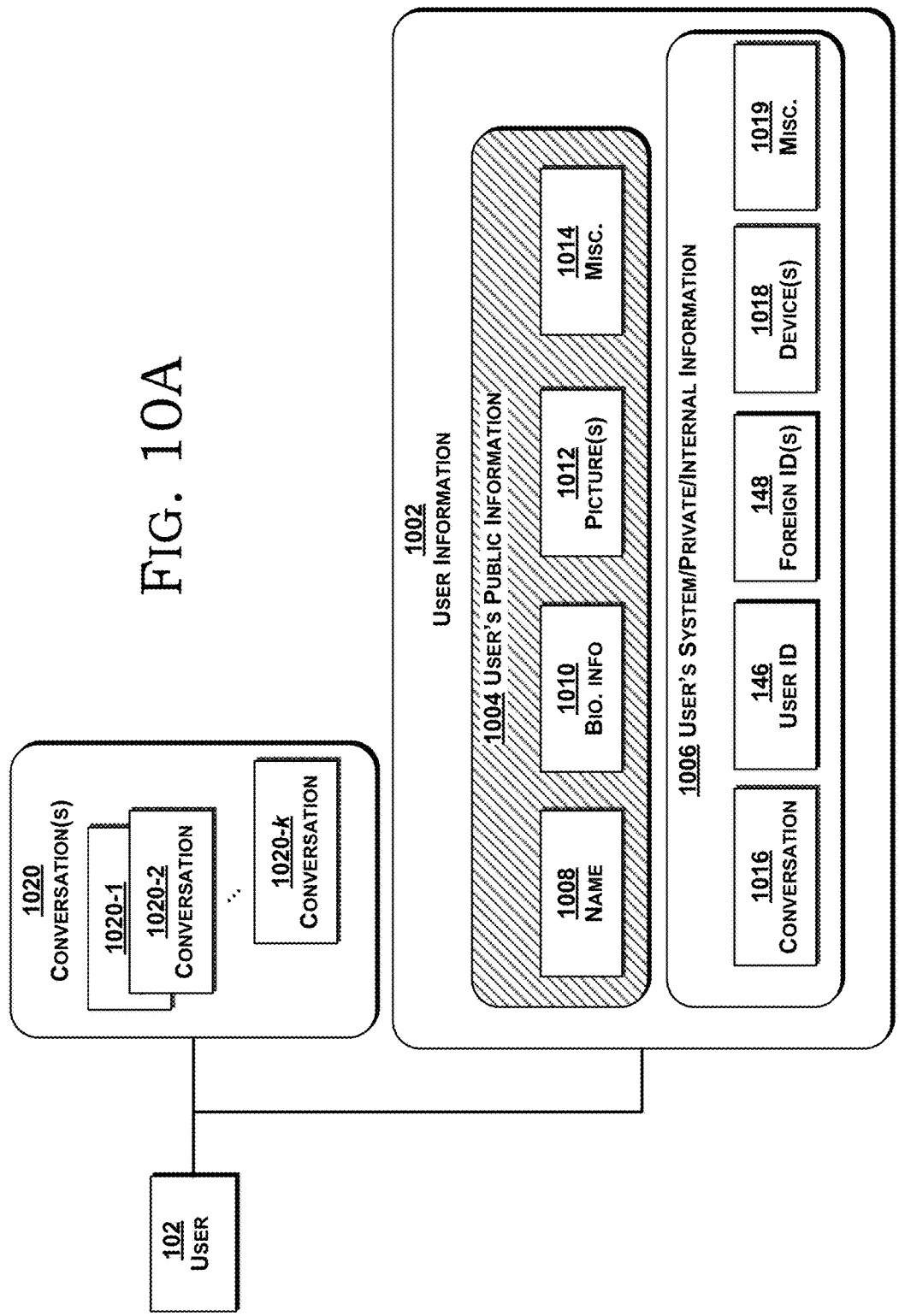

As described above, the system 100 has multiple users 102. As shown in FIG. 10A, each user 102 has user information 1002 associated therewith. For the purposes of this discussion, the user information 1002 may be considered to include the user's public (or visible) information 1004 and the user's non-public information 1006 (which may include internal system information and the user's private information). The user's public (or visible) information 1004 may include the user's name 1008, the user's biographical information 1010, one or more user pictures 1012, and other information 1014.

The user's non-public information 1006 may include conversation information 1016, the user ID 146 and foreign IDs 148 (FIG. 3A), information about the user's device(s) 1018 (e.g., a list of all devices associated with the user, perhaps by device ID), and other information 1019.

It should be appreciated that the categorization of user information described here is given by way of example, and that different and/or other categorizations of the user information may be made. It should also be appreciated that the system need not impose a strict boundary between public/visible and non-visible information for users. It should further be appreciated that the term "private" does not imply any legal notion of privacy and is used here to describe which information may or may not be visible to other users in the system.

The system 100 may allow the user to set and possibly change some or all of the user's public information.

With reference to FIG. 10A, each user 102 is associated with one or more conversations 1020 (including, at least, the user's self-conversation). As shown in FIG. 10A, user 102 is also associated with (i.e., involved in) k conversations, denoted 1020-1, 1020-2, . . . 1020-k. This list of conversations will preferably include the user's self-conversation and all non-deleted conversations that the user has ever joined and is still a part of (i.e., has not left), regardless of how much time has expired since any activity took place in the conversation and regardless of the user's actual active participation in the conversation.

The information described above with reference to FIG. 10A may be stored in or derivable from one or more databases 110 associated with the backend 108 (FIG. 1). For example, at least some of the user information 1002 may be stored as or derivable from user data 826 (FIG. 8A).

Figure 10B:
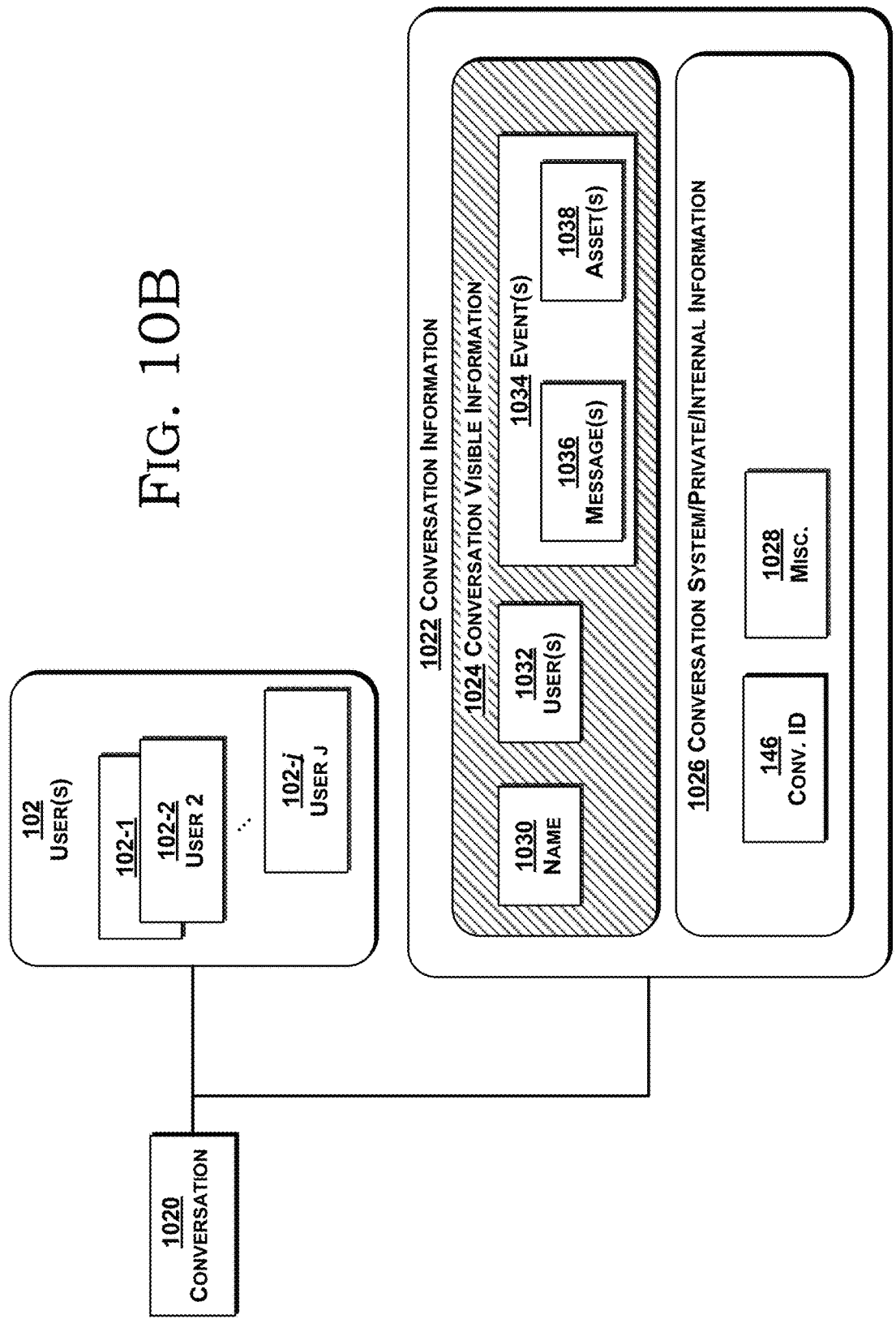

With reference to FIG. 10B, each conversation 1020 has one or more users 102 and conversation information 1022 associated therewith. The conversation information 1022 may be considered to include the conversation's visible information 1024 and the conversation's non-visible information 1026 (which may include internal system information such as the conversation ID 146 and other non-visible information 1028). The conversation's visible information 1024 may include the conversation's name 1030, the user(s) in the conversation 1032, and the events comprising the conversation 1034, along with associated time information.

The events 1034 may comprise message(s) 1036 and asset(s) 1038 in the conversation. The conversation name 1030 is a name that may be presented to users. As noted earlier, the user-visible name of a conversation may differ from the system's internal conversation ID 146 for that conversation. It should be appreciated that, in the context of conversations, the notion of "visible" is preferably limited to the participant user(s) 1032.

The information described above with reference to FIG. 10B may be stored in or derivable from one or more databases 110 associated with the backend 108 (FIG. 1). For example, at least some of the conversation information 1020 may be stored as or derivable from conversation data 828 (FIG. 8A).

A UI should provide a user with the ability to configure or set their information and to engage in conversations using the system 100.

Each user 102 may be able to locate and converse with at least some of the other users in the system. Preferably a user can see information about and converse with all other users in the system except those users that have blocked the user.

Preferably the UI will allow the user to do at least some of the following:
1. create a two-user (one-to-one) conversation;
2. create a group conversation;
3. add a user to a conversation;
4. leave a conversation;
5. block or unblock another user;
6. hide or unhide a conversation;
7. mute or unmute a conversation;
8. delete a conversation;
9. mute or unmute the entire system;
10. perform administrative operations within the system;
11. find users within the system;
12. find conversations in which the user is a participant;
13. view conversations;
14. engage in and contribute to conversations (add text messages, assets, etc.); and
15. search within conversations (e.g., text messages, content, files, etc.).

It should be appreciated that the above list is merely exemplary of the features that a UI should provide, and further, the not every UI need provide all of the features listed. Those of ordinary skill in the art will realize and appreciate, upon reading this description, that a particular UI may provide fewer or more features than listed above, and that a particular UI may provide different features from those listed above. The system is not limited by the features offered by any particular UI. It should further be appreciated that not every device need provide the same UI or a UI with the same features.

An Exemplary UI

Framework

An exemplary UI for the system 100 is described here. The UI comprises a number of views (or windows) and a set of techniques or approaches to moving or transitioning within and between the views. Each view preferably displays some of the information in the system or a way to find or interact with some of that information. The UI may be implemented as a UI application 128 on device 104 (FIG. 2A). For each implementation of a UI on a particular device, each view is preferably displayable of on the display of the device. The UI operates on the device and causes the device applications 114 to interact with the backend 108 and thereby, if needed, with other devices.

Views

Figure 11A:
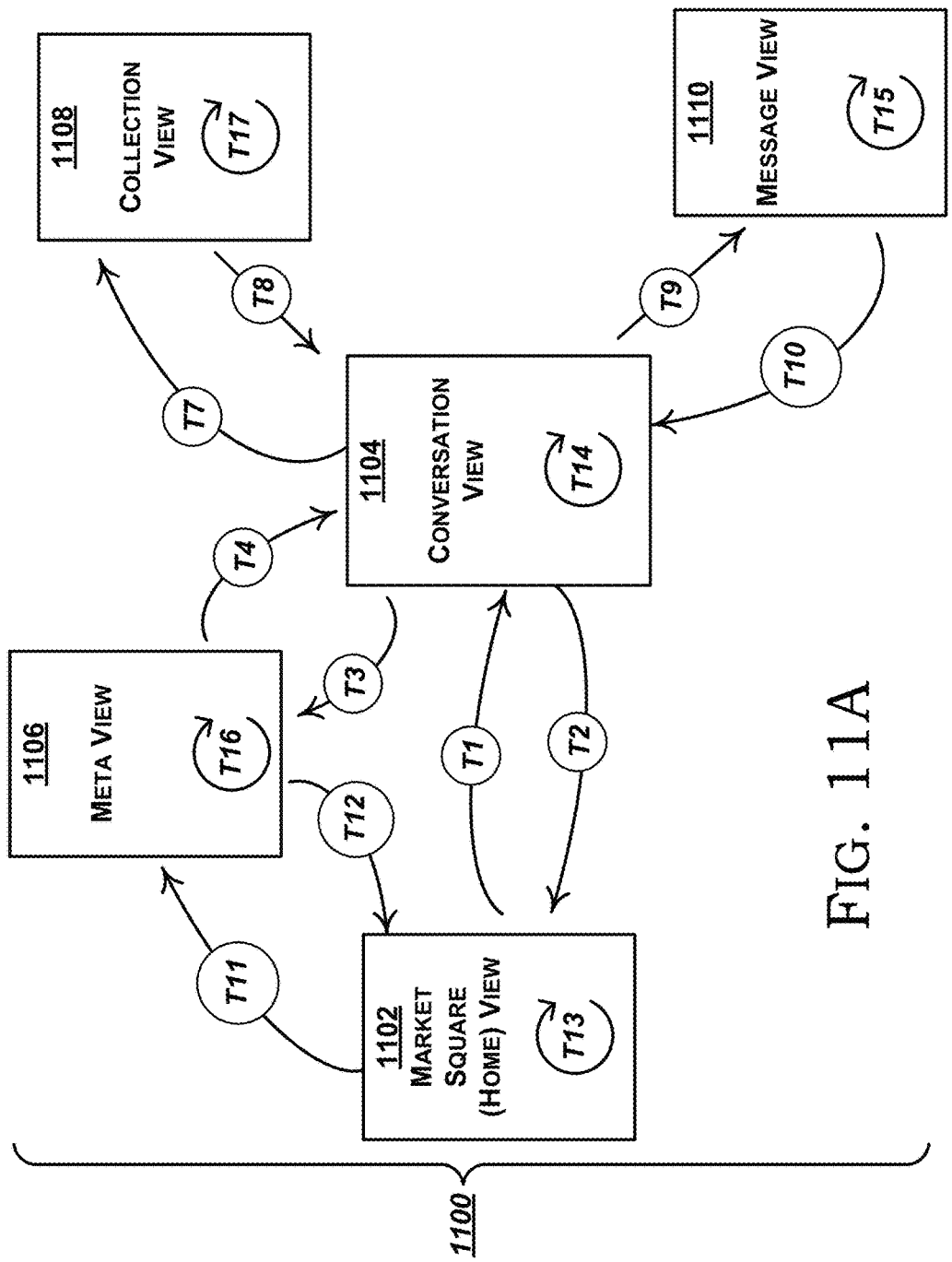

With reference to FIG. 11A, in a presently preferred implementation the UI 1100 (implemented, e.g., using UI interface application(s) 128 on device 104) comprises the following five main views (or windows):
1. Market square (or home) view 1102;
2. Conversation view 1104;
3. Meta view 1106;
4. Collection view 1108; and
5. Message view 1110.

Those of ordinary skill in the art will realize and appreciate, upon reading this description, that different and/or other views may be provided and supported by the UI. In addition, it should be appreciated that the names given here for these views are merely to aid in the description and are not intended to limit the scope of the system in any way.

Each user 102 has a market square view 1102 that provides the user's main view of the system. A user's market square view 1102 of the UI 1000 may be considered to be a home or base view of the system for that user. The market square view for a user is the view from which conversations are initiated, and where the user's conversations can be found. With reference again to FIG. 10A, the home view 1102 for a particular user is a view from which the user can locate the conversations 1020 associated with that user. It is also the view from which the user can locate other users in the system. A user can navigate (e.g., move around) within the market square view 1102, and may navigate from/to the market square view 1102 to/from other UI views.

A conversation view 1104 of the UI 1000 provides the user with views of conversations in which the user is a participant (e.g., one of the conversations 142, FIG. 2B). The conversation view 1104 is the view where discussions, messages, exchange of objects, and the like may take place in the system 100. The user may navigate (e.g., move around) within the conversation view 1104, and may navigate to/from the conversation view 1104 from/to other views.

A meta view 1106 provides a view of more detailed aspects of some information, e.g., a user, a conversation, a message, an asset (e.g., photograph), a location, or some other item. For example, the meta view of a user may include more detailed information about the user (e.g., taken or derivable from the user's public information 1004), such as the user's name 1008, photograph (from picture(s) 1012), biographical information 1010, etc. When the information being viewed in a meta view 1106 is part of another view, the meta view 1106 may be a meta layer of that other view, and may be displayed by the UI above (i.e., at least partially overlaying) that other view. The user may navigate (e.g., move around) within the meta view 1106, and may navigate to/from the meta view 1106 from/to other views. In some cases the user may interact with the system via the meta view 1106 to modify some information (e.g., the user's own biographical information, picture(s), etc.) displayed in the meta view 1106 (e.g., when the meta view is that of the user's self-conversation).

A collection is a set of objects exchanged during a conversation, and a collection view 1108 provides a view of a collection from a conversation. In some aspects, a collection may be considered to be a set of assets belonging to a conversation and any structure given to them. Its purpose it to allow easy retrieval and organization of assets. For instance the user could organize images received from a friend's trip by theme.

A collection may be displayed in alternative layouts. The user may navigate (e.g., move around) within the collection view 1108, and may navigate to/from the collection view 1108 from/to a conversation view 1104. A collection view 1108 is a meta layer of the conversation and is preferably displayed above (i.e., at least partially overlaying) the conversation view by the UI.

A message view 1110 provides a view of a message (preferably a single message) from a conversation. Recall from above that, a "message" refers to an object or its (direct or indirect) contents. Thus, a message may be the text and/or an asset. The user may navigate (e.g., move around) within the message view 1110, and may navigate to/from the message view 1110 from/to a conversation view 1104. A message view 1110 may also provide the user with actions associated with the message (e.g., set as favorite, make public, save, etc.).

Navigation

The arrows in FIG. 11A depict at least some possible transition flows between the various views provided by the UI 1100 in a presently preferred implementation. It should be appreciated that not every implementation of the UI will support all transitions, and that some implementations of the UI may support additional transitions.

Possible transitions between the various views provided by the UI 1100 are depicted in the drawing in FIG. 11A by the arrows labeled T1 to T12. Possible transitions within each of the views of the UI are depicted by the arrows labeled T13 to T17. Transitions within a view may include moving to different parts of the view, viewing the same information in a different way (e.g., zooming or expanding information), or viewing different information within the same view.

Transition T1 reflects a flow within the UI 1100 from the market square/home view 1102 to the conversation view 1104, and transition T2 reflects a transition within the UI 1100 from the conversation view 1104 to the market square view 1102. Transition T3 reflects a transition within the UI 1100 from the conversation view 1104 to the meta view 1108, and transition T4 reflects a transition within the UI 1100 from the meta view 1108 to the conversation view 1104.

Transition T5 reflects a transition within the UI 1100 from the market square/home view 1102 to the collection view 1108, and transition T6 reflects a transition within the UI 1100 from the collection view 1108 to the market square/home view 1102.

Transition T7 reflects a transition within the UI 1100 from the conversation view 1104 to the collection view 1108, and transition T8 reflects a transition within the UI 1100 from the collection view 1108 to the conversation view 1104.

Transition T9 reflects a transition within the UI 1100 from the conversation view 1104 to the message view 1110, and transition T10 reflects a transition within the UI 1100 from the message view 1110 to the conversation view.

Transition T11 reflects a transition within the UI 1100 from the market square view 1102 to the meta view 1108, and transition T12 reflects a transition within the UI 1100 from the meta view 1108 to the market square view 1102.

Transition(s) T13 reflects possible transitions within the market square/home view 1102. Transition(s) T14 reflects possible transitions within the conversation view 1104. Transition(s) T15 reflects possible transitions within the message view 1110. Transition(s) T16 reflects possible transitions within the meta view 1106. Transition(s) T17 reflects possible transitions within the collection view 1108.

The manner of affecting a transition may depend on the implementation of the UI and on the device on which it is being implemented. For example, in some implementations, each view may have one or more regions which, when selected, cause a transition to another view. In some other implementations, e.g., those implemented on touch-screen devices, transition from one view to another may be affected or caused by touching the screen in various manners. These approaches may include sliding up, down, left, or right, swiping, touching, and pinching Recall (as described above) that a conversation consists of a time ordered sequence of events. The conversation view 1104 may be used to provide a sliding window over a conversation. In preferred implementations, the conversation view 1104 can be used to view some or all of a conversation.

Figure 11B:
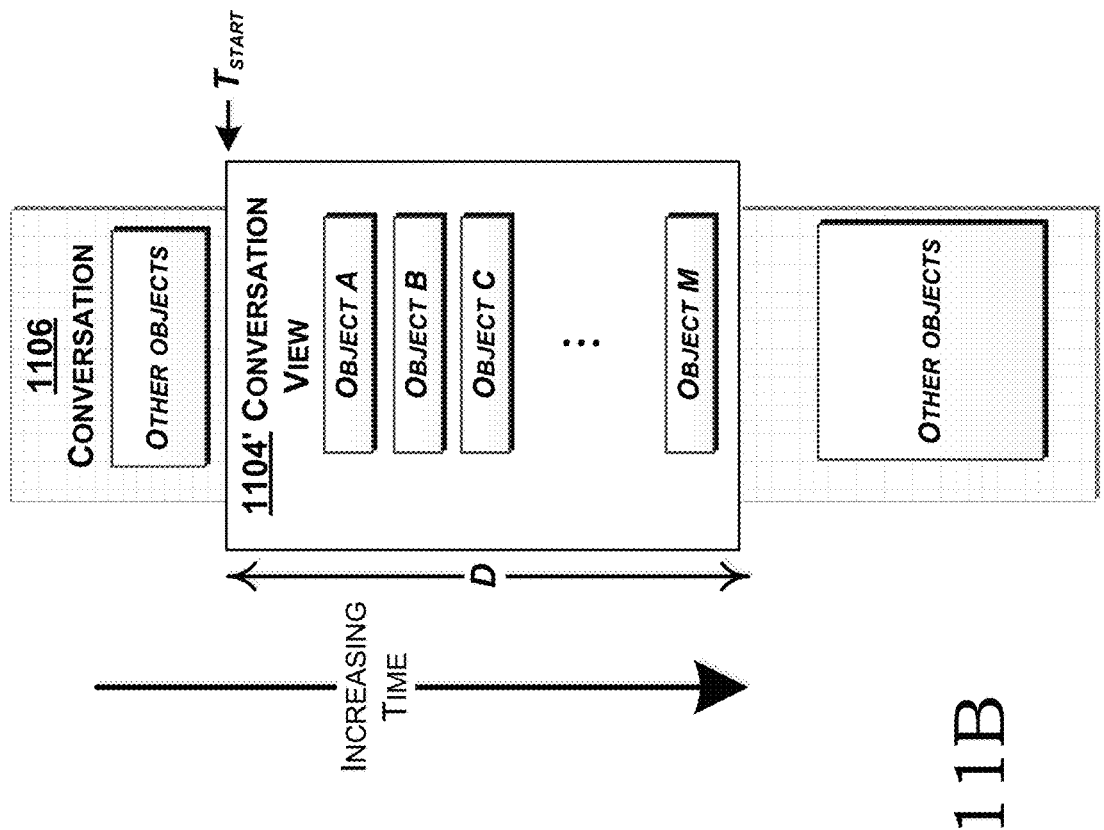

For example, as shown in FIG. 11B, the conversation view 1104' of conversation 1106 may be used to view a portion of conversation 1106. The start time ($T_{start}$) of the period covered by the conversation view 1104' can be varied, as can the duration (D) of the time period.

A view of a region or portion of a conversation provides a view of messages within that region or portion. Thus, e.g., the conversation view 1104' provides a view of messages associated with objects within the region (Object A, Object B, . . . . Object M in the example in FIG. 11B). As shown in the example in FIG. 11B, there may be other objects in the conversation that are not covered by the current view.

The conversation view 1104 may include regions which, when selected, cause different portions of a selected conversation to be viewed. In some other implementations, e.g., those implemented on touch-screen devices, transition from one view of a conversation to another may be affected or caused by touching the screen in various manners. Similarly, in such implementations, transition from the conversation view 1104 to one of the other views may be affected or caused by touching the screen in various manners.

Exemplary Navigation

Exemplary navigation in a preferred UI implementation is described here with reference to FIGS. 12A-12F.

Transitions and Navigation within and from the Market Square View

FIG. 12A depicts an exemplary market square/home view 1102' within the UI of a particular user 102. The view shows at least some of the user's conversations, i.e., in which the user is a participant (e.g., conversations 1020, FIG. 10A), including the user's self-conversation (preferably at the top of the view). The conversations may be presented as a list of conversation names. The conversation list may be presented in any order. The naming and ordering of the other conversations in the list may depend on system policies. For example, in some implementations the conversations are listed in the order of most recent activity. Recall that the system 100 may maintain, for each conversation, the last time the conversation was modified (212, FIG. 4D), and this information, alone or with other information, may be used by the UI 1100 to determine the manner and/or ordering of conversations in the market square/home view 1102'. Preferably conversations are listed based on activity, with the most recent being on top, and so on.

The term "list" is used here to refer to a collection, however displayed. Thus, e.g., a list of conversations may be displayed vertically, one below the other, or in a grid, or in some other manner.

In a presently preferred implementation, conversations in the home view are listed in the following order:
1. Self-conversation: always the first item in the list;
2. non-hidden conversations;
3. hidden (Archived) conversations.

Non-hidden and hidden conversations sub-lists are ordered themselves with the same ordering algorithm, based on last in time event. Possible events affecting the ordering of conversations include messages received in a conversation and the following changes in a conversation:
- a user changes the name of the conversation (e.g., in a Participants view)
- a user adds one or more participants to a n:n conversation
- a user leaves a group conversation Muted conversations are preferably excluded from the reordering. New events happening in those conversations are ignored resulting in the muted conversation being pushed down to the bottom of the list. This is the case for muted conversations both in Non hidden and hidden sub-lists.

Recall that each conversation preferably has a name for each participant user (conversation name 220, FIG. 4D) and the conversation list in the market square/home view 1102' preferably presents the users' conversation names of conversations in the list. For one-one conversations, the list may include the name of the other user (e.g., from that other user's name 1008, FIG. 10A), and may also include a picture of the other user (e.g., from that other user's picture(s) 1012, FIG. 10A). Naming conventions for group conversations are discussed in greater detail below.

In addition to the conversation name (or title), the market square view of conversations may also provide an indication (per conversation) of events in that conversation that have not yet been seen by the user. For example, in the conversation view shown in FIG. 12A, Conversation #2 has 3 unviewed objects, and conversation #j has 7 unviewed objects. The indication of unviewed (unseen) events may be given as a number (as shown in FIG. 12A) or using some other indication (e.g., a circle or dot or some other shaped item, with the size of the item being based on the number of unviewed objects).

FIG. 12B shows an alternate exemplary market square/home view 1102" in which there is no search region (e.g., a search region is obtained by some interaction with UI), and in which conversations with recent activity include an indication of the amount of activity (the size of a dot next to the conversation name). In this example, user A is viewing her home view 1102". The UI presents user A's name at the top of the display followed by a list of conversation names. User A's name at the top of the list corresponds to user A's self-conversation. The next conversation in the list is a one-to-one conversation with user B, and is identified by the UI with user B's name. The third listed conversation is a one-to-one conversation with user C and is identified by the UI with user C's name. The last listed conversation is a group conversation with users A, X, and Y, and is listed by a name (e.g., "X and Y") for that conversation. In this example, the conversations with C and with X & Y have unviewed content. The relative amount of unviewed content is shown in the UI by a shaded circle adjacent the conversation name. Thus, in this example, user A's conversation with X & Y has more unviewed content than user A's conversation with user C. According to this view, user A's conversation with user B has no unviewed information.

As previously explained, when user A views unviewed information in the A's conversation with user C, the UI will updated the home view 1102" (when next visited or when visited on another of user A's devices) to reflect that status.

In this exemplary UI view, there is no active input region, and, in order to input information, the user needs to select an input selection region (denoted 1201 in the drawing) which will cause the UI to present an input region (and possibly a virtual keyboard and other input mechanisms). In this implementation the input selection region 1201 is denoted by a vertical bar or line in the lower left corner of the UI display. Those of ordinary skill in the art will realize and understand that different and/or other locations and/or indications may be used for an input selection region.

While the various regions and items of information are shown in the view 1102' with lines around them, it should be appreciated that the boundaries of various regions and items of information may not be (and are preferably not) shown.

It should be appreciated that if a user has viewed a part of a conversation on any of that user's devices, then that part of the conversation is considered to have been viewed by the user, and this status will be reflected by the UI on all of the user's devices (e.g., when the market square view 1102 is open).

With reference to FIGS. 2A-2B and 8A-8E, when the UI on a device associated with a user is in the market square/home view 1102, the UI needs to know what conversation information to display. Accordingly, the device (as a client 800, FIG. 8A) requests and obtains information about the user's conversations from the backend storage/data 822. The device (using device/client application(s) 114, including messaging & signaling applications 132) interacts with the backend applications 112, including users mechanism(s) 814 to determine information about the user's conversations. The device (as client 800) may use the API 808 for this interaction with the backend services 802. Thus, in a preferred implementation, the device (one of clients 800), using API 808, connects to backend services 802 using the downstream connection/routing mechanism(s) 806 of connection and routing mechanism(s) 804 to direct the client to an appropriate backend service(s) 802. The backend services may be distributed, and the downstream connection/routing 806 mechanism(s) may include load balancing mechanism(s) 838 which may direct the client to an appropriate backend service location. Downstream connection requests made by client 800 through the connection and routing mechanism(s) 842 may be subject to verification and authentication, e.g., using authentication/verification mechanism(s) 842. For example, when a client uses a certificate-based system, the client's certificate may be checked using a CA or, preferably, an OCSP. If the client's certificate is not on a revocation list, the request is permitted. In some implementations or cases where more security is required, other levels of authentication and/or verification may be applied by authentication/verification mechanism(s) 842.

Recall (with reference to FIG. 10A), that the backend data for each user may include a list of all conversations in which the user is a participant. Thus the backend services 802 (e.g., using users mechanism(s) 814) and user data 826 may ascertain which conversations the user is participating in. The backend services 802 may use that list of conversations and conversation data 830 to determine which conversations to present to the user in the conversation view of the UI.

Information needed by the UI for the home view, including conversation information, may be provided by the backend services 802 to the device, e.g., using upstream connection/routing mechanism(s) 810.

When the device receives conversation and other information from the backend, the device may store some or all of this information in device/client storage 116 (FIG. 2A). For example, the client may store user data in user data storage 120 and conversation data in conversation data storage 122 in device/client storage 116.

The UI may then present the information on the device's display.

The market square view 1102 may also provide a search region to allow the user to search for conversations and/or users and to start conversations. The search region may not be visible until a list of conversations is provided or requested. The search region allows the user to filter old conversations by participants or topic or find other users in the system, e.g., in order to start a new conversation.

Information on the UI home view on a particular device may change as a result of conversation changes by other users or by the user on other devices. For example, the user may delete or mute a conversation using another of the user's devices, or other users may contribute to conversations in which the user is a participant, in which case that status and information about those conversations should propagate to the UI home view on the particular device. Unread/unviewed contributions by other users to conversations may result in the UI presenting conversations in a different order in the home view, and/or the UI presenting information about unviewed contributions in the list of conversations shown in the home view. The list of conversations may also be altered by a user leaving, muting, archiving, joining or deleting a conversation. Accordingly, certain information may be sent upstream to the device based on actions occurring on other devices. Since the backend maintains the true state of each conversation, when a conversation (or information about a conversation, e.g., its participants) changes, that information may need to propagate upstream to all present devices involved in the conversation. The backend system may use the state information 834 (which may use presence mechanism(s) 836) to determine which device(s) are present. Updated conversation information is provided to those devices determined to be present. The backend mechanism(s) 802 preferably provide the information to the client via the upstream connection/routing mechanism(s) 810.

Selection of a search region 1202 on the user market square view 1102' (FIG. 12A) causes the UI to present a search interface on the display. In the example shown in FIG. 12B, the user may invoke the search interface by some other interaction with the UI (e.g., by swiping down and releasing on the screen of a touch screen device).

Figures 12C, 12D:
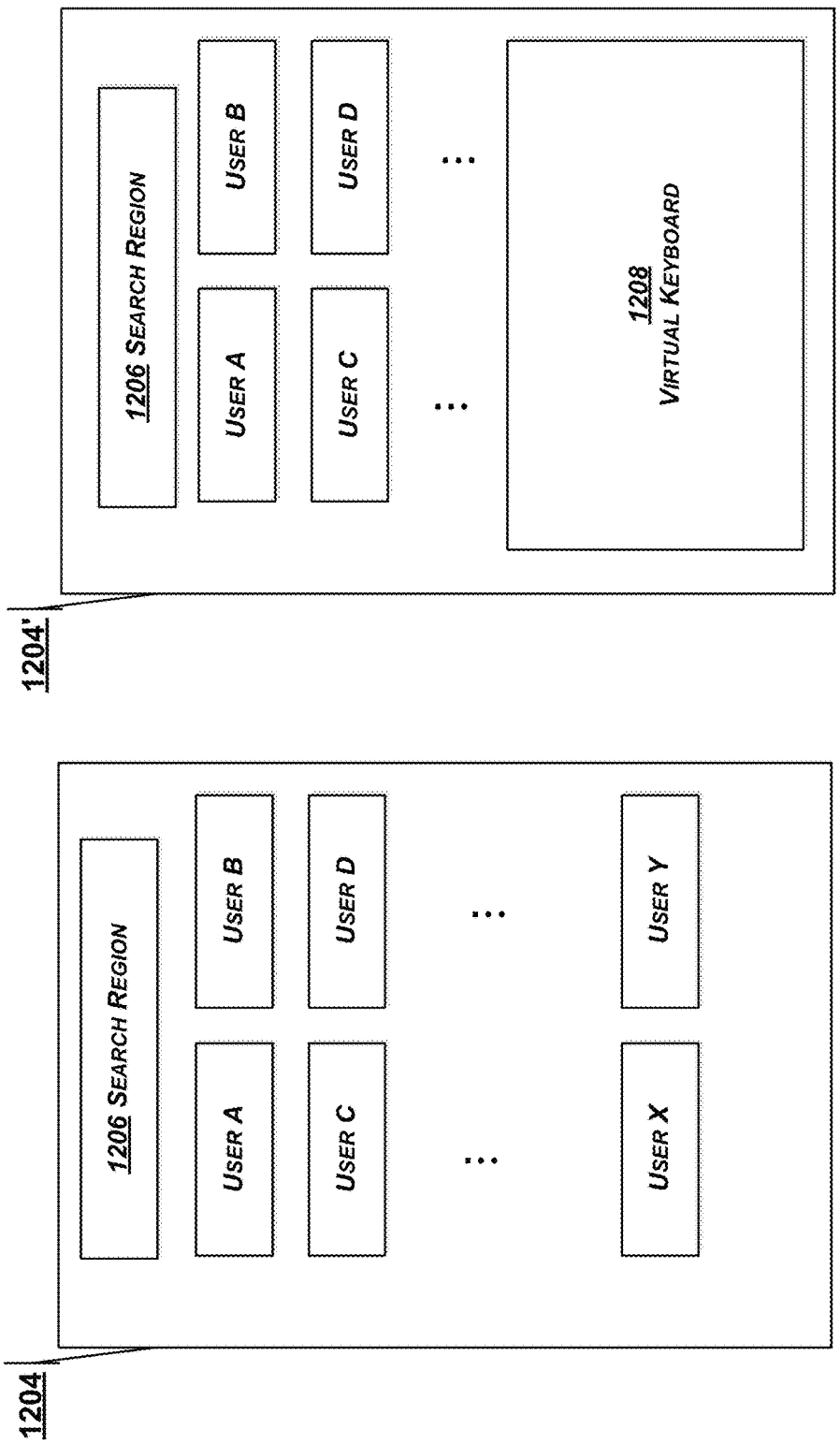

An exemplary search interface 1204 is shown in FIG. 12C, in which users in the system are listed, e.g., in a grid. Users may be listed in the search interface in any manner (e.g., alphabetically, based on some existing relationship with the user, based on whether the user has previously conversed with them, or on any other criteria). The user information for users in the list may include a user name and a user picture (e.g., name 1008 and/or picture 1012 from that user's public information 1004). The search interface 1204 preferably includes a search region 1206 in which the user can type search criteria in order to find specific users or conversations or to filter and/or prune the presented list of users. When the user selects the search region 1206, if the device on which the user is using this UI does not have a keyboard, the UI may present some way for the user to input her search criteria (e.g., a virtual keyboard). For example, as shown in FIG. 12D, when the user selects the search region 1206 in view 1204, the UI presents a virtual keyboard 1208 at a bottom portion of the display. The user may use that virtual keyboard to enter search criteria into the search region 1206. Once the search criteria are entered, the user can invoke the search (e.g., by selecting "return" or "enter" or the like on the virtual keyboard). The device conveys the search criteria to the backend, and the results of the search are conveyed by the backend back to the device.

Within the search view 1204, the user can select one or more users with which to have a conversation. In the search view 1204 reached from the home view 1102, selection of a single user causes either transition to an existing one-to-one conversation with that user or creation of a new one-to-one conversation with that user (and may follow the flow of FIG. 7A). In the search view 1204, selection of multiple users causes either transition to an existing group conversation with those users or creation of a new group conversation with those users (and may follow the flow of FIG. 7B).

Thus, if a first user wishes to begin or engage in a conversation with another user, that first user first finds the other user (S702 in FIG. 7A), e.g., using the UI search view just described. The backend 108 will then process the conversation (including creation, if necessary) using the process shown in FIG. 7A and described above. If a first user wishes to begin or engage in a group conversation with multiple other users, that first user first finds the other users (S714 in FIG. 7B), e.g. using the UI search view just described. The backend 108 will then process the conversation (with creation, if necessary) using the process shown in FIG. 7B and described above.

With reference to FIGS. 2A-2B and 8A-8E, when the user (using the UI) initiates a search on a device (client), the device (using device/client application(s) 114, including messaging & signaling applications 132) interacts with the backend applications 112. With reference to FIG. 8A, the device (one of clients 800), using API 808, connects to backend services 802 using the downstream connection/routing mechanism(s) 806 of connection and routing mechanism(s) 804 to direct the client to an appropriate backend service(s) 802. The backend services may be distributed, and the downstream connection/routing 806 mechanism(s) may include load balancing mechanism(s) 838 which may direct the client to an appropriate backend service location.

In the case of a search request using the UI, the client is directed to a search mechanism 817 in the backend service 802 (FIG. 8B). The search mechanism 817 accesses the needed data (e.g., user data 826) in the storage/data 822. The storage/data 822 may include index data 848 (FIG. 8D) to aid in searching The results of any search are provided back to the client via upstream connection/routing mechanism(s) 810 for presentation to the user by the UI. Note that in the case of a search, the results are only sent back upstream to the device that made the request.

FIG. 12B depicts a market square view 1102" of a particular user A, this view showing other users in the system. Recall that each user in the system has a user name (908, FIG. 9A) and may have one or more pictures (912, FIG. 9A). The other users shown in the market square view may be listed by name and/or picture. The market square view of users may be reached by a transition within the market square from the view of conversations. In some implementations, this intra-view transition may be achieved by selecting a region of the conversation view. In other preferred intra-view transition may be achieved, e.g., by swiping the screen from top to bottom.

The market square view 1102 may also include an input region (which may or may not be marked) in which a user may input text, when appropriate.

A user may transition to from the market square view 1102' to a conversation view 1104 of one of the conversations shown by selecting the desired conversation. In an implementation on a touch-screen device, the user may tap a conversation in the conversation view to open that conversation. In an implementation that uses a cursor and/or a mouse (or some other such selection device, e.g., a device using a web-based UI), the user may select the desired conversation by clicking on the conversation with the mouse.

Thus, within the home view 1102, selection of an existing conversation causes the display to transition to a conversation view 1104 of the selected conversation, and corresponds to transition T1 in FIG. 11A.

Previewing Conversations

In some implementations, the UI may allow the user to preview unviewed events in a conversation from the market square view 1102, without using the conversation view. In such implementations, when there are unseen events inside a conversation, the user may be able to preview a summary of those events, e.g., by dragging from the badge (indicating unseen events) to the left while in the market square view 1102. The summary may provide different content depending on the number and type of the pending events. For example, the system may provide a preview of a picture and a list of keywords from the unseen messages. When there is only one pending message, the system may display the pending message over the conversation name without switching to the conversation view. If the system is able to display the entire message then the system can update the "viewed" status of the message.

When a user uses a UI to preview a conversation on a device, the device may obtain the needed conversation information (e.g., a text message in a direct object) from the backend storage/data 822. Using API 808, the device requests the appropriate message(s) to be previewed. Since each message may have a unique message ID within the system, the device may request the message to be previewed based on its unique message ID. The device/client may connect to the backend services 802 as described above, and the conversation/asset manager mechanism(s) 814 may obtain the appropriate message information from message data 831 on the backend. This message data may be provided back to the device via upstream connection routing mechanism(s) 810.

Deleting Conversations

In some implementations, the UI may allow the user to delete a conversation while in the market square view 1102. In such implementations, they user may, e.g., swipe a conversation from left to right in the market square view 1102. This will provide a delete option (e.g., an icon of a trashcan or the word "Delete"), selection of which will cause the conversation to be deleted. The system may permit deletion of conversations without requiring confirmation.

When a user uses a UI to delete a conversation on a device, the device advises the backend so that information about the user's deletion of the conversation propagates to the database(s) in the backend, i.e., to the backend storage/data 822. Using API 808, the device advises the backend of the conversation's deletion. The device/client may connect to the backend services 802 as described above, and the conversation/asset manager mechanism(s) 814 may update the appropriate data 822 on the backend. For example, the conversation/asset manager mechanism(s) 814 may update user data 826 and conversation data 830 to reflect deletion of the conversation by the user. In addition, information about the conversation's deletion should propagate other present devices associated with the user and with any other users that were participants in the deleted conversation. Information may be propagated upstream, as needed, using upstream connection/routing mechanism(s) 810.

Silencing Conversations

In some implementations, the UI may allow the user to silence a conversation while in the market square view 1102. In such implementations, they user may swipe a conversation from left to right while in the market square view 1102. This may provide a silence option (e.g., an icon or button or the word "Silence"), selection of which will cause the conversation to be silenced. A silenced conversation may be un-silenced in a similar manner.

When a user uses a UI to silence a conversation on a device, the device advises the backend so that information about the user's silencing of the conversation propagates to the database(s) in the backend, i.e., to the backend storage/data 822. Using API 808, the device advises the backend of the conversation's silencing. The device/client may connect to the backend services 802 as described above, and the conversation/asset manager mechanism(s) 814 may update the appropriate data 822 on the backend. For example, the conversation/asset manager mechanism(s) 814 may update user data 826 and conversation data 830 to reflect silencing of the conversation by the user. In addition, information about the conversation's silencing should propagate other present devices associated with the user. Information may be propagated upstream, as needed, using upstream connection/routing mechanism(s) 810.

Naming Conventions for Group Conversations

In addition to any internal names, each group conversation is preferably named for each participant. In a presently preferred implementation, the default conversation name for a group or multiparty conversation is customized for each participant (user). Thus for a particular user, the default name is:

Participant 1, Participant 2 . . . & Participant N with the user's own name excluded. The list of participant names is preferably sorted by the current inverse frequency of involvement of the participant in other conversations with the user. Thus, e.g., if users John, Joe, and Anna are taking part in a conversation with user Fred; and user John is taking part in four other conversations with Fred, Anna is taking part in 10 other conversations with Fred, and Joe is in no other conversations with Fred, the conversation name (for Fred) will be "Joe, John & Anna". As explained, each participant will have a different name for the conversation. Preferably the name will change as the participant's involvement in other conversations changes. When a new participant is added to the conversation or leaves the conversation the name is re-determined.

Transitions and Navigation to, within, and from the Conversation View

Selection of a particular conversation from the market square view 1102 of the UI causes the UI to transition to a conversation view 1104 of that particular conversation. This corresponds to the transition T1 in FIG. 11A. Aspects of the selected conversation are presented in the conversation view 1104. Recall that a conversation comprises a time ordered sequence of objects (which may include messages or refer to assets). The conversation view 1104 may cover any time period of the particular conversation. However, preferably the initial view (after transition from the market square view 1102) is a view of the most recent activity in the conversation. That is, a conversation is preferably open where it was left so that the first of the unread messages is displayed. In some implementations the conversation view may provide a visual indication of what is new (i.e., not yet viewed).

Figure 12F:
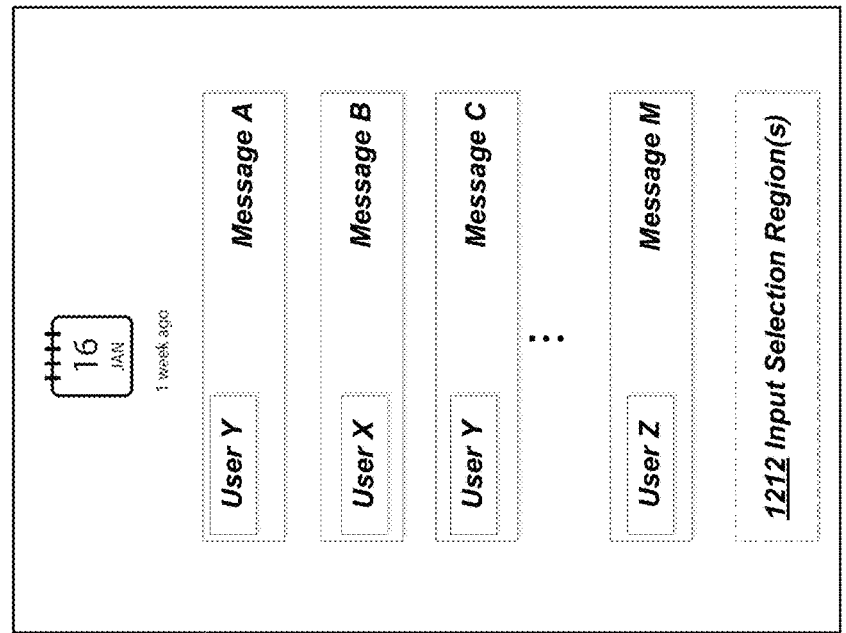
Figure 12E:
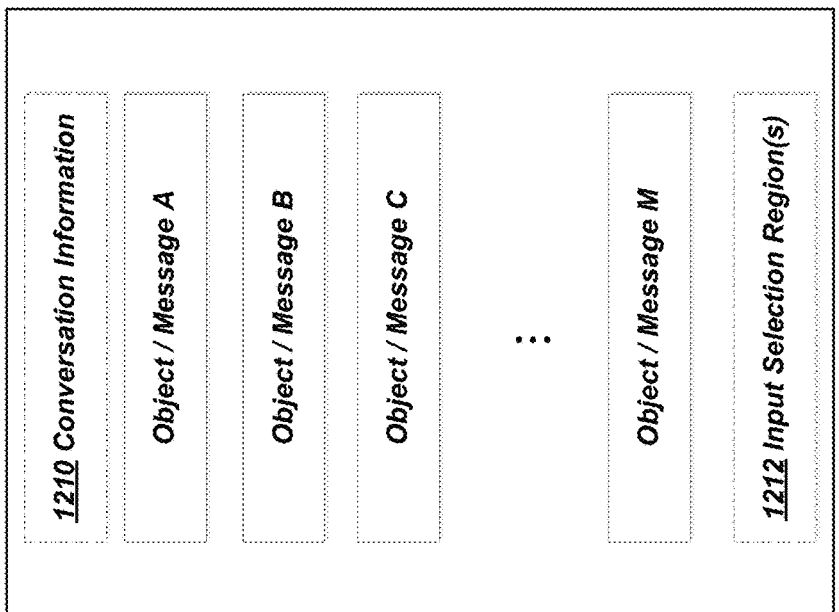

With reference to FIGS. 11B and 12E, the conversation view 1104 preferably shows all objects in the window starting at time $T_x$, for a period of duration D. In this example in FIG. 12E objects A, B, C, . . . M are visible in the conversation view 1104'. Note that the conversation view 1104' may include conversation information (e.g., status information, date information, information about the time of the current view, etc.). The conversation view 1104 may also display conversation information such as, e.g., the name of the conversation, and information about the time period being viewed. Some or all of the conversation information may be displayed in iconic form. (Exemplary icons are described in greater detail below.)

For direct objects in view (168, FIG. 4B), e.g., objects that correspond to messages (text), the conversation view 1104' displays at least some of the contents of the direct object (e.g., the message 170, FIG. 4B). For indirect objects in view (188, FIG. 4C), e.g., objects that refer to assets (such as images, videos, audio, etc.), the conversation view 1104' preferably displays (renders) at least some of the asset referred to by the indirect object. Different assets may be rendered in different ways on different devices, and the UI preferably adapts the rendering of each asset to the device on which it is being rendered. For some kinds of assets (e.g., photographs), the UI may initially present a reduced or partial view of the asset (e.g., a thumbnail), allowing the user to selectively render the asset in greater detail. For example, suppose that object C in the conversation view 1104' in FIG. 12E corresponds to an indirect object referring to a photograph (i.e., the asset pointed to by object C is a photograph). The initial view of the conversation (including object C) may show a reduced or partial version of the photograph. However, when that particular asset is selected by the user (in some manner, e.g., by tapping the partial view), the UI may render a different (possibly complete) version of the photograph (object C' in FIG. 12G). In some implementations, the initial conversation view may provide the view in FIG. 12F in which certain messages (e.g., assets) are rendered in a larger form than other messages (e.g., text messages). The UI may vary the manner it displays messages based on a number of factors, including the capabilities and type of device, the user's preferences (possible determined from the user's prior behavior), bandwidth or other connection measurements with the backend, etc. It should be appreciated that different and/or other criteria may be used to determine how to display messages (including assets), and that the examples given are not intended to be limiting in any manner.

In the conversation view 1104, in addition to the actual message(s) displayed, each message may have other information presented by the UI. For example, the UI may list with each message the name of the user that contributed (created/sent) that message to the conversation. This user information is preferably omitted from the user's self-conversation.

FIG. 12F shows an example of the UI's display of the conversation 1104' in FIG. 12E, with the additional conversation information provided. For the sake only of this example, assume that the conversation being viewed includes as participants user X, user Y, and user Z. Assume also that messages A through M were contributed to the conversation about 1 week ago (from the time of the viewing of the conversation in 1104"), with messages A and C being contributed by user Y, message B by user X, and message M by user Z. As shown in FIG. 12F, the conversation view of this message 1104" indicates (at the top) that the view is from "1 week ago", and each message indicates the user who contributed that message. If the contributor is the same as the user currently using the device then the UI may omit that user's name.

When a user selects a UI conversation view for a particular conversation, the devices needs to obtain the latest information about that conversation from the backend. The device may have some conversation information cached, but it may need to obtain some event information. Accordingly, the device (as a client 800) connects to the backend, e.g., using API 808 and via downstream connection/routing mechanism(s) 806 of backend connection/routing mechanism(s) 804 and requests information about the selected conversation. The request may include information about what conversation data, if any, the client already has for the selected conversation. The backend obtains the required data for the selected conversation from conversation data 830 and provides that data, via conversation/asset manager 814 to the client using upstream connection/routing 810. The backend may provide objects separately from asset data 832 for the selected conversation, so that the UI can begin to render a view of the conversation before all data are received. Indirect objects in the conversation may be rendered as placeholders for the actual assets they refer to until such time as the assets can be provided to the device. In some cases lower resolution versions of assets may be used to provide conversation placeholders while full assets are being provided to the client. Asset data 832 may be provided in a different channel from message data 831.

Once a user has viewed a portion of a conversation, the status of that portion of the conversation (i.e., the status of each object in that portion of the conversation) should be set to reflect that the messages associated with those objects have been read. This status information may be provided from the client to the backend conversation/asset manager 814 (with connection being made as described above). The conversation/asset manager 814 updates the conversation status in the conversation data 830 and propagates the updated status information to the user's other present devices.

In some embodiments the system may also advise other participants in the conversation that the user has viewed the messages. In those embodiments, the backend obtains a list of conversation participants and then sends status update information to each of their present devices.

Message Views

In preferred implementations, selecting (e.g., tapping) an object/message in a conversation while in the conversation view causes the UI to provide a message view 1110 of that message. This corresponds to the transition T9 in FIG. 11A. Selecting (e.g., tapping) on the message while in the message view returns the UI to the conversation view (transition T10 in FIG. 11A). The message view of a message may provide the message shown in the conversation or it may provide additional detail in and about the message. For example, the UI may provide date and time information corresponding to when the message was contributed to the conversation (preferably using the date and time when the backend obtained the message).

Figure 12J:
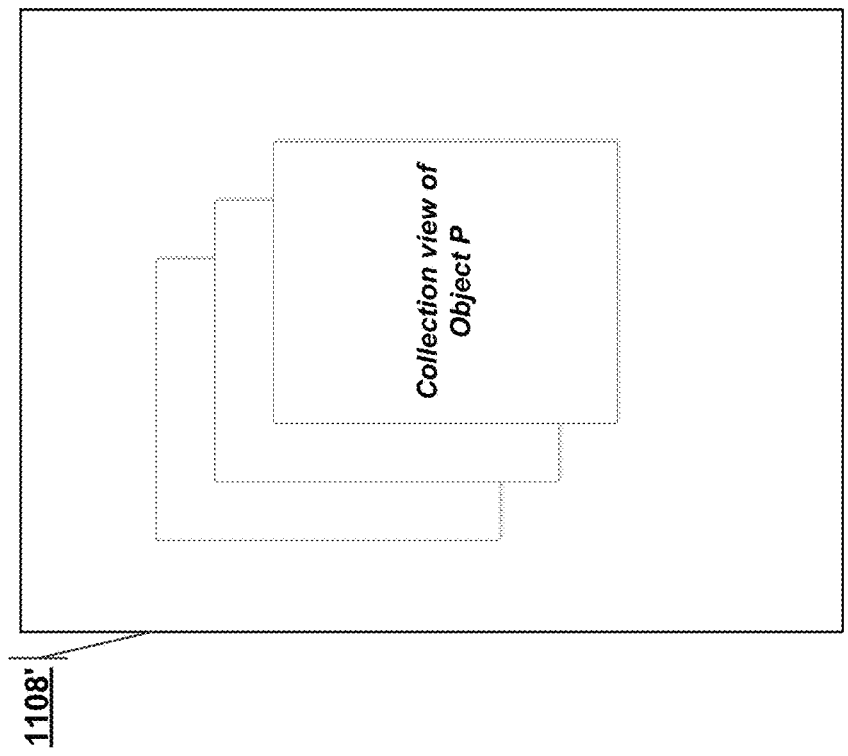
Figure 12I:
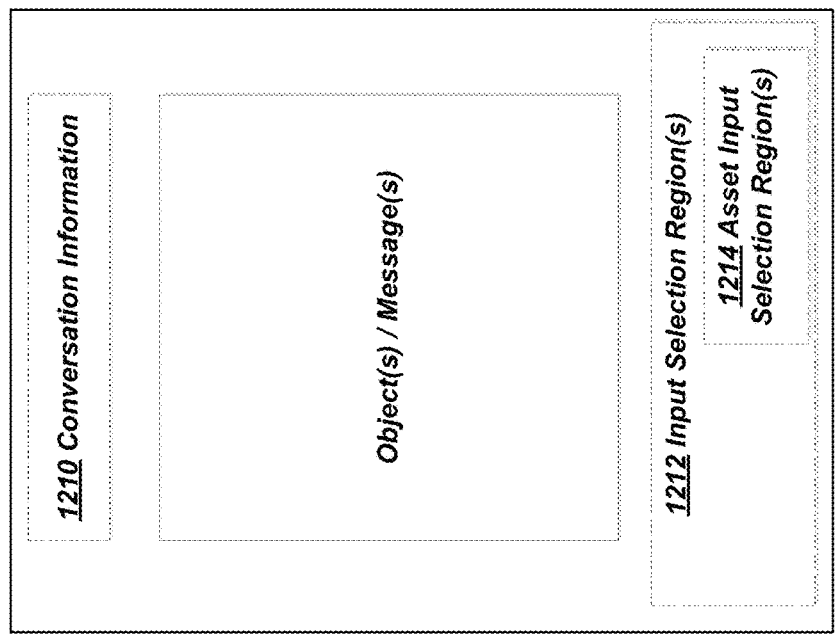

For example, as shown in FIG. 12I1, a message view 1110' of message W may display message W, possibly along with information about object W.

In the case of a message that comprises an asset (e.g., a picture or a video), selecting the message invokes the message view and essentially toggles between a partial rendering of that object (or a rendering of a smaller version of the object) and a complete rendering of that object. For example, tapping the thumbnail (object C) in the view 1104 in FIG. 12C causes the UI to render the entire object (object C" in a message view). Similarly, tapping the object C" while in the message view causes the UI to revert to the reduced view of the object in the conversation view (object C in FIG. 12C). It should be appreciated that expanding the view of a particular object while in the conversation view may cause other objects to be displaced from view.

Preferably the device already has the message information it needs to provide a message view of a message at the time the user makes the selection. Since the transition to the message view is reached by the user selecting a message, the device already has the object associated with the message. However, for some indirect objects the device may not already have the associated asset (or all of the associated asset). In such cases, the device may request the asset via a downstream connection to the backend. The backend (e.g., using the conversation/asset manager mechanism(s) 814) may then retrieve the required asset from the asset data 832 and send the asset to the client Engaging in Conversation The conversation view 1104 may also include an input region (which may or may not be marked) in which they user may input text, when appropriate. The conversation view may also provide users with the ability to include assets in a conversation. Thus, as shown in FIG. 12I, the input selection region(s) 1212 may include text input region (described above) that, when selected invokes a (virtual) keyboard, and one or more asset input/selection regions 1214 that may be used to contribute assets to the conversation. The asset input/selection region(s) 1214 may be represented as icons which, when selected, invoke an interface to allow creation and/or inclusion of assets in the conversation.

For example, the asset input/selection region(s) 1214 may include a photograph selection region (e.g., depicted as an icon) which, when selected, invokes an interface that allows the user to create a photograph (e.g., using the device on which the UI is running) or to select an existing photograph (stored on the device or possibly elsewhere). The photograph created or selected by the user becomes an asset and is included in the conversation.

As another example, the asset input/selection region(s) 1214 may include a video selection region (e.g., depicted as an icon) which, when selected, invokes an interface that allows the user to create a video (e.g., using the device on which the UI is running) or to select an existing video (stored on the device or possibly elsewhere). The video created or selected by the user becomes an asset and is included in the conversation.

As another example, the asset input/selection region(s) 1214 may include an audio selection region (e.g., depicted as an icon) which, when selected, invokes an interface that allows the user to create an audio recording (e.g., using the device on which the UI is running) or to select an existing audio (stored on the device or possibly elsewhere). The audio created or selected by the user becomes an asset and is included in the conversation.

A particular implementation may provide for only some of the types of assets described (or for different types of assets).

Some or all of the asset input/selection region(s) 1214 described above may be combined. For example, the UI may provide on asset input/selection region 1214 for all kinds of assets, where selection of that region invokes an interface to various other supported asset selection regions.

It should be appreciated not all user devices will be capable of creating all kinds of assets (e.g., not all devices will have a camera or a video camera or an audio recorder), in which case the UIs running on those devices preferably will not display creation options for assets (they may, however, still display options for selection of existing assets).

When a user contributes a message (e.g., text, a photograph, a file, etc.) to a conversation on a particular device, that message needs to be sent to the backend and to propagate (via the backend) to other present devices for all participants in the conversation. With reference to FIGS. 2A-2B and 8A-8E, the client/device, possibly using the API 808 connects to the backend 108 and sends the message downstream to the backend. The downstream connection may use the downstream connection/routing mechanism(s) 806 which may include and use load-balancing mechanism(s) 838. Depending on the type of message (i.e., whether or not it is an asset), the backend may process and store the message differently. In the case of a text message (that is part of a direct object), the message may be stored in message data 831. If the message comprises an asset, then the asset may be stored in asset data 832. In either case, the conversation information is updated to reflect the new message.

In preferred implementations, the message is examined and possibly indexed (e.g., using index mechanism(s) 846 (FIG. 8D) and index data 848 may be updated accordingly. The index data 848 may aid, e.g., in future searches.

The backend 108 needs to update the conversation on all present devices of all participants in the conversation. The backend may obtain or determine a list of all devices of all participants in this conversation and then ascertain their presence (using, e.g., presence mechanism(s) 836). The new contribution to the conversation is then sent to each present device. The backend may process asset messages differently from non-asset messages. The backend preferably sends an object to the each present device for all other participants in the conversation. For objects that include an asset (i.e., indirect objects), the asset may be sent after the indirect object. In this manner the timeline of each conversation may remain consistent on present devices, where indirect objects may act as placeholders until the asset reaches the devices. In presently preferred implementations, devices are provided with direct and indirect objects and the devices may request the assets referred to by the indirect objects. In other words, in some cases, assets are not automatically pushed to devices, instead the receipt of an indirect object effectively notifies a device that an indirect object is part of a conversation. The device may the request that indirect object (e.g., using the location information 194 in the asset metadata 190 (FIG. 4C).

The upstream connection/routing mechanism(s) 810 may use different mechanisms for assets than for other objects. Where devices support proprietary protocols, these may be used to push information upstream to the devices.

In some implementations the backend may maintain some persistent connections with some devices.

Navigation

In a presently preferred implementation, navigation within and from the conversation view 1104 is as follows:
Swipe from left to go back to market square. (This corresponds to transition T2 in FIG. 11A.)
Pinch together to open collection view of an object. (This corresponds to transition T7 in FIG. 11A.)
Swipe from right to open a meta view. (This corresponds to transition T3 in FIG. 11A.)
Tap (or long tap) to open one message in the message view. (This corresponds to transition T9 in FIG. 11A.)

The pinch action required to open a collection is a two-hand gesture. Although going to collection is considered a rare/advanced action, it should be appreciated that, in general, navigation of the UI preferably requires only one hand.

Transitions and Navigation within and from the Collection View

The collection view 1108 may be reached from the conversation view (as described above). An exemplary collection view 1108 is shown in FIG. 12J. In a presently preferred implementation, navigation from the collection view 1108 is as follows:
Tap on empty space/close or pinch out to go back to conversation view. This corresponds to transition T8 in FIG. 11A.

Navigation within the collection view 1108, if needed, depends on the type of information being displayed. In a presently preferred implementation no navigation is provided within a collection view.

Transitions and Navigation within and from the Meta View

The meta view 1106 may be reached from the market square view or the conversation view (transition T3, as described above). In a presently preferred implementation, navigation from the meta view 1106 is as follows: Swipe from left to go back to market square view.

In preferred implementations, the meta view provides the user with information about the other participant(s) in a conversation.

The information about other users may include one or more of the following items of information (which may correspond to or be derived from the user's public information 1004, FIG. 10A):
Name
Current location if shared with local time
Phone/s
email address/es
birthdate (with optional reminder set to off by default)
any other information shared by the user:
user names in social networks
address The meta view from the user's self-conversation provides the user with information about herself and may also include some of the user's internal (non-public) information 1006.

The meta view is located on the right of the conversation view and can be accessed by horizontal swipes.

Figure 13B:
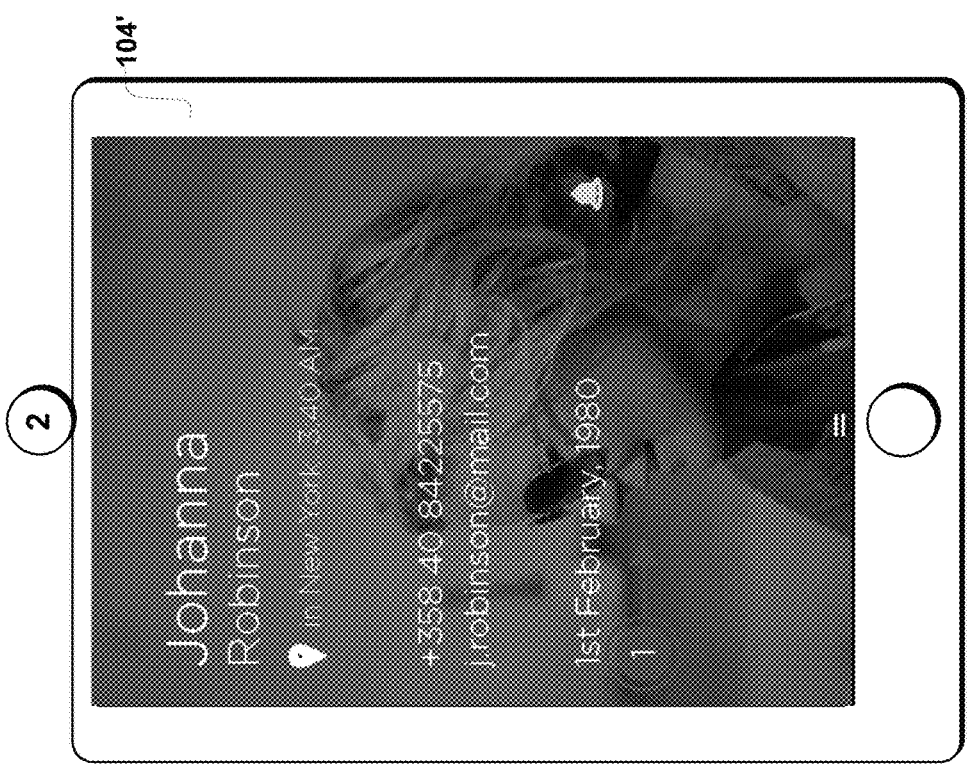
Figure 13A:
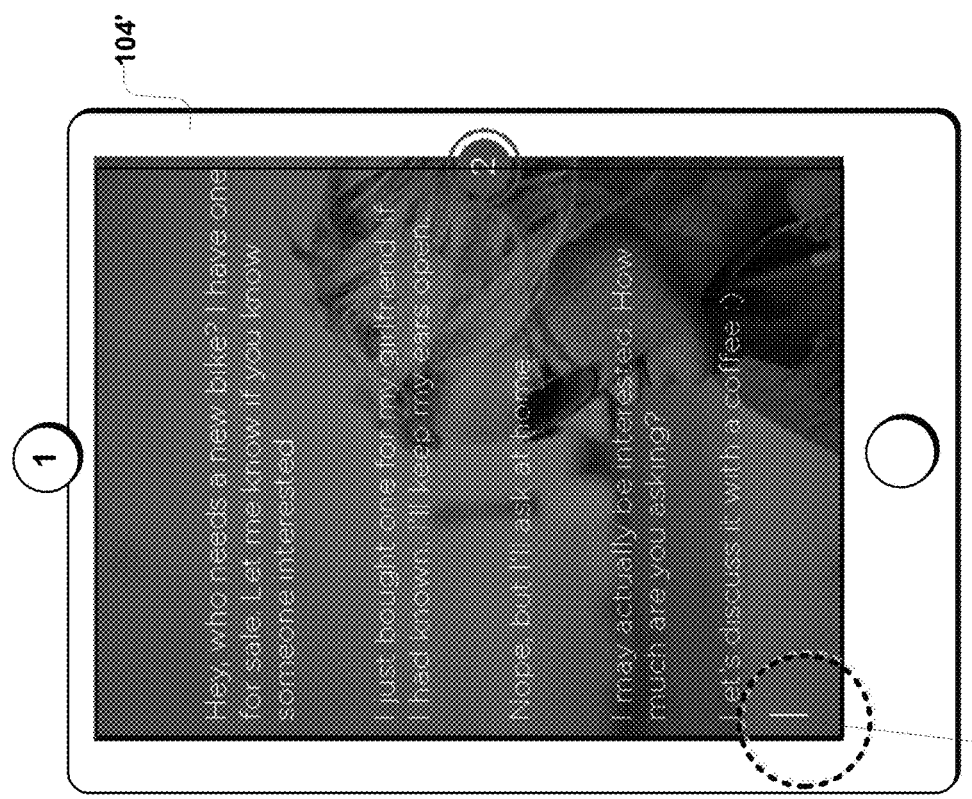

FIGS. 13A-13B show a conversation view and a corresponding meta view, respectively, on the display of device 104'. As a notational convention, each view may be numbered, as shown in the drawings, with a number (or letter) in a circle above the view. Thus, in this example, the view in FIG. 13A is view number 1, and the view in FIG. 13B is view number 2. These notations are provided to aid in the description, and, as those of ordinary skill in the art will realize and appreciate, upon reading this description, these notations and numbers are not limiting of the scope of the system. The numbers "1" and "2" in circles with arrows (shown on the views) depict the action (e.g., movement) required by the UI to transition between the two views. It should be appreciated that these arrows, circles, and numbers are not part of the actual view displayed, and are provided here as a notation to aid in this description of the UI. Thus, swiping the view in FIG. 13A to the left, as shown by the arrow, will cause the UI to transition to view 2 (FIG. 13B). Similarly, swiping the view in FIG. 13B to the right will cause the UI to transition to view 1 (FIG. 13A).

Figure 13E:
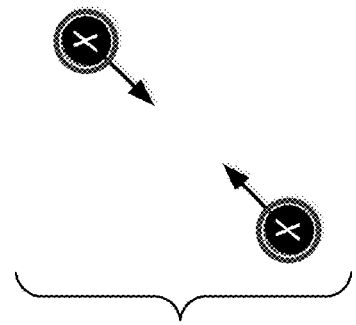
Figure 13D:
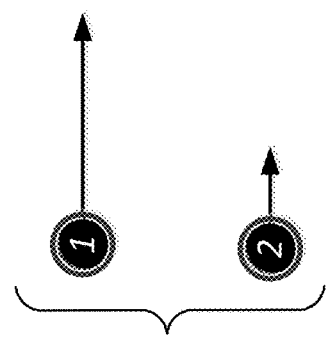
Figure 13C:
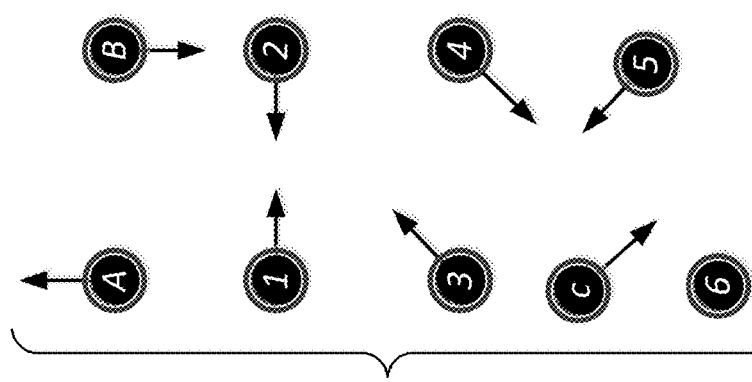

FIGS. 13C-13E summarize the notation used with regard to the UI. As shown in FIG. 13C, a dark circle with a letter or number is surrounded by a second circle. The circle represents an action to be taken by the user, and the number or letter in the inner circle specifies a UI view that may result from that action. A circle with no arrow corresponds to a touch or tap of the screen. Thus, e.g., the circle with a "6" inside corresponds to tapping the touch screen to go to the 6th UI view. When a circle has an arrow, this means that the user should touch the screen and, while touching the screen, drag in the direction of the arrow. In some cases the user may need to drag only a short distance, whereas in other cases the user may need to drag further, as may be reflected in the length of the arrow (see, e.g., FIG. 13D, where step "1"—the circle labeled "1"—has a longer arrow than step "2"). Some user interactions with the UI may require two or more simultaneous touches (e.g., a pinch, as shown in FIG. 13E, where the labels of the two circles are the same, in this case "X"). As noted, to the extent that these labels are shown on any drawings herein, they are merely provided as an aid to the description and are not part of what would be shown in any UI, nor are they intended to limit the description in any way.

When the inside notation circle has no number or letter, this means that the user touches or types something on the current view (e.g., using a virtual keyboard), but does not transition to another view.

Recall (e.g., from FIGS. 12A-12B and the related discussion) that the UI may provide an input region. In a present implementation, the input region is shown in the UI with a vertical bar (1305 in FIG. 13A). User selection of the vertical bar enables text input by the user via the UI. For example, when the user selects the vertical bar (or the input region in some other manner), the UI may present the user with a virtual keyboard on the display to facilitate text input.

FIGS. 13A-13B show a photograph in the background. As will be discussed below, this photograph is preferably a photograph provided by the user (e.g., picture 1012, FIG. 10A in the user's public information 1004).

The exemplary meta view in FIG. 13B includes the user's name ("Johanna Robinson"), location ("New York"), time at location (3:40 AM), phone number, email address, and date of birth. The system obtains some of this information from the user's public information 1004, and may determine some, e.g., from information provided by the user's active device(s).

Color Model

Figure 13F:
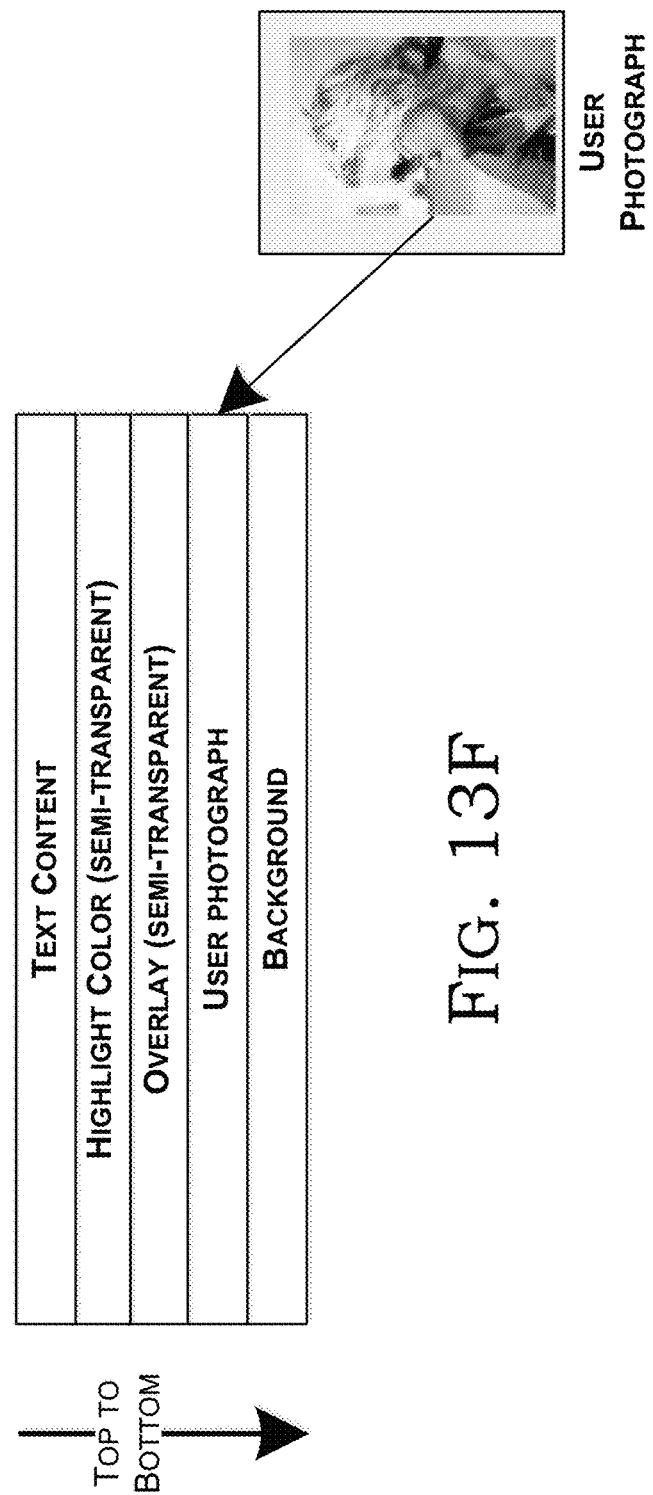
Figure 13G:
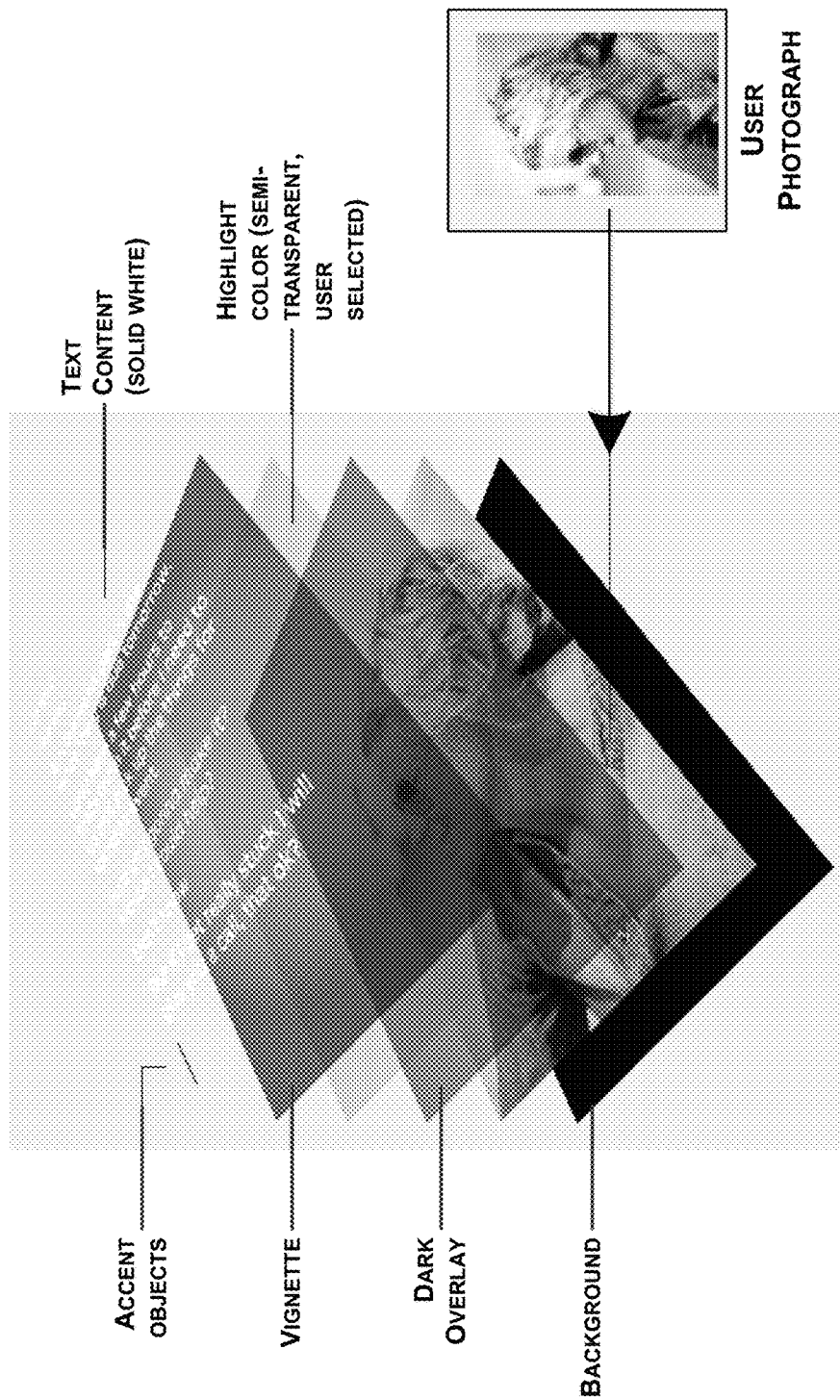

As can be seen in the examples in FIGS. 13A-13B, the UI preferably presents information over a customizable background, including a photograph or picture. With reference to FIGS. 13F-13G, each image presented by the UI may be formed from multiple layers, preferably five layers as summarized in the following table:

| | Layer | Description |
|---|---|---|
| 1 (top) | Presentation | The top layer is the layer on which information (e.g., text) is presented. The layer is preferably formed using a vignette (radial gradient outwards). In a present implementation, with the bottom color being black, text/content is preferably solid white. Accent objects on the top layer are preferably solid, preferably using the same color as the highlight color (2nd) layer. |
| 2 | Highlight color | This layer is semi-transparent. The color is preferably user selected, preferably from a palette of colors. In a presently preferred implementation, eight colors are offered in the palette. |
| 3 | Dark Overlay | This layer is semi-transparent, and, in a present implementation, preferably black. The color of this layer preferably matches that of the bottom layer. |
| 4 | Picture | This layer contains a picture, preferably corresponding to the user's photograph (e.g., stored with picture(s) 1012 in the user's public information 1004, FIG. 10A). Preferably the picture is a picture of the user, but it may be any picture that the user chooses. When provided, the picture may be desaturated. |
| 5 (bottom) | Background | The bottom layer is preferably a dark solid color, preferably solid black |

While various layers are shown here, it should be appreciated that all of the information may be presented using only some of the layers shown, including using only a single layer (e.g., the presentation layer described above). It should also be appreciated that not all layers need be used in every presentation. For example, if a user does not provide a picture, then the UI may omit the picture layer.

FIG. 13G shows an example image formed from a user photograph and five layers.

Transitions and Navigation within and from the Message View

Recall that the message view may be reached from the conversation view (transition T9, as described above). In a presently preferred implementation, navigation from the message view 1110 back to the conversation view is as follows: Tap (or swipe to bottom) to go back to conversation. Navigation within the message view (T15), if provided, may depend on the type of message.

Conversation Time Stamps

As a conversation is a time-ordered sequence of objects/events, it is desirable to show the time associated with the current view of each conversation. This may be shown, e.g., in the conversation information in FIGS. 12C-12D. Instead of (or as well as) actual time, various icons or time stamps may be used by the UI to depict time information. This conversation information may be overlaid on the conversation view.

For time/date information in the conversation information, the overlay is preferably formed from an absolute time/date value and a relative value indicating how old the message is (as shown, e.g., in the time stamps/icons in FIG. 14A).

In preferred implementations, the UI uses a clear clock face with black hands for daytime and a darkened (or black) clock face with white hands for nighttime. For example, as shown in FIG. 14B, the system may use a clear or white clock icon with black hands to depict times between 7:00 AM and 6:00 PM, and a black clock icon with white hands to depict times between 6:00 PM and 7:00 AM. Thus, e.g., as shown in FIG. 14C, a message time stamp would be depicted differently if the message was sent at 2:55 AM or 2:55 PM.

Figure 14E:
Figure 14F:
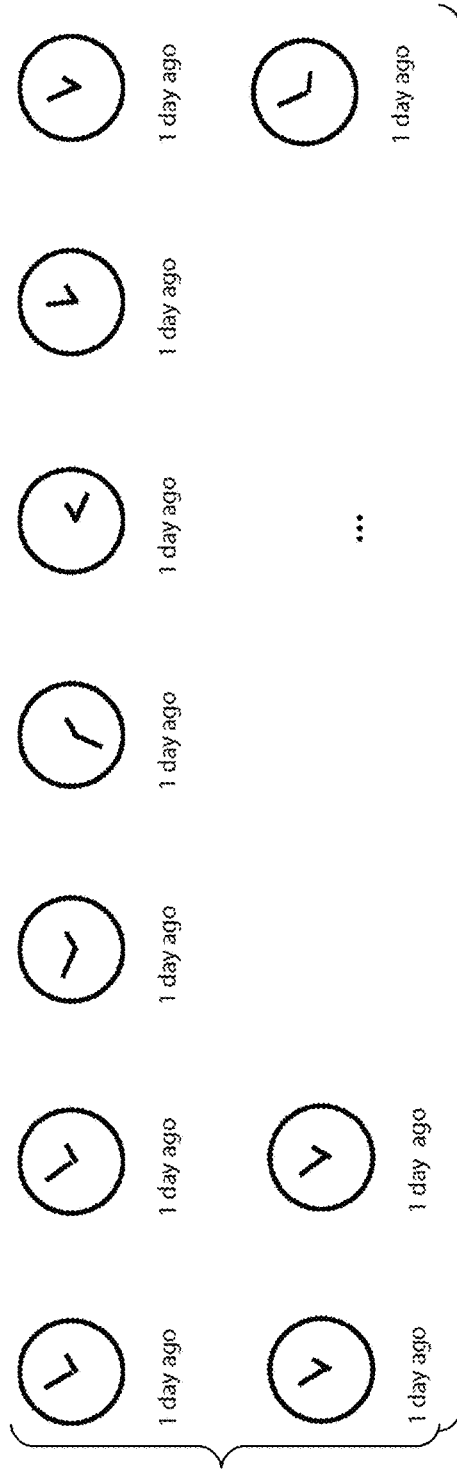
Figure 14G:
Figure 14H:
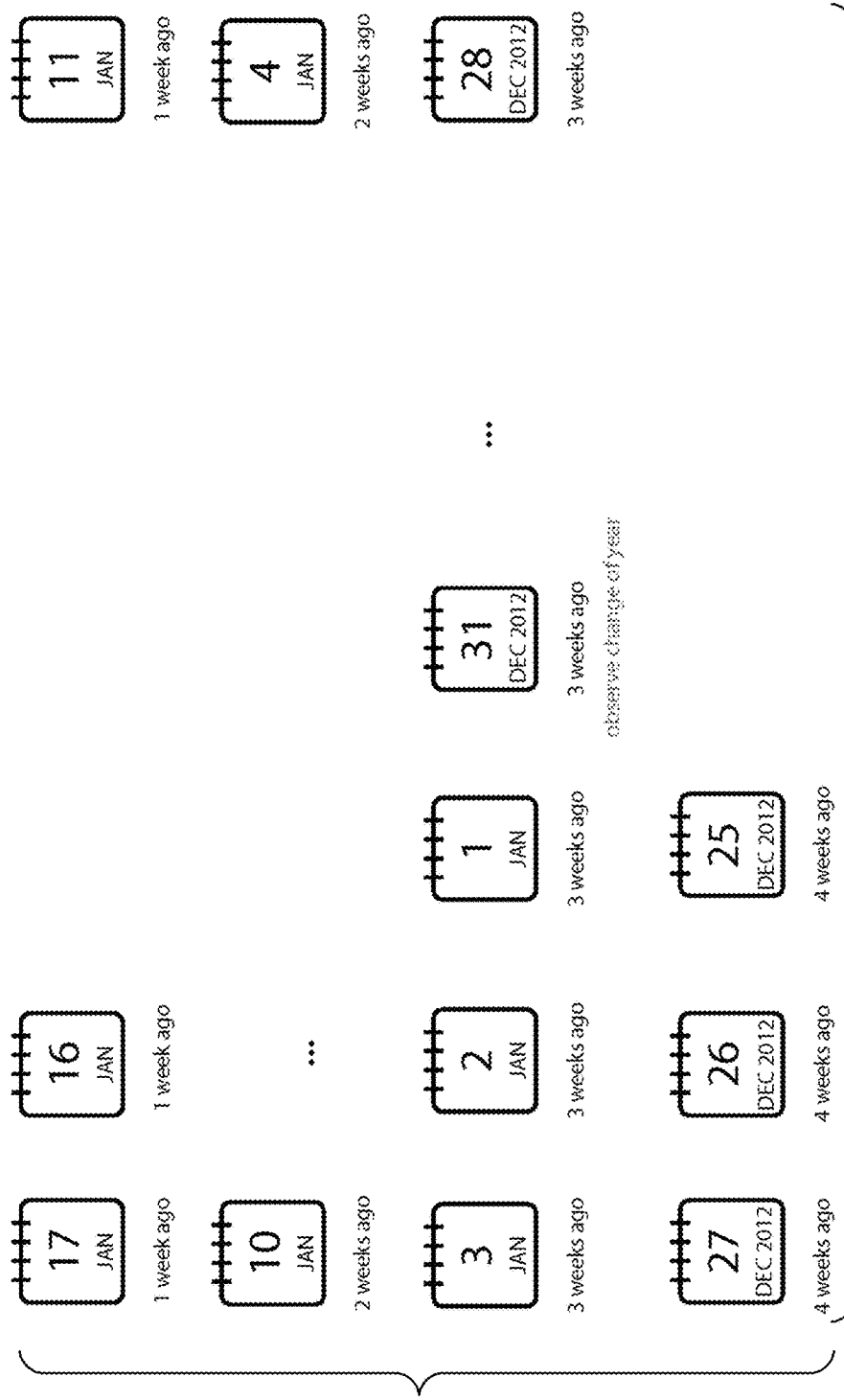

FIG. 14D shows exemplary timestamps (icons) used by the UI for messages sent within the past hour. FIG. 14E shows exemplary timestamps (icons) used by the UI for messages sent more than one hour ago, but within the past twenty-four hours. FIG. 14F shows exemplary timestamps (icons) used by the UI for messages sent more than twenty four hours ago, but within the past forty eight hours. FIG. 14G shows exemplary timestamps (icons) used by the UI for messages sent more than forty eight hours ago, but in the past seven days. FIG. 14II shows exemplary timestamps (icons) used by the UI for messages sent within the last 7 days to 31 days (or 28 or 30 days, depending on the month). FIG. 14I shows exemplary timestamps (icons) used by the UI for messages sent within the last one to 12 months. FIG. 14J shows exemplary timestamps (icons) used by the UI for messages sent more than 1 year ago.

It should be appreciated that these icons/timestamps are exemplary, and the different and/or other timestamps and icons may be used by a UI. In addition, a UI may provide more precise date and time information for conversation elements, regardless of their age.

It should be appreciated that there may be many versions or implementations or variations of the UI, and different variations and implementations are contemplated herein.

Aspects of some of these various processes/capabilities are described below for an exemplary UI and architecture.

Creating a Two-User (One-to-One) Conversation

Figure 15A:
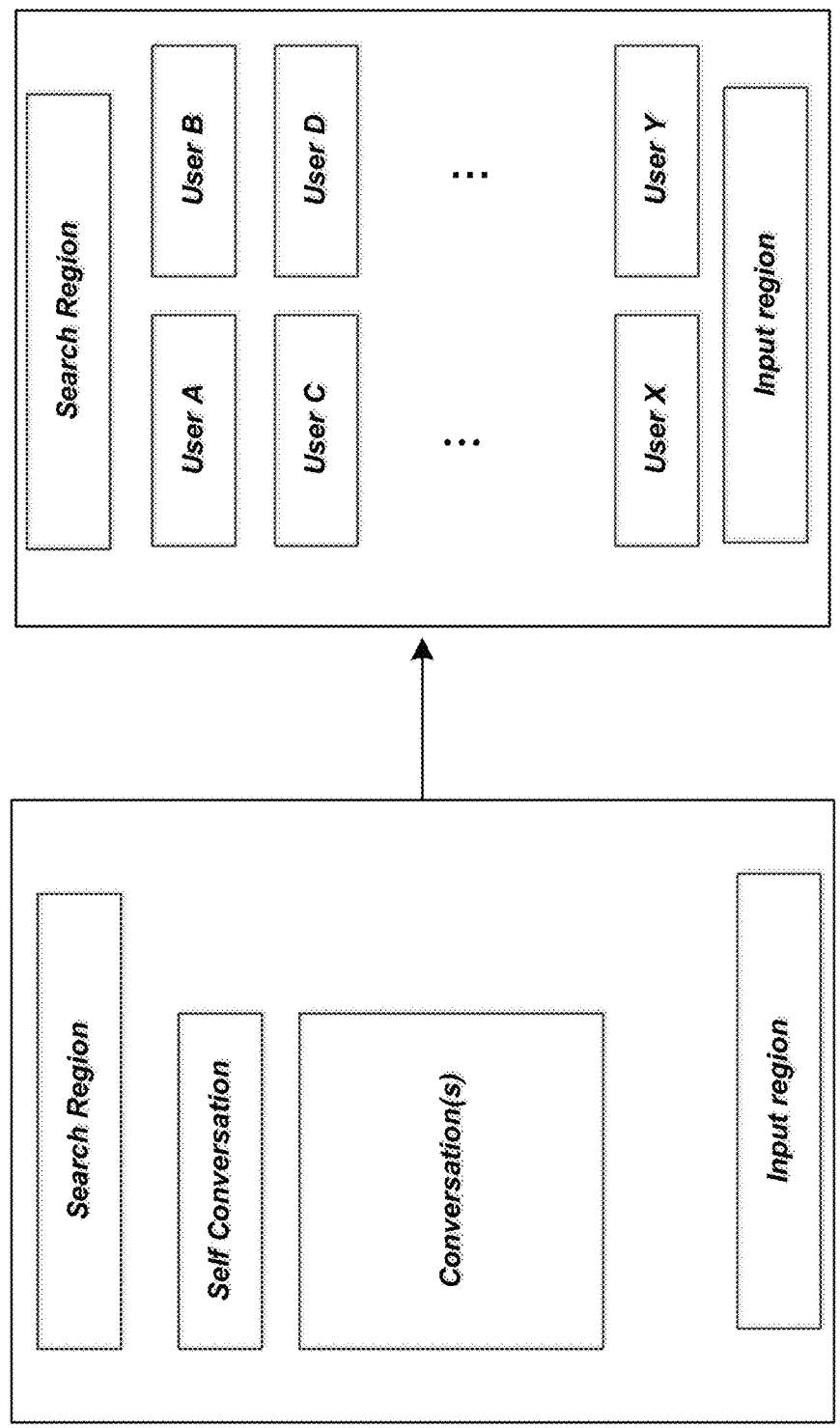

An exemplary process of creating a new one-to-one conversation was described above with reference to FIG. 7A. FIG. 15A shows an exemplary series of UI interactions to create a two-user (one-to-one) conversation. The images shown in FIG. 15A are exemplary of a UI that would appear on the display of a user's device (e.g., touch screen 902 of device 104-1 in FIG. 9A). In order to simplify the drawings, the devices are not shown.

In the first view (on the left side of the drawing), the user performs a UI interaction to transition from the user's market square (home) view screen to a search screen (on the right side of the drawing). The search screen may list other users, e.g., by showing each user's name and a picture associated with each user. The list of other users may be ordered in some manner, e.g., alphabetically, based on recency of interaction, or on some other basis. The user selects another user to have a conversation with, e.g., by tapping that other user's name or picture on the search view. This process of finding the other user corresponds to S702 in FIG. 7A. Once the user selects the other user, the system (backend) performs the other steps shown in FIG. 7A to determine if the two users can converse (at S704), and if so, to determine whether or not a conversation between them already exists (at S708). Depending on whether or not a conversation already exists, the system may determine whether to start a new conversation or use an existing one (S709, S710, S712).

Creating a Group Conversation

An exemplary process of creating a new group conversation was described above with reference to FIG. 7B. A group conversation may be formed by adding one or more users to an existing conversation.

Adding a User to a Conversation

Figure 15B:
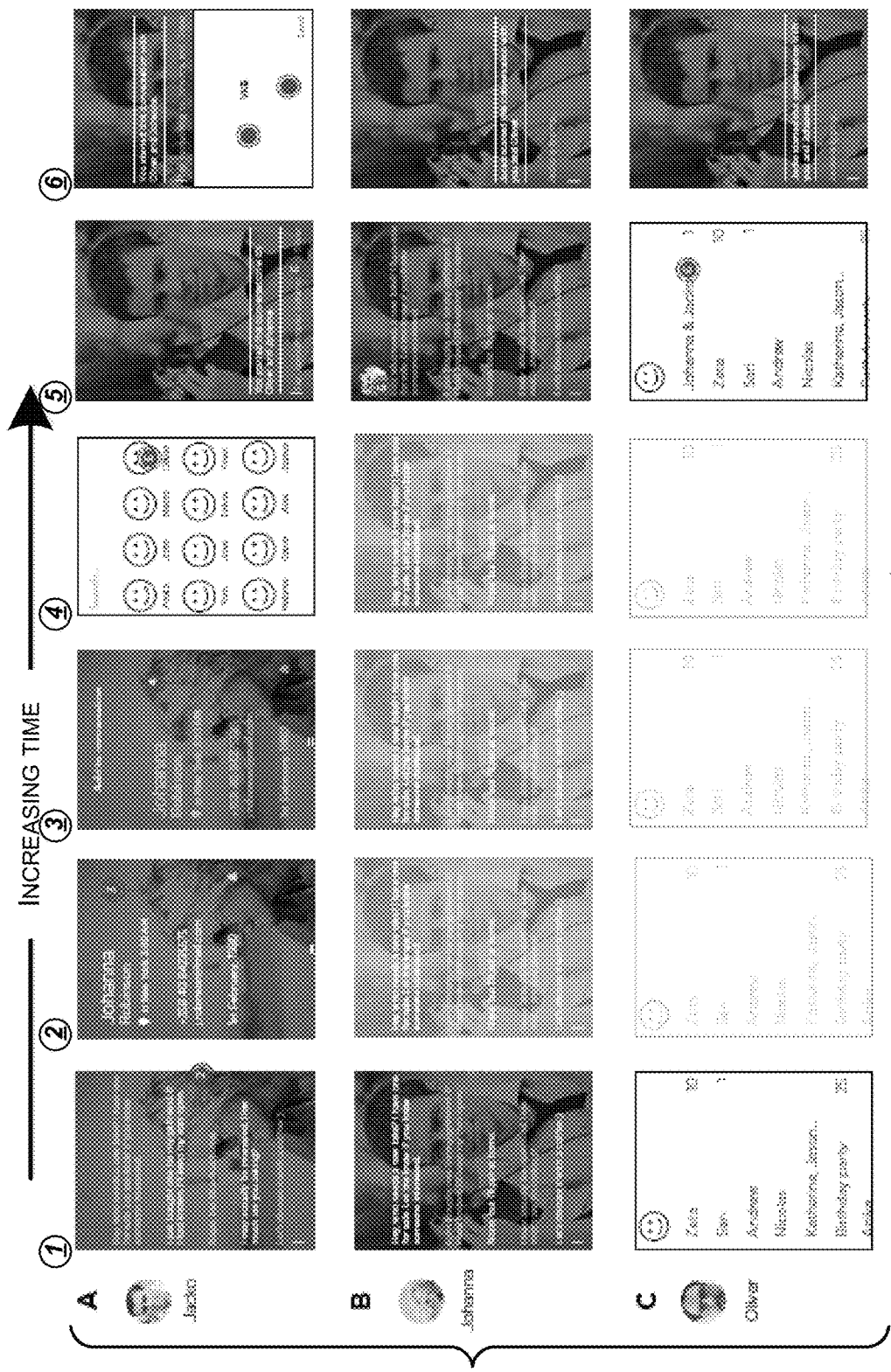
Figure 15C:
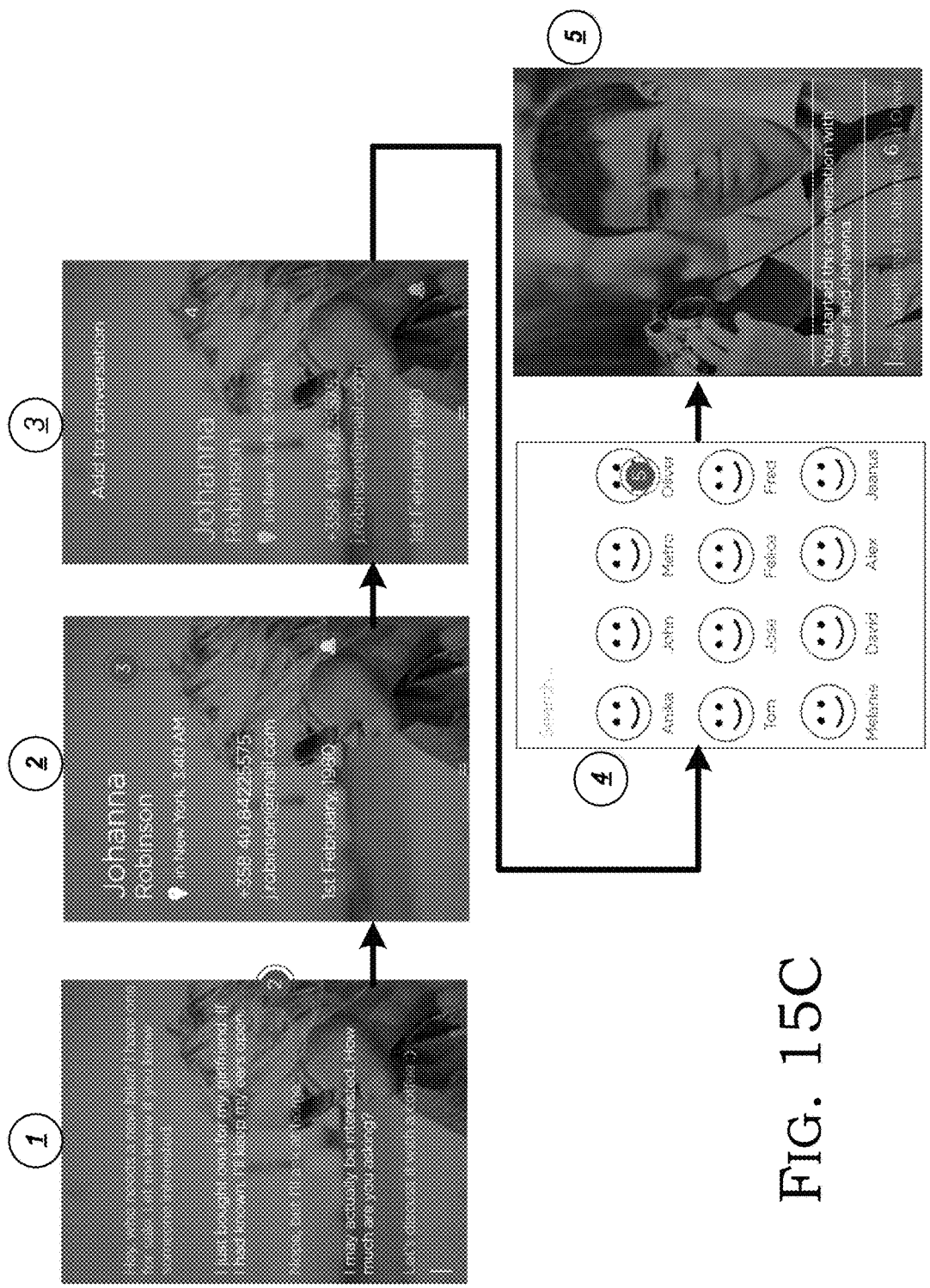

An exemplary process of adding a user to a conversation was described above with reference to FIG. 7C. FIG. 15B shows an overview of an exemplary series of UI interactions to create a group conversation by adding a user (user C) to a two-person (one-to-one) conversation (between users A and B). FIG. 15C shows the actions of user A in the conversation of FIG. 15B. In the example in FIG. 15C, two users, A and B, are involved in a one-to-one conversation (view #1). In view #1 user A uses the UI to get a meta view of user B (view #2). Specifically, as shown by the notation on view #1, user A swipes the screen to the left to display the meta view (view #2). In view #2, user A may interact with the UI to initiate the process of adding another user to the conversation. Specifically, in view #2, user A swipes the screen downwards to expose an option to add a user to the conversation (view #3). In view #3, user A swipes the screen downwards to bring up a search screen (view #4) from which the user can select other potential participants. The search screen (view #4) may list the other users in a number of ways. In a presently preferred implementation, a list of user names and pictures is provided. The names are the user names, and the pictures may be smaller versions of the corresponding user's public pictures (1012 in FIG. 10A). In this example, user A selects the other user "Oliver", e.g., by touching or tapping the screen over the name or picture of "Oliver," whereby the user "Oliver" is added to the conversation. This selection by user A causes the UI to transition to view #5, showing an indication to user A that he started a conversation with the other two users ("Johanna" and "Oliver").

With reference to the screen views in FIG. 15D, when user A ("Jacko") starts the group conversation with the other two users, each of the other two users is notified (in view #6). Thus, in this example, Johanna's UI displays a message "Jacko started this conversation with you and Oliver." And Oliver's UI displays a message "Jacko started this conversation with you and Johanna." It should be understood that the system is not limited by the form of these notifications.

Although only one screen view is shown for each user in this conversation, it should be appreciated that the conversation information will preferably be uploaded on all of the active devices of all users involved in this conversation.

As noted, this process may use the flow described in FIG. 7C, and user A's (Jacko's) interactions with the UI may therefore correspond to some of the acts described in FIG. 7C. For example, user A's selection of Oliver from the search view #4 may correspond to act 724 in FIG. 7C, ("User U1 elects to add user $U_q$ to an existing conversation with users U1 ... Uk"). In this example user A is U1 and user "Oliver" is $U_q$, and the existing conversation is with users A (Jacko) and B (Johanna). Once user A (Jacko) makes his selection of Oliver, the backend may perform the determination in S726 in FIG. 7C to determine whether Oliver can join the conversation. In this example Oliver was able to join the conversation and the backend may have then determined (at S730 in FIG. 7C) whether a conversation between Jacko, Johanna, and Oliver already exists. In this example, no such conversation already existed, so the system started a new conversation between them (at S732 in FIG. 7C). Had a conversation between the three users already existed, the backend may have given them an option to switch to that conversation (at S731, S734 in FIG. 7C).

The conversation created in this example, may correspond to the example shown in FIG. 7E, where user A adds user C to a conversation at time $T_1$.

Figure 15E:
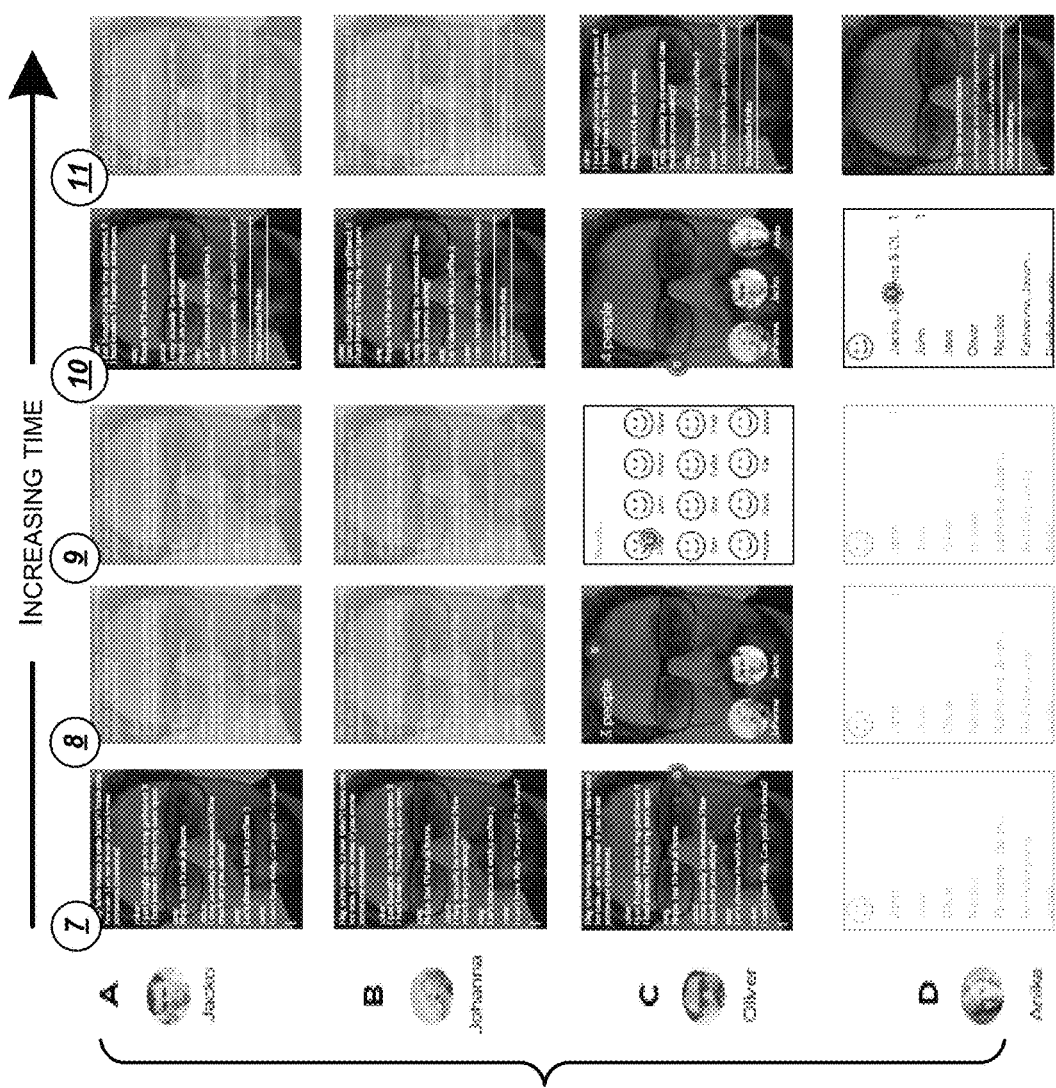
Figure 15F:
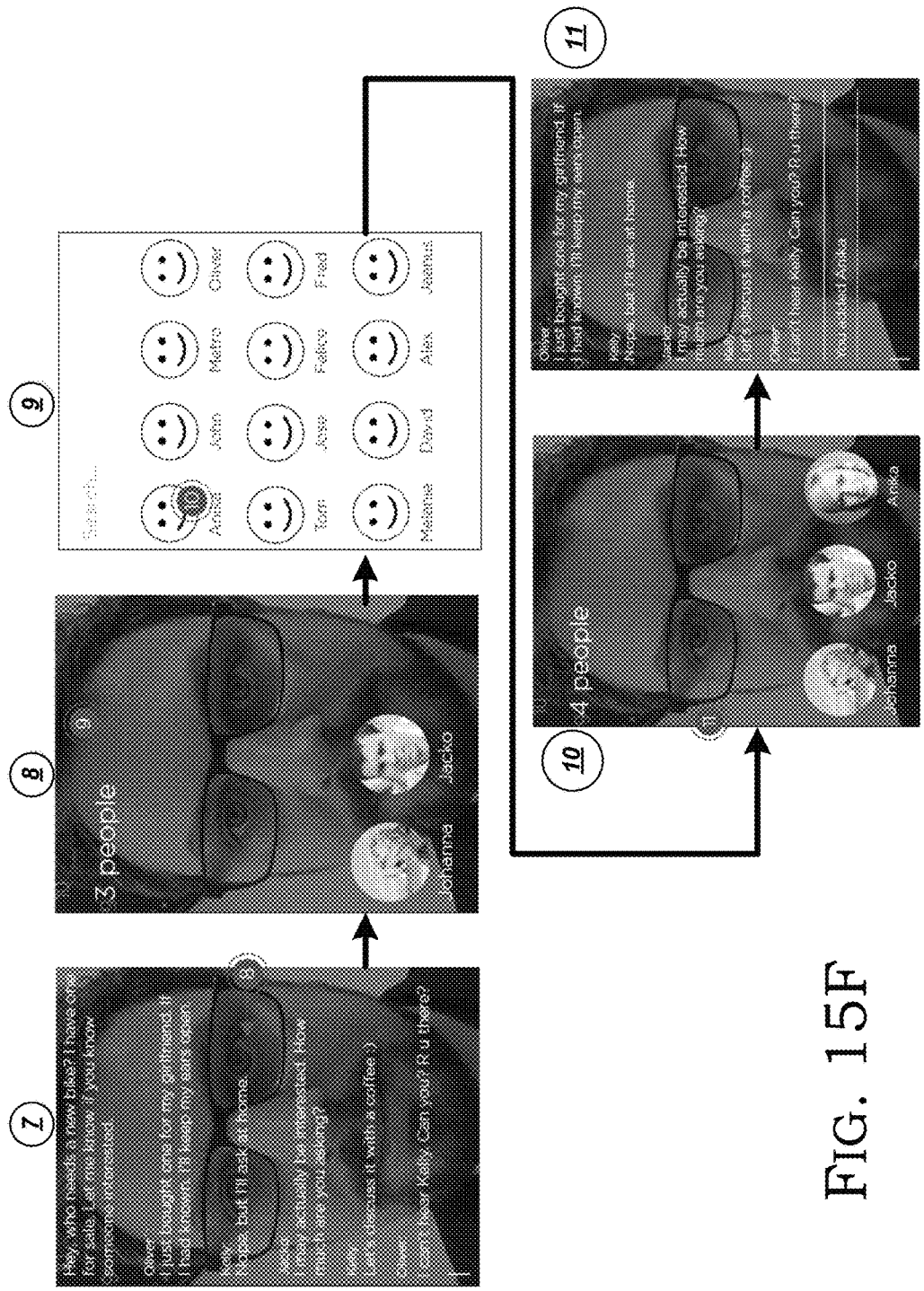
Figure 15G:
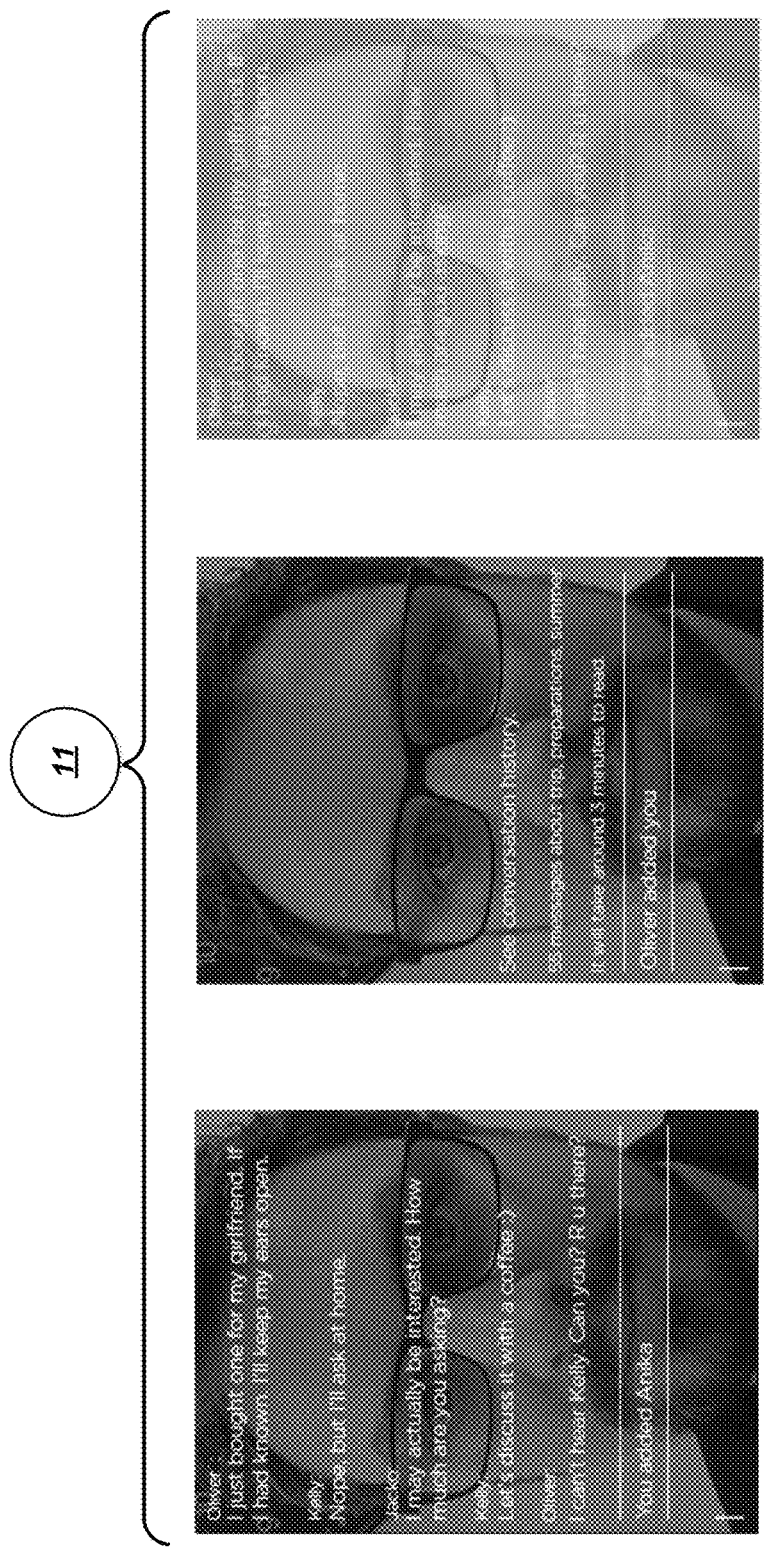

FIG. 15E shows the overview of a group conversation with users A (Jacko), B (Johanna), and C (Oliver), in which user C (Oliver) adds a forth user D (Anika) to the conversation. FIG. 15F shows some aspects of user C's activities in the conversation of FIG. 15E. In view #7, user C (Oliver) swipes his screen to the left to get a meta view of the conversation (view #8). This meta view (#8) shows the other two users in the conversation A (Jacko) and B (Johanna). User C (Oliver) swipes his screen downwards to invoke the search view screen (view #9) in the UI to allow him to search for another user. The user search screen (view #9) presents other users, e.g., in the form of pictures and names (in a similar manner to that shown in FIG. 15C, view #4). User C (Oliver) then chooses another user, D (Anika) and adds her to the conversation. Oliver is then advised (in view #10) that he added Anika to the conversation. As shown in FIGS. 15E and 15G, the other users are similarly advised that Anika was added to the conversation, and Anika is advised that she was added to the conversation by Oliver.

The process of user C adding user D shown above may use the flow described in FIG. 7C may correspond to the example shown in FIG. 7E, where users C adds user D to a conversation at time $T_2$.

As can be seen in the examples shown in FIGS. 15C-15F, various views include a background image or photograph. The preferred formatting of this image was described above with reference to FIGS. 13C-13D. In a two-user conversation, the UI preferably provides each user an image of the other user in the conversation. Thus, e.g., when user A (Jacko) is in the one-to-one conversation with user C (Johanna), then the UI presents Johanna's image to Jacko, and vice versa. The image presented is selected from the user's picture(s) 1012 in the user's public information 1004. In preferred cases each user will have only one picture. In a multi-user conversation, the UI preferably presents each user is presented with the image of the user who most recently contributed to the conversation. Thus, e.g., as shown in FIG. 15E, user C (Jacko) is the last user to contribute to the conversation, so the UI presents Jacko's image in the background of the conversations of the other user's.

When the conversation is idle for a certain period of time, the UI causes the background image to fade. Thus, e.g., as shown in FIG. 15E, in views #8 and #9, Oliver's image is dimmed for the other users. After Oliver adds user Anika to the conversation, the other user's background images are un-dimmed (view #10). This is because the conversation is active again (announcing the addition of Anika by Oliver).

Figure 15H:
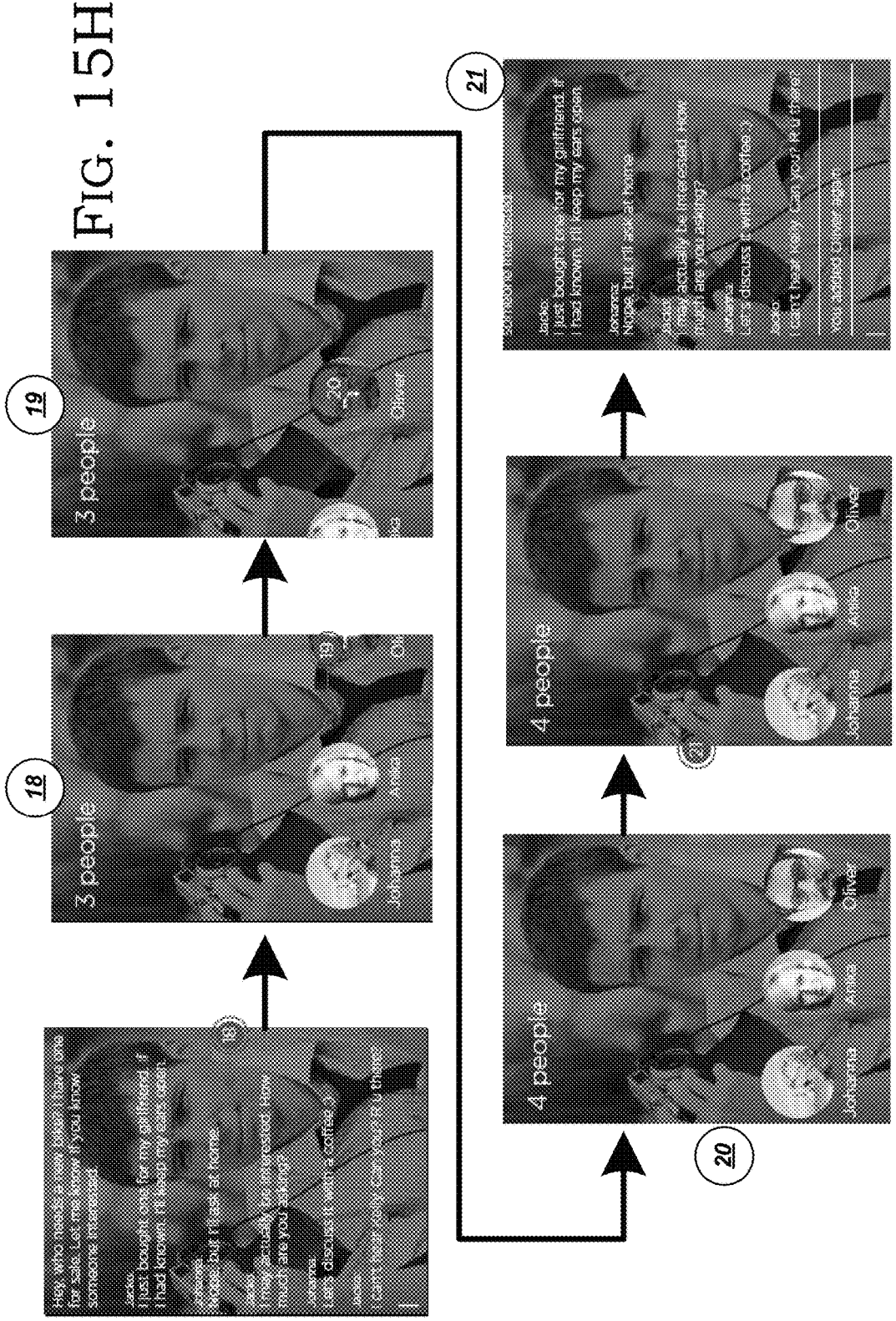
Figure 15I:
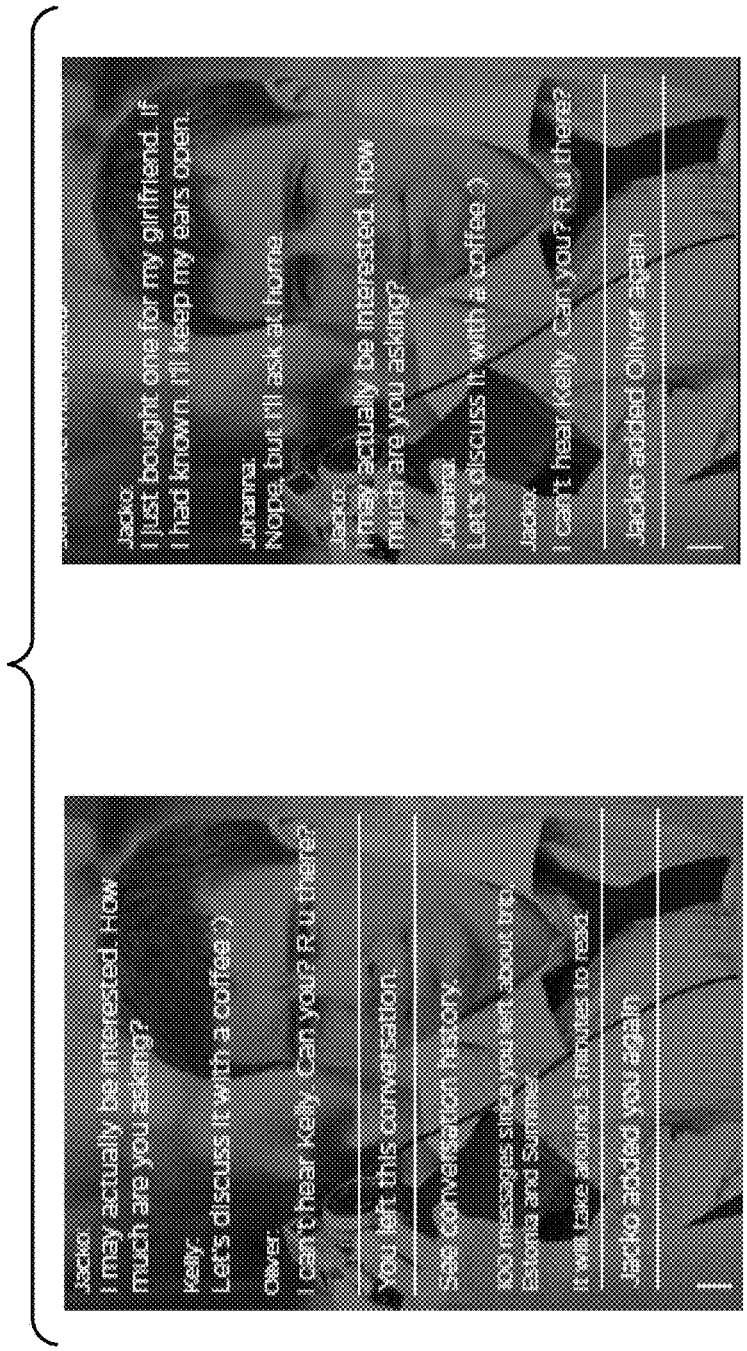

FIG. 15H shows an example in which a user is added back into a conversation. The other users are notified, as appropriate, as shown in FIG. 15I. This example conversation corresponds to the example shown in FIG. 7E, in which user C is added back into the conversation at time $T_4$.

Figures 15J, 15K:
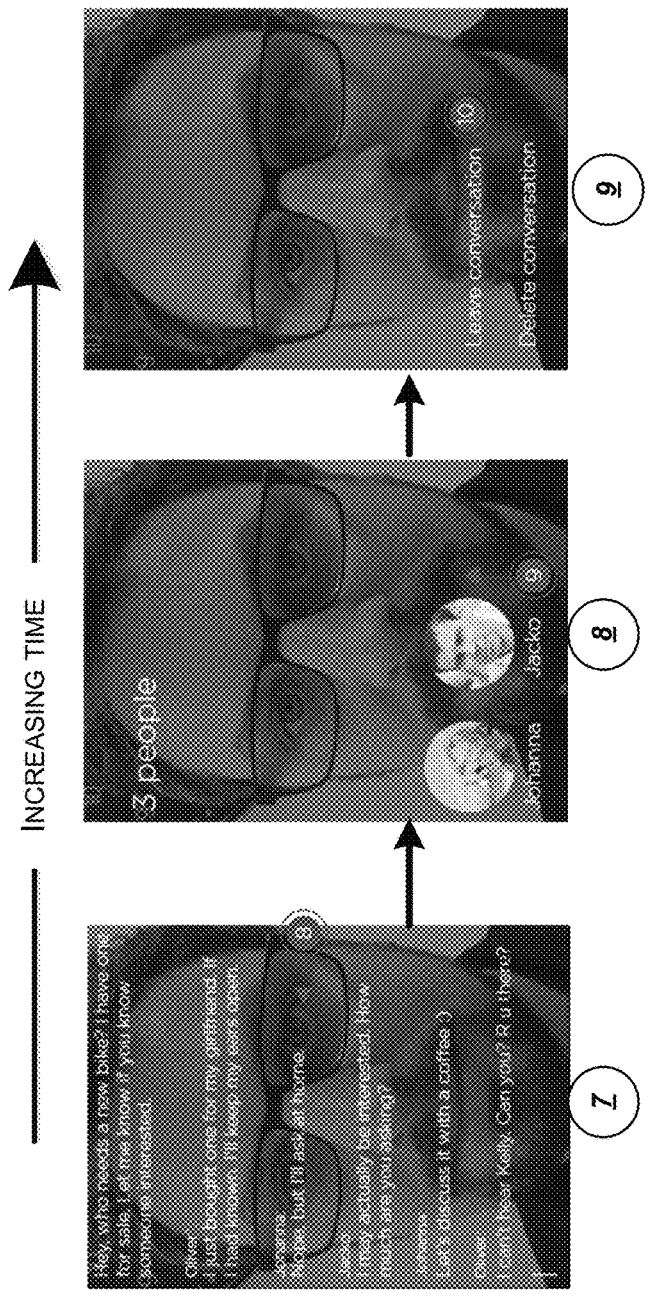
Figure 15L:
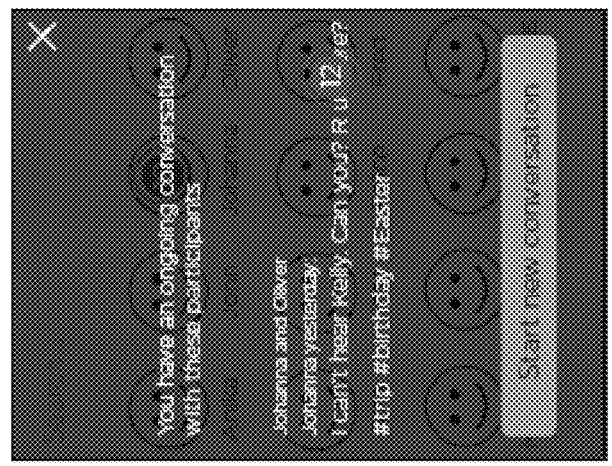

When a user added to a conversation and there is already a conversation with that set of users (e.g., S721 in FIG. 7B, S731 in FIG. 7C, and S737 in FIG. 7D). In current implementations, the user adding the other user is given the option of joining one of the other conversations (FIG. 15L). If there are multiple ongoing conversations for the selected participants, the UI provides the user with a scrolling list.

Leaving a Conversation

An exemplary process of a user leaving a conversation was described above with reference to FIG. 7D. In the example in FIG. 15I, the user C leaves the group conversation formed in FIG. 15D. In view #7 the user C (Oliver) uses the UI to transition to the conversation meta view (#8). In this conversation meta view (#8), the UI presents information about the conversation (e.g., as described above). While in the conversation meta view (#8), the user swipes upwards to transition to view #9 in which the UI provides the user with the options of leaving or deleting the conversation. In this example, Oliver chooses to leave the conversation by selecting the appropriate option on the screen. The other users are advised that Oliver has left the conversation (FIG. 15J).

With reference to the flowchart in FIG. 7D, when the user C (Oliver) elects to leave the conversation, the backend determines (at S736) whether a conversation with the remaining members already exists and then proceeds as described above.

Conversation Meta Views

Recall (from FIG. 11A) that a user may use the UI to transition from a conversation view 1104 to a meta view 1106 of the conversation (transition T3). An example conversation meta view of a two-user conversation is shown in FIG. 15C, view #2. User A (Jacko) makes transition from the conversation view (#1) to the meta view (#2) by sliding to the left on the conversation view screen (#1). In the conversation meta view (#2), the UI presents information about the other user. Exemplary conversation meta views of a group conversation are shown in FIGS. 15E-15F, views #8 and #10. In these conversation meta views the UI presents the other users (e.g., as a list of pictures and names). The UI may also provide a count of the number of users in the conversation. Thus, e.g., in the group conversation meta view #8 (FIG. 15E) the UI presents user C (Oliver) with the names and images of the other two users (Johanna and Jacko) and advises Oliver that there are 3 people in the conversation. FIG. 15E shows an exemplary conversation meta view (#10) after user D (Anika) is added to the conversation.

Engaging in and Contribute to Conversations (Add Messages, Assets, Etc.)

Users engage in conversations by typing text into the conversation screen. If the device does not have an actual keyboard, then the user selects the input location on the screen (e.g., 1305 in FIG. 13A) which causes the UI to present a virtual keyboard on the display.

Figure 16A:
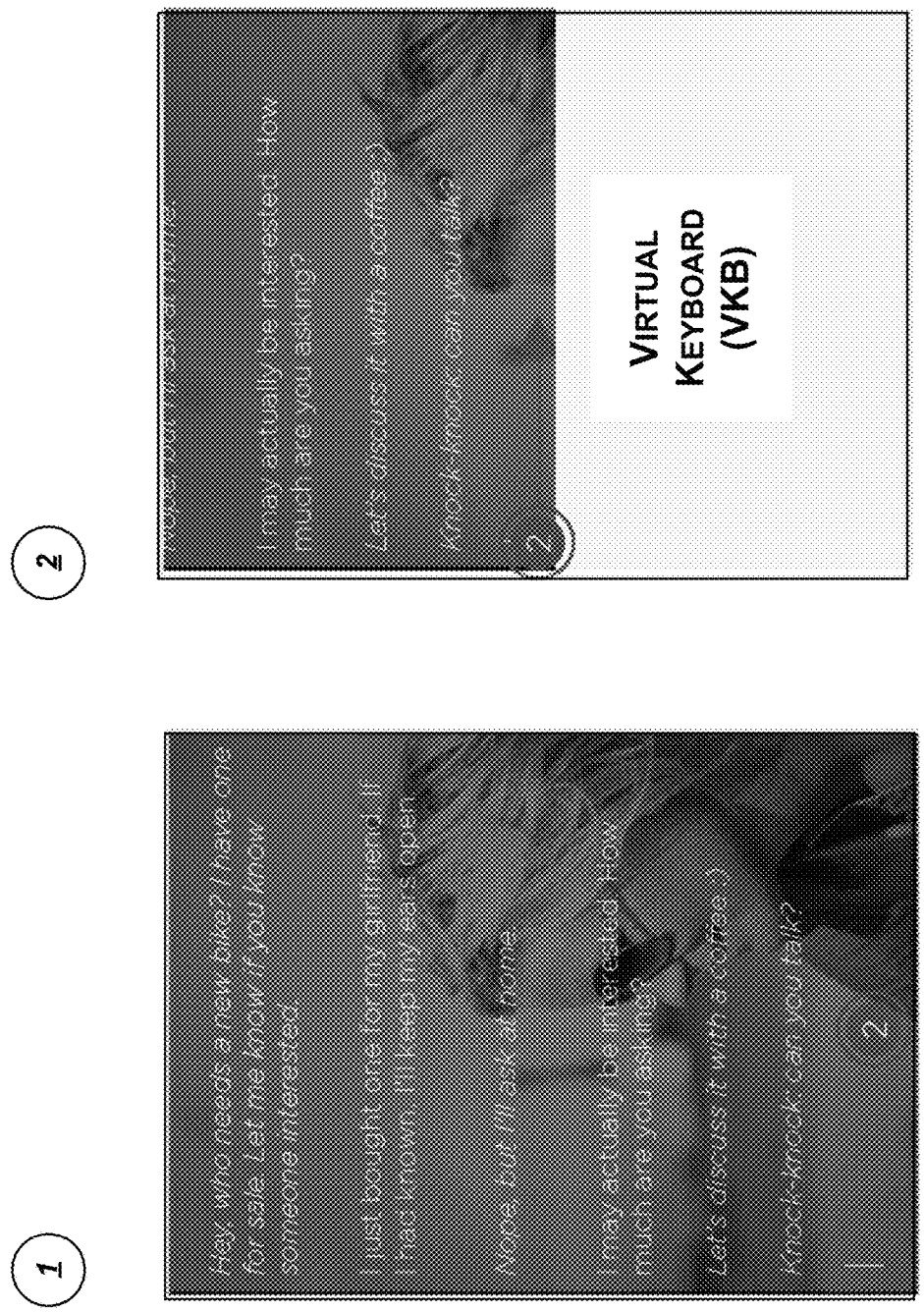

With reference to the example in FIG. 16A, in view #1 the user selects the input location (at 2) and the user is presented with the virtual keyboard (VKB) in view #2.

The user may then type messages which appear in the user's display (view #2). If the user is in a self-conversation then the messages typed will appear on all of the user's active devices. If the user is in conversation with other users, then the typed messages (or notifications thereof) will also appear on the active devices of the other users. If other users have the conversation open on any screens of their devices then the typed messages will be presented on the screen, otherwise they may receive a notification of the messages.

Scrolling in a Conversation & Sorting of Messages

An exemplary approach to message presentation and scrolling is described. Those of ordinary skill in the art will realize and appreciate, upon reading this description, that different and/or other approaches may be used within a UI, and the system is not to be limited in any way by the approach(es) described here.

Preferably, messages are listed top-bottom in reverse order of recency, with the most recent being closer to the input field at the bottom of the UI screen. As new messages arrive/are sent the older ones are pushed upwards.

Figure 16B:
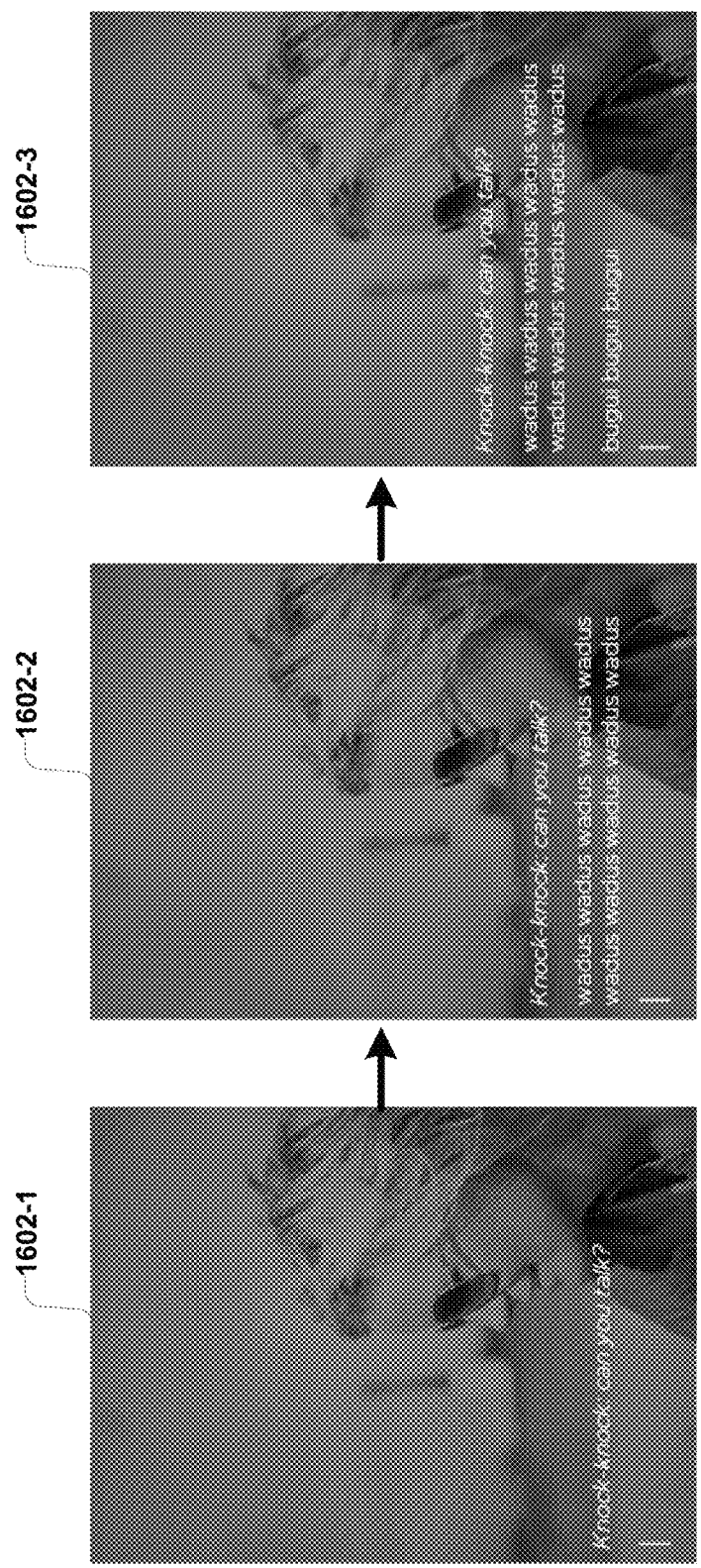

Thus, e.g., as shown in the screen displays of the UI in FIG. 16B, in the first screen 1602-1 the message "Knock-knock: can you talk?" appears close to the input field at the bottom of the UI screen. In the subsequent screens 1602-2, 1602-2, new messages cause the previous message(s) to be pushed upwards.

When a user opens a conversation the first message is preferably already placed at the bottom of the view.

Figure 16C:
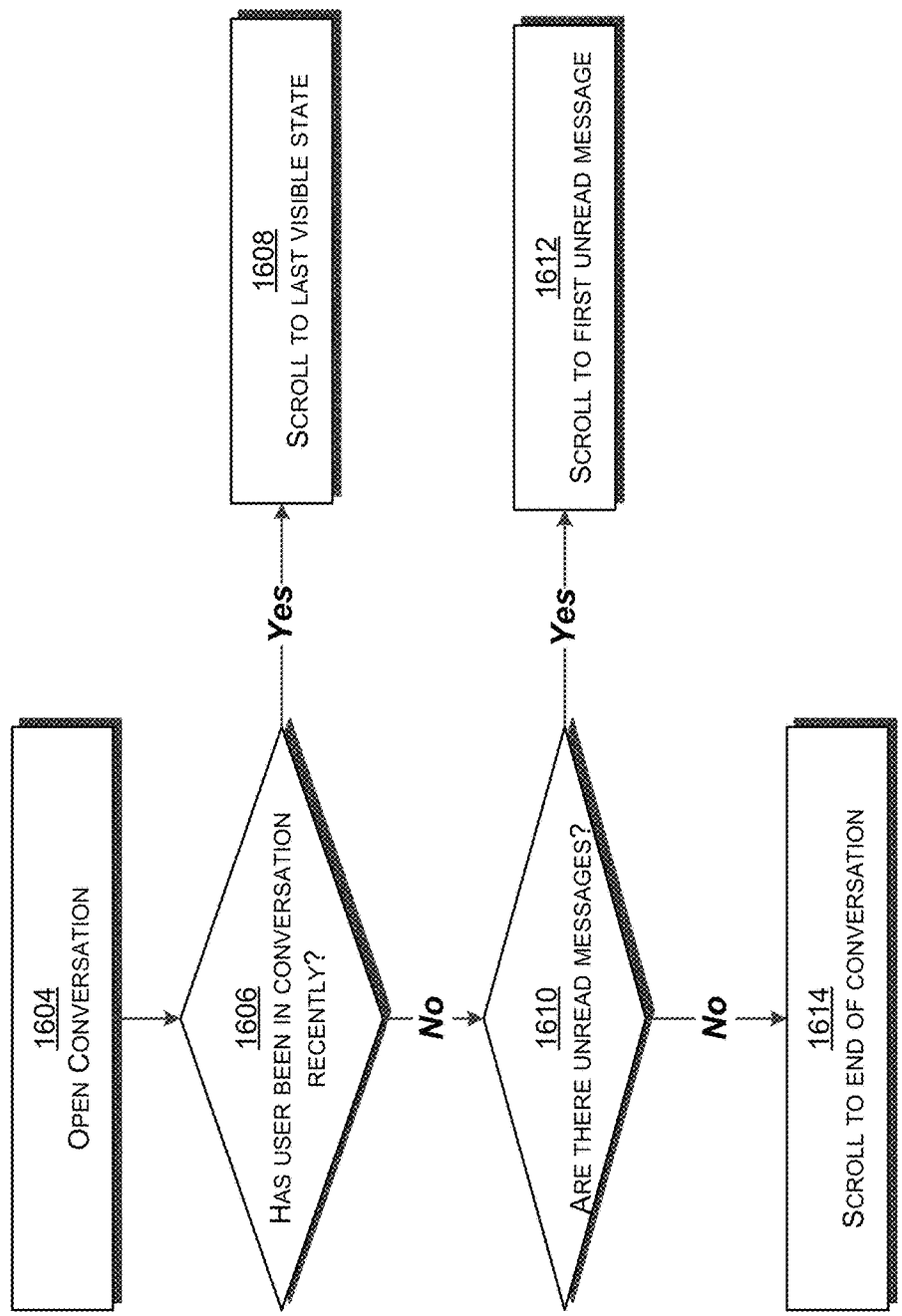
Figure 16D:
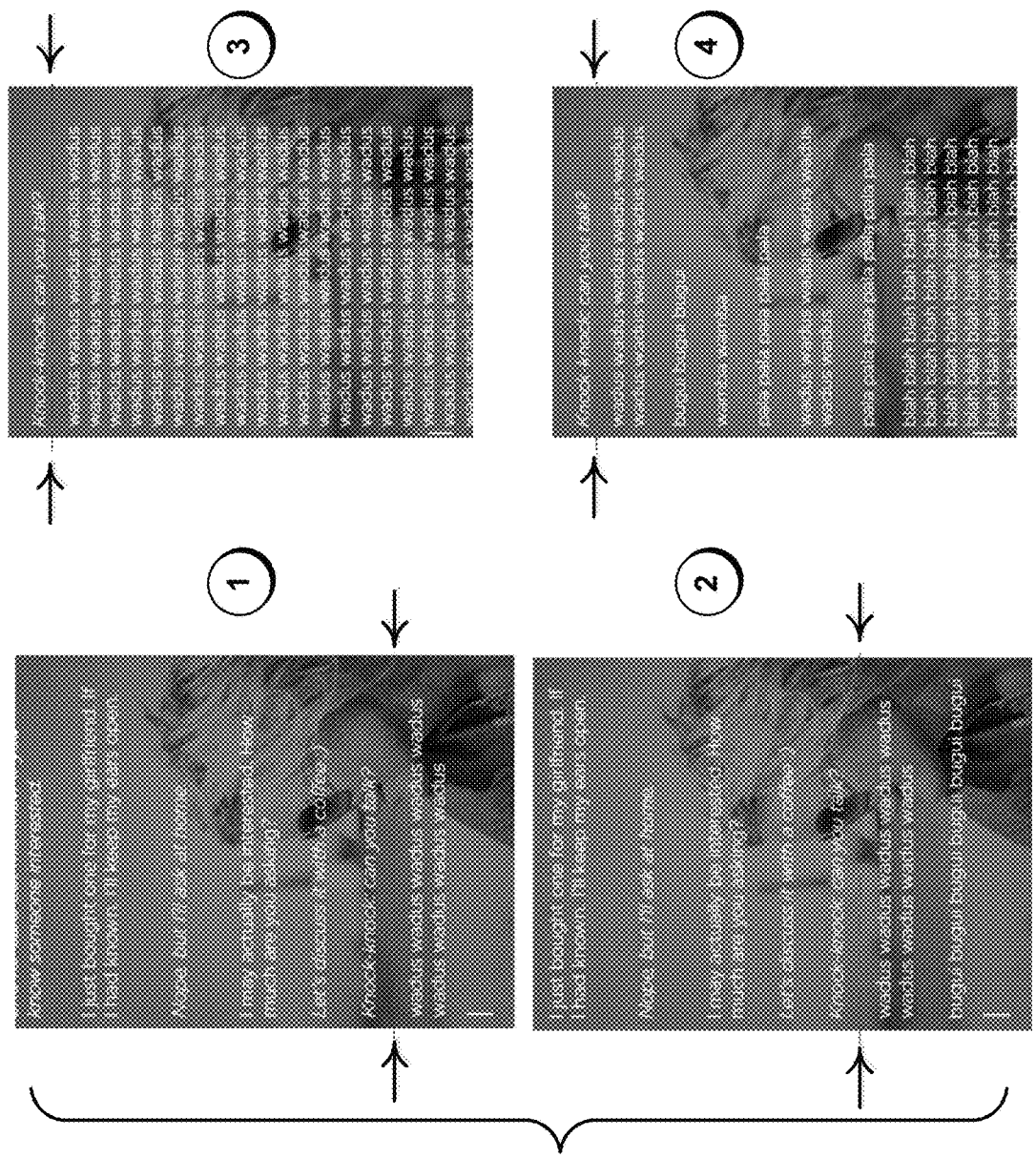

In cases when the conversation is not currently open, the UI may present the message, e.g., in accordance with the process described in the flowcharts in FIG. 16C. First, the conversation is opened (at S1604) and the UI application determines (at S1606) whether the user has recently been in this conversation. For example, the UI may determine whether the user was in this conversation in the past five minutes. If the UI determines that the user has recently been in this conversation, then (at S1608) the UI scrolls the messages to the last visible state. On the other hand, if the UI determines (at S1606) that the user has not recently been in this conversation, then the UI determines (at S1610) whether there are any unread messages. If the UI determines that there are unread messages (at S1610), then the UI scrolls to the first unread message (at S1612). Otherwise, if the UI determines that there are no unread messages, then the UI scrolls to the end of the conversation (at S1614).

Recall that the system 100 attempts to maintain a consistent view of all conversations on all of a user's devices. It should therefore be appreciated that the tests and determinations of whether the user was recently in this conversation (at S1606) and/or whether there are any unread messages (at S1610) should rely on the actual state of the conversation (as reflected in the backend). Thus, e.g., if a user has two devices and reads a conversation on one of those devices and then, a couple of minutes later, opens up the conversation on the other of the devices, the test (at S1606) should return "Yes," since the user was recently in this conversation. Similarly, if the user has read all of the messages on one of the devices, then the test (at S1610) on the other device should return "No" to reflect that there are no unread messages.

When the UI scrolls to the first unread message (at S1612), if the length of unread message/s is/are so that it/they do fit in the viewport, the automatic scroll operates so that the new messages are displayed fully just above the input field. If the length of the first unread message is so that that it cannot be displayed in the current viewport, the automatic scroll is so that the last line of the previous message is visible just above the first line of the unread one. The cursor slides to the left and the content of the message reaches the bottom of the screen. The user has to scroll manually to see the remaining of the message. When the end is reached, the cursor slides in back. The same approach may be applied when there are multiple unread messages and they do not fit in the current viewport.

Figures 16E, 16F:
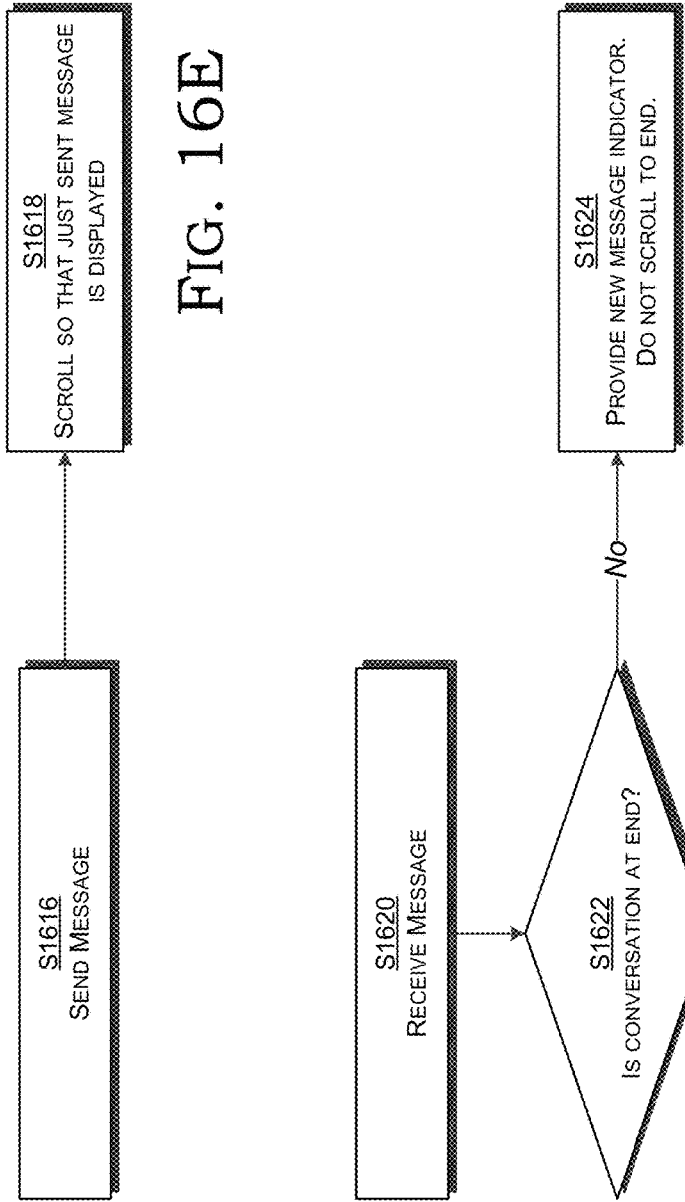

Cases when the conversation is currently open are described with reference to the flowcharts in FIGS. 16E-16F. If a user enters and sends a message (at S1616), then the UI will scroll so that just sent message is displayed (at S1618). If the message is so long that the viewport does not allow it to be shown fully, the scroll operates so that end of the message is displayed.

If the conversation is open and the user receives a message (at S1620, FIG. 16F), then the UI determines (at S1622) whether the conversation is at the end. That is, the UI determines whether the user was viewing the end of the conversation or some other part. If it its determined (at S1622) that the conversation is not at the end then the system may provide an indication that there is a new message (at S1624), without scrolling to the end. In some implementations, tapping a "new message" indicator causes the UI to scroll the conversation so that the new message is visible. On the other hand, if it is determined (at S1622) that the conversation is at the end, then the input field slides to the side and the beginning of the message slides in to view (at S1626).

Assets

As noted above, a conversation may be formed of direct objects (comprising text messages) and indirect objects (e.g., pictures, audio, video, files, etc.) Indirect objects may refer to assets which are considered part of the conversation. The UI preferably provides users with a way to include assets in a conversation, and the UI is also preferably able to render the assets (using an appropriate rendering mechanism for the asset). For example, the UI may provide users with the ability to include photographs or other images in a conversation. A photograph or other image may be uploaded via an upload interface or may be captured by the device itself. For example, if the device is a smartphone (e.g., an Apple iPhone) with a camera, the device's camera may be used to obtain an image (i.e., a photograph) for use as an asset in a conversation.

In some cases, the UI may present a placeholder or iconic representation for an asset, where user selection of the placeholder or icon causes the UI to render the actual asset. For example, in the case of digital images, the UI may present a reduced size version (or thumbnail) of the image in the correct place in the conversation. The user may view the image on the device by selecting the image. The user may also reduce the size of the image by again selecting it.

Similarly, in the case of a digital video or audio asset, the UI may include an icon representing a video or audio asset, respectively. User selection of the icon causes the UI to render the asset (e.g., play the video or audio associated with the asset, as appropriate).

Overview—Operation

Devices interact with the backend 108 in order to perform administrative operations and to conduct conversations. Each device 102 needs to be able to initiate conversations and to send information (objects) to a conversation. In addition, each device 102 needs to be able to obtain conversation information (objects) for conversations in which the device is involved. In a presently preferred implementation an API is provided and messaging uses an HTTP protocol.

Protocol Basics

The framework 100 provides a distributed system in which a variety of user applications communicate with each other using a central backend system as their persistent store through which they share data. The mechanisms by which user applications communicate with the backend 108 form the device API.

While the following describes a particular implementation, those of ordinary skill in the art will realize and appreciate, upon reading this description, that different and/or other implementations may be used.

Resources, Requests, and Events

The Resource Tree

The API defines a protocol that allows a single user application (a device 104) to maintain a synchronized resource tree with the backend 108. The device 104 can manipulate the tree and the backend informs the device 104 of any manipulations it in turn has performed on that tree.

Each resource in the tree has a label that uniquely identifies it with its sibling resources (i.e., all resources that have the same parent resource). The (absolute) address of a resource can be determined by concatenating the labels of the forming the way from the root of the tree to the resource.

The labels have meaning (unlike in most RESTful protocols), and the type and purpose of a resource can directly be determined from its path. Conversely, the path to a certain resource can be crafted with little input. In other words, for each resource in the tree, the meaning of the labels of its child resources is well defined in the protocol.

Generally, there are two types of labels: either they are a fixed literal, normally an English term, or an opaque identifier. As noted, these identifiers are only unique within the same parent resource.

This resource tree is shared between device and backend. However, the backend has the authority over the tree, meaning that at any point, the backend's version of the tree is authoritative and to be considered the truth. Accordingly, as those of ordinary skill in the art will appreciate and understand, upon reading this description, any and all data represented by the resource tree in the backend will be considered to be authoritative and the true. For example, the backend's version of any conversation data is preferably considered to be the true version of the corresponding conversation.

Requests

A device actively accesses the backend version of the tree through operations called "requests." Through these requests it has access to a particular resource in the tree and can perform an operation on that resource.

When issuing a request, the device states the address of the resource in question by stating the list of the labels leading to the resource and which operation it wishes to perform.

The backend will process each request and will return an answer, called the "response." It can either be a successful response or an error message. Successful responses generally will contain a representation of the resource after the request has succeeded. Error responses will carry information about why the request failed.

Operations are defined in terms of so-called "methods" which are similar to those used in HTTP (and which use similar or the same names):

The "GET" method returns the current state of the resource.

The "PUT" method manipulates the current state of the resource.

The "POST" method creates a new subordinate resource.

The "DELETE" method removes the resource and all its subordinate resources.

A "GET" request may optionally include request "arguments," a list of key value pairs that limit the information contained in the resource representation returned.

A "PUT" request requires a representation of the new state of the resource to be included with the request. This representation may be partial and only contain that part of the state the device wishes to modify.

Similarly, a "POST" request needs to contain a representation of the new resource. There will be mandatory and optional parts of the state with the backend filling out missing optional parts with default values.

The result of a "POST" request is the state of the new resource. The label and, subsequently, the address of the new resource can be determined from the representation returned by a means described for the particular resource.

A successful "DELETE" request will not return anything since there is nothing left.

Events

The backend will inform a device about any changes it does to the tree other than those in response to requests issued by the device itself by way of "events."

Events essentially transmit the result of a successful request made by the backend to the tree that modified the tree. Thus, they contain the address, method, and representation of the resource after the request.

On occasion, an operation by the backend results in several resources being modified. In order for the device to realize this, the backend will transmit events not individually, but as event sets. An event set contains all the events emitted as a result for a single action.

Since messages can get lost, each event set carries a sequence number that grows by one between individual subsequent sets. Thus, if a device detects that the number grew by more than one between two received sets, it will have to synchronize its state using a series of "GET" requests.

Resource Types

Expectations for and behavior of the various methods differs slightly for different resources. However, resources can be grouped into a relatively small number of types that all exhibit similar behavior.

For this API, we define four types: entities, collections, composites, and irregulars. They will be explained in detail below.

Entities

Entities are resources that contain a single object. They are leaves in the resource tree and do not contain any subordinate resources. Their content is a single object with well-defined attributes.

A "GET" request on an entity will always return the value of that entity at the point of time when the server received the request. It will return the complete object with all its attributes. Attributes that are not set for some reason will still be present but have a value of "null".

Consequently, any event issued for an entity will also contain the complete object with all attributes.

A "PUT" request on an entity will update the content of the entity. The request should contain an object with only the attributes the client wishes to change. The server may reject a request with values it finds unacceptable with a "400 Bad Request" with "error: "invalid-attr"". It will never change any suggested value.

A successful response to the request will contain the complete object with its new state. This is identical to the response of a "GET" request received at the exact time processing of the "PUT" has finished.

A "DELETE" request on an entity deletes that entity, assuming that is possible.

"POST" requests are not allowed for entities.

Collections

Collections are resources that contain a set of resources. Each collection contains exactly one type of resource. Collections don't have any state of their own; they simply are the list of their collected entities. Further constraints and rules are to be defined for each type of collection individually. Such rules are how to build the address of an individual entity from the collections address and the entity's content and whether entities are sorted and if so, how.

A "GET" request on an entity returns the list of entities or a subset of the list of entities. A subset can be enforced explicitly by request parameters or it can be chosen voluntarily by the server. The response will always be an object that contains the list of returned entities as one attribute and additional information identifying the presence and parameters of a subset, and the extent of the full set. Because collections differ very much in nature and content, no general rules are given for these attributes. They need to be defined individually for each type of collection.

As an example, say by default the server will only return the ten newest entities for a certain collection. The response will then not only include those ten entities but also the overall number of entities in the collection allowing the client to request further entities with request parameters.

A "POST" request creates a new member entity in the collection. The request should contain an object with all the attributes for the new entity the client wishes to set which may at least be all attributes that do not have default values. The server will reject a request with missing required arguments with a "400 Bad Request" with "error: "missing-attr"". The server is free to force attributes to different values if it has a good reason and this behavior is documented or reject certain values outright with a "400 Bad Request" with "error: "invalid-attr".

A successful response to the "POST" request will contain the content of the newly created entity exactly as if a "GET" request had been received on the entity right after creating it.

The creation of a collection resource will result in an event. This event will have the address of the collection, the method "POST" and the state of the newly created resource.

"PUT" and "DELETE" requests are not allowed for collections, they are allowed for their members.

Composites

Composites combine a number of subordinate entities of different types. They collect the various resources of complex constructs and allow quick retrieval of all of them. For instance, a conversation consists of its meta-data, call-state, the list of participants, and the list of messages. Each of these is an individual resource.

Each of these subordinate resources has a well-defined label within the composite and can thus be addressed individually by adding the label to the composites address.

A particular composite may or may not allow a "GET" request. If it does, the result will be an object that contains the result of a "GET" request issued to each contained resource as the value of an attribute with the contained resource's label.

With conditional requests the system may have to transmit meta-data for each contained resource. In such cases, the attributes may have to become, in turn, objects with a "value" attribute and additional attributes for meta information.

In some implementations the meta attributes may be included directly into the resource's object (the GET for a resource always returns an object) provided there are no collisions and the break of separation is acceptable.

Another option uses multipart messages for HTTP. This would allow the use of actual HTTP headers for anything that is actual HTTP headers.

If a composite is the inner type of a collection the content of the object passed as the request content of a "POST" request to the collection needs to be defined on an individual basis. The response content of that request should follow the general rule, though, and should be a response content of a "GET" request on the composite received after creating the composite.

"PUT", "POST", and "DELETE" requests are not allowed with composites. They will never issue any events.

Irregulars

Irregulars are resources that are none of the above. As such, their behavior needs to be defined on a case-by-case basis.

Encoding of Content

The system 100 is preferably agnostic with respect to encoding, as long as the encoding can serialize the data model that JSON provides.

HTTP as Transport Protocol

The resource model maps onto HTTP except for events that are described below.

Events as JSON Objects

An event consists of three parts: the address of the resource, the method invoked, and, optionally, the resource state. Events are sent in event sets that group all events resulting from one update. Each event set has a sequence number that increases by one between events sets. Thus, an event can easily be embedded into a JSON object, as shown in the following example:

```
{
    "sequence": 323111,
    "events": [
    "address": [ "self", "user" ],
    "method": "PUT",
    "data": {
        "name": "Evil Eve",
        "picture_url": "http://bit.ly/IeWSIZ",
        "accent_color": [0.3, 0.3, 0.8, 1.0]
        }
    ]
}
```

The address is given as a list of the labels as strings for ease of parsing.

Computing

The services, mechanisms, operations and acts shown and described above are implemented, at least in part, by software running on one or more computers or computer systems or devices. It should be appreciated that each user device is, or comprises, a computer system.

Programs that implement such methods (as well as other types of data) may be stored and transmitted using a variety of media (e.g., computer readable media) in a number of manners. Hard-wired circuitry or custom hardware may be used in place of, or in combination with, some or all of the software instructions that can implement the processes of various embodiments. Thus, various combinations of hardware and software may be used instead of software only.

One of ordinary skill in the art will readily appreciate and understand, upon reading this description, that the various processes described herein may be implemented by, e.g., appropriately programmed general purpose computers, special purpose computers and computing devices. One or more such computers or computing devices may be referred to as a computer system.

Figure 17A:
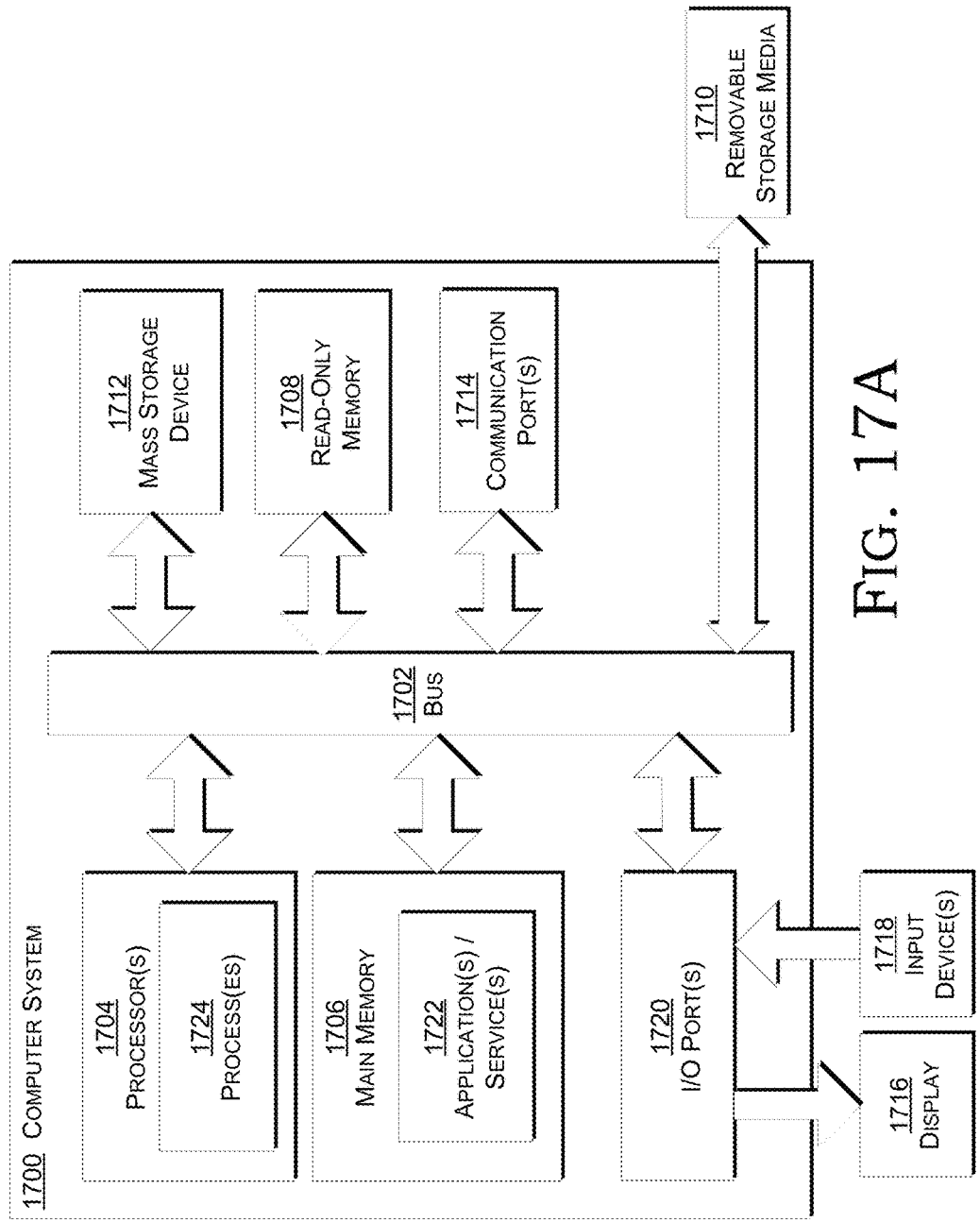
FIGS. 17A-17E depict aspects of computing and computer devices in accordance with embodiments.

FIG. 17A is a schematic diagram of a computer system 1700 upon which embodiments of the present disclosure may be implemented and carried out.

According to the present example, the computer system 1700 includes a bus 1702 (i.e., interconnect), one or more processors 1704, one or more communications ports 1714, a main memory 1706, removable storage media 1710, read-only memory 1708, and a mass storage 1712. Communication port(s) 1714 may be connected to one or more networks by way of which the computer system 1700 may receive and/or transmit data.

As used herein, a "processor" means one or more microprocessors, central processing units (CPUs), computing devices, microcontrollers, digital signal processors, or like devices or any combination thereof, regardless of their architecture. An apparatus that performs a process can include, e.g., a processor and those devices such as input devices and output devices that are appropriate to perform the process.

Processor(s) 1704 can be (or include) any known processor, such as, but not limited to, an Intel® Itanium® or Itanium 2® processor(s), AMD® Opteron® or Athlon MP® processor(s), or Motorola® lines of processors, and the like. Communications port(s) 1714 can be any of an RS-232 port for use with a modem based dial-up connection, a 10/100 Ethernet port, a Gigabit port using copper or fiber, or a USB port, and the like. Communications port(s) 1714 may be chosen depending on a network such as a Local Area Network (LAN), a Wide Area Network (WAN), a CDN, or any network to which the computer system 1700 connects. The computer system 1700 may be in communication with peripheral devices (e.g., display screen 1716, input device(s) 1718) via Input/Output (I/O) port 1720. Some or all of the peripheral devices may be integrated into the computer system 1700, and the input device(s) 1718 may be integrated into the display screen 1716 (e.g., in the case of a touch screen).

Main memory 1706 can be Random Access Memory (RAM), or any other dynamic storage device(s) commonly known in the art. Read-only memory 1708 can be any static storage device(s) such as Programmable Read-Only Memory (PROM) chips for storing static information such as instructions for processor(s) 1704. Mass storage 1712 can be used to store information and instructions. For example, hard disks such as the Adaptec® family of Small Computer Serial Interface (SCSI) drives, an optical disc, an array of disks such as Redundant Array of Independent Disks (RAID), such as the Adaptec® family of RAID drives, or any other mass storage devices may be used.

Bus 1702 communicatively couples processor(s) 1704 with the other memory, storage and communications blocks. Bus 1702 can be a PCI/PCI-X, SCSI, a Universal Serial Bus (USB) based system bus (or other) depending on the storage devices used, and the like. Removable storage media 1710 can be any kind of external hard-drives, floppy drives, IOMEGA® Zip Drives, Compact Disc-Read Only Memory (CD-ROM), Compact Disc-Re-Writable (CD-RW), Digital Versatile Disk-Read Only Memory (DVD-ROM), etc.

Embodiments herein may be provided as one or more computer program products, which may include a machine-readable medium having stored thereon instructions, which may be used to program a computer (or other electronic devices) to perform a process. As used herein, the term "machine-readable medium" refers to any medium, a plurality of the same, or a combination of different media, which participate in providing data (e.g., instructions, data structures) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory, which typically constitutes the main memory of the computer. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications.

The machine-readable medium may include, but is not limited to, floppy diskettes, optical discs, CD-ROMs, magneto-optical disks, ROMs, RAMs, erasable programmable read-only memories (EPROMs), electrically erasable programmable read-only memories (EEPROMs), magnetic or optical cards, flash memory, or other type of media/machine-readable medium suitable for storing electronic instructions. Moreover, embodiments herein may also be downloaded as a computer program product, wherein the program may be transferred from a remote computer to a requesting computer by way of data signals embodied in a carrier wave or other propagation medium via a communication link (e.g., modem or network connection).

Various forms of computer readable media may be involved in carrying data (e.g. sequences of instructions) to a processor. For example, data may be (i) delivered from RAM to a processor; (ii) carried over a wireless transmission medium; (iii) formatted and/or transmitted according to numerous formats, standards or protocols; and/or (iv) encrypted in any of a variety of ways well known in the art.

A computer-readable medium can store (in any appropriate format) those program elements that are appropriate to perform the methods.

As shown, main memory 1706 is encoded with application(s) 1722 that support(s) the functionality as discussed herein (an application 1722 may be an application that provides some or all of the functionality of one or more of the mechanisms described herein). Application(s) 1722 (and/or other resources as described herein) can be embodied as software code such as data and/or logic instructions (e.g., code stored in the memory or on another computer readable medium such as a disk) that supports processing functionality according to different embodiments described herein.

Figure 17B:
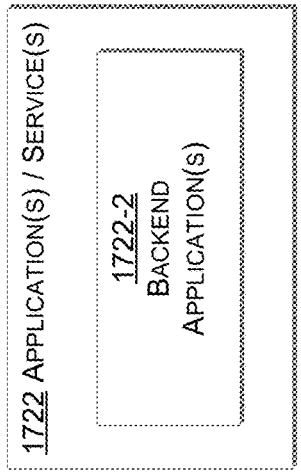
Figure 17C:
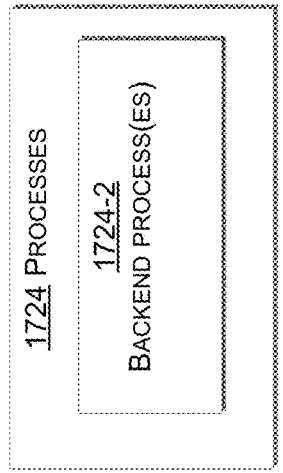

For example, as shown in FIGS. 17B and 17C, respectively, application(s) 1722 may include device application(s) 1722-1 in FIG. 17B (corresponding to 114 in FIG. 2A), and backend application(s) 1722-2 in FIG. 17B (corresponding to 112 in FIGS. 1 and 2B, and corresponding to backend service(s) 802, FIG. 8A).

As shown, e.g., in FIG. 2A, device application(s) 114 (1722-1 in FIG. 17B) may include system/administrative applications 126, user interface (UI) applications 128, storage applications 130, messaging and signaling applications 132, and other miscellaneous applications 134.

As noted above, backend system services 802 (1722-2 in FIG. 17C) may include configuration services 812, user services 814, utilities and miscellaneous services 815, and conversation/asset manager services 816. The conversation/asset manager services 816 may include conversation services 818 and asset services 820. The utilities and miscellaneous services 815 may include search services 817.

During operation of one embodiment, processor(s) 1704 accesses main memory 1706 via the use of bus 1702 in order to launch, run, execute, interpret or otherwise perform the logic instructions of the application(s) 1722. Execution of application(s) 1722 produces processing functionality of the service(s) or mechanism(s) related to the application(s). In other words, the process(es) 1724 represents one or more portions of the application(s) 1722 performing within or upon the processor(s) 1704 in the computer system 1700.

Figure 17D:
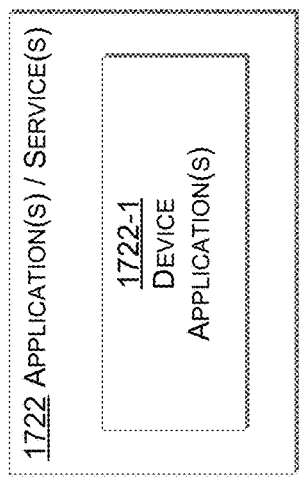
Figure 17E:
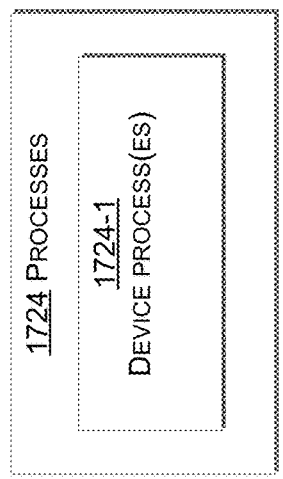

For example, as shown in FIG. 17D, process(es) 1724 may include device process(es) 1724-1, corresponding to one or more of the device application(s) 1722-1. Similarly, as shown in FIG. 17E, process(es) 1724 may include backend process(es) 1724-2, corresponding to one or more of the backend application(s) 1722-2.

It should be noted that, in addition to the process(es) 1724 that carries(carry) out operations as discussed herein, other embodiments herein include the application 1722 itself (i.e., the un-executed or non-performing logic instructions and/or data). The application 1722 may be stored on a computer readable medium (e.g., a repository) such as a disk or in an optical medium. According to other embodiments, the application 1722 can also be stored in a memory type system such as in firmware, read only memory (ROM), or, as in this example, as executable code within the main memory 1706 (e.g., within Random Access Memory or RAM). For example, application 1722 may also be stored in removable storage media 1710, read-only memory 1708, and/or mass storage device 1712.

Those skilled in the art will understand that the computer system 1700 can include other processes and/or software and hardware components, such as an operating system that controls allocation and use of hardware resources.

As discussed herein, embodiments of the present invention include various steps or operations. A variety of these steps may be performed by hardware components or may be embodied in machine-executable instructions, which may be used to cause a general-purpose or special-purpose processor programmed with the instructions to perform the operations. Alternatively, the steps may be performed by a combination of hardware, software, and/or firmware. The term "module" refers to a self-contained functional component, which can include hardware, software, firmware or any combination thereof.

One of ordinary skill in the art will readily appreciate and understand, upon reading this description, that embodiments of an apparatus may include a computer/computing device operable to perform some (but not necessarily all) of the described process.

Embodiments of a computer-readable medium storing a program or data structure include a computer-readable medium storing a program that, when executed, can cause a processor to perform some (but not necessarily all) of the described process.

Where a process is described herein, those of ordinary skill in the art will appreciate that the process may operate without any user intervention. In another embodiment, the process includes some human intervention (e.g., a step is performed by or with the assistance of a human).

Real Time

Those of ordinary skill in the art will realize and understand, upon reading this description, that, as used herein, the term "real time" means near real time or sufficiently real time. It should be appreciated that there are inherent delays in network-based communication (e.g., based on network traffic and distances), and these delays may cause delays in data reaching various components Inherent delays in the system do not change the real-time nature of the data. In some cases, the term "real-time data" may refer to data obtained in sufficient time to make the data useful for its intended purpose.

Although the term "real time" may be used here, it should be appreciated that the system is not limited by this term or by how much time is actually taken. In some cases, real time computation may refer to an online computation, i.e., a computation that produces its answer(s) as data arrive, and generally keeps $U_p$ with continuously arriving data. The term "online" computation is compared to an "offline" or "batch" computation.

As used in this description, the term "portion" means some or all. So, for example, "A portion of X" may include some of "X" or all of "X". In the context of a conversation, the term "portion" means some or all of the conversation.

As used herein, including in the claims, the phrase "at least some" means "one or more," and includes the case of only one. Thus, e.g., the phrase "at least some ABCs" means "one or more ABCs", and includes the case of only one ABC.

As used herein, including in the claims, the phrase "based on" means "based in part on" or "based, at least in part, on," and is not exclusive. Thus, e.g., the phrase "based on factor X" means "based in part on factor X" or "based, at least in part, on factor X." Unless specifically stated by use of the word "only", the phrase "based on X" does not mean "based only on X."

As used herein, including in the claims, the phrase "using" means "using at least," and is not exclusive. Thus, e.g., the phrase "using X" means "using at least X." Unless specifically stated by use of the word "only", the phrase "using X" does not mean "using only X."

In general, as used herein, including in the claims, unless the word "only" is specifically used in a phrase, it should not be read into that phrase.

As used herein, including in the claims, the phrase "distinct" means "at least partially distinct." Unless specifically stated, distinct does not mean fully distinct. Thus, e.g., the phrase, "X is distinct from Y" means that "X is at least partially distinct from Y," and does not mean that "X is fully distinct from Y." Thus, as used herein, including in the claims, the phrase "X is distinct from Y" means that X differs from Y in at least some way.

As used herein, including in the claims, a list may include only one item, and, unless otherwise stated, a list of multiple items need not be ordered in any particular manner. A list may include duplicate items. For example, as used herein, the phrase "a list of XYZs" may include one or more "XYZs".

It should be appreciated that the words "first" and "second" in the description and claims are used to distinguish or identify, and not to show a serial or numerical limitation. Similarly, the use of letter or numerical labels (such as "(a)", "(b)", and the like) are used to help distinguish and/or identify, and not to show any serial or numerical limitation or ordering.

No ordering is implied by any of the labeled boxes in any of the flow diagrams unless specifically shown and stated. When disconnected boxes are shown in a diagram the activities associated with those boxes may be performed in any order, including fully or partially in parallel.

While the invention has been described in connection with what is presently considered to be the most practical and preferred embodiments, it is to be understood that the invention is not to be limited to the disclosed embodiment, but on the contrary, is intended to cover various modifications and equivalent arrangements included within the spirit and scope of the appended claims.

We claim:

1. A computer-implemented method, operable in a communication framework in which each of a plurality of users has one or more devices associated therewith, and in which the users use at least some of their devices to communicate via a backend system, the method comprising:

(A) maintaining, in the backend system, a conversation between one or more users of the plurality of users, wherein the conversation comprises a time-ordered sequence of objects, and wherein the conversation maintained by the backend system is an authoritative version of the conversation within the communication framework, wherein at least one particular user of said one or more users has a first plurality of devices associated with the conversation, said first plurality of devices including a first device and a second device; and, (B) during said conversation, and in response to a change in said conversation, updating said conversation on multiple devices associated with said conversation, said multiple devices including multiple of said first plurality of devices of said at least one particular user, wherein the conversation is updated on all present devices of all users in the conversation; and, (C) during said conversation,
  (C)(1) providing, on said first device, a first view of the conversation, wherein the first view of the conversation comprises a first subset of the sequence of objects in the conversation for a first time period; and
  (C)(2) providing, on said second device, a second view of the conversation, wherein the second view of the conversation comprises a second subset of the sequence of objects in the conversation for a second time period, wherein the second device was not associated with the conversation during at least some of the second time period, and wherein the second device obtains at least some of the second subset of the sequence of objects from the backend system, wherein, when the first time period is the same as the second time period then the first subset of the sequence of objects is the same as the second subset of the sequence of objects.

2. The method of claim 1, wherein the first device renders the conversation differently from the second device.

3. The method of claim 1, wherein the conversation comprises an earliest object and a most recent object, where the earliest object is the oldest object in the conversation, the method further comprising:
(D) during said conversation,
  (D)(1) adding a third device to the conversation, the third device being new to the conversation; and
  (D)(2) providing, on the third device, an initial view of the conversation, wherein the initial view of the conversation includes the most recent object in the conversation.

4. The method of claim 3, further comprising:
(D) during said conversation, providing, on the third device, a third view of the conversation, wherein the third view of the conversation includes the earliest object in the conversation, wherein the third device obtains at least the earliest object in the conversation from the backend system.

5. The method of claim 3, further comprising:
(D) during said conversation, providing, on the third device, a third view of the conversation, wherein the third view of the conversation comprises a third subset of the sequence of objects in the conversation for a third time period, and wherein the third device was not associated with the conversation during at least some of the third time period, and wherein the third device obtains at least some of the third subset of the sequence of objects from the backend system, when the first time period is the same as the third time period then the first subset of the sequence of objects is the same as the third subset of the sequence of objects.

6. The method of claim 4, wherein the third device is associated with a user already engaged in the conversation.

7. The method of claim 4, wherein the third device is associated with a user being added to the conversation.

8. The method of claim 1, wherein the maintaining in (A) comprises maintaining a consistent version of the conversation.

9. The method of claim 1, wherein conversation maintained by the backend system is considered to be the true version of the conversation within the communication framework.

10. The method of claim 1, wherein the one or more devices are selected from: smartphones, tablet devices, computer devices, set-top boxes, and televisions.

11. The method of claim 1, wherein each object in the conversation represents at least one of: text, an image, video content, audio content, a file, a link to an asset, and meta information about the conversation.

12. The method of claim 1, wherein the backend system acts as a persistent store through which users share data.

13. A computer-implemented method, operable in a communication framework in which each a plurality of users has one or more devices associated therewith, and in which the users use at least some of their devices to communicate via a backend system,
the method comprising,
  (A) establishing a conversation between one or more users of the plurality of users, wherein the conversation comprises a time-ordered sequence of objects;
  (B) maintaining the conversation in the backend system; and
  (C) providing, on each of a plurality of devices associated with the conversation, a corresponding plurality of views of the conversation, each of the plurality of views being associated with a corresponding time period and each of the plurality of views comprising a subset of the sequence of objects for the corresponding time period, wherein, any of the views that cover overlapping time periods comprise the same subsets of the sequence of objects;
  (D) during said conversation, in response to a change in said conversation, updating said conversation on multiple of said plurality of devices associated with said conversation, wherein at least two multiple of said plurality of devices are associated with the same user, wherein said conversation is updated on all present devices of all users in the conversation.

14. The method of claim 13, wherein the maintaining in (B) comprises maintaining a consistent version of the conversation.

15. The method of claim 13, wherein the conversation maintained by the backend system is considered to be the true version of the conversation within the communication framework.

16. The method of claim 13, wherein the one or more devices are selected from: smartphones, tablet devices, computer devices, set-top boxes, and televisions.

17. The method of claim 13, wherein each object in the conversation represents at least one of: text, an image, video content, audio content, a file, a link to an asset, and meta information about the conversation.

18. The method of claim 13, wherein the backend system acts as a persistent store through which users share data.

19. A computer-implemented method, operable in a communication framework in which each a plurality of users has one or more devices associated therewith, and in which the users use at least some of their devices to communicate via a backend system,
the method comprising,
- (A) establishing a conversation between (i) a first user of the plurality of users, the first user using first multiple devices, including a first device, to engage in the conversation, and (ii) a second user of the plurality of users, the second user using a second device to engage in the conversation;
- (B) maintaining the conversation in the backend system, wherein the conversation comprises a time-ordered sequence of objects; and
- (C) during said conversation, in response to a change in said conversation, updating said conversation on multiple devices associated with said conversation, said multiple devices including a plurality of said first multiple devices used by the first user, wherein said conversation is updated on all present devices of all users in the conversation; and
- (D) during said conversation, adding a third device to the conversation, the third device being associated with the first user, and providing the third device with a view of the conversation, the view being consistent with the conversation as maintained in the backend system.

20. The method of claim 19, wherein the conversation comprises a most recent object, and wherein the view provided in (D) is an initial view of the conversation comprising the most recent object in the conversation.

21. The method of claim 19, wherein, prior to the adding in (D), the third device was not previously used in the conversation.

22. The method of claim 19, wherein the maintaining in (B) comprises maintaining a consistent version of the conversation.

23. The method of claim 19, wherein conversation maintained by the backend system is considered to be the true version of the conversation within the communication framework.

24. The method of claim 19, wherein the one or more devices are selected from: smartphones, tablet devices, computer devices, set-top boxes, and televisions.

25. The method of claim 19, wherein each object in the conversation represents at least one of: text, an image, video content, audio content, a file, a link to an asset, and meta information about the conversation.

26. The method of claim 19, wherein the backend system acts as a persistent store through which users share data.

27. A communication framework in which each a plurality of users has one or more devices associated therewith, each of the one or more devices comprising a processor and a memory, the framework comprising:
a backend system comprising hardware, including at least one processor and a memory, wherein the at least some of the users use at least some of their devices to have conversations via the backend system,
wherein the backend system:
- (a) supports a particular conversation between one or more users of the plurality of users, said one or more users including a particular user, said particular user having a plurality of devices, associated with the particular conversation, said plurality of devices including a first device and a second device;
- (b) maintains a consistent and authoritative state of the particular conversation, wherein the particular conversation comprises a time-ordered sequence of objects, and wherein the backend system provides a subset of the conversation to a device associated with the conversation by providing a subset of the sequence of objects to the device; and
- (c) during said particular conversation, in response to a change in said conversation, updates said conversation on multiple devices associated with the conversation, said multiple devices including multiple of said plurality of devices of said particular user, wherein said conversation is updated on all present devices of all users in the conversation.

28. The communication framework of claim 27, wherein the second device joined the particular conversation after the particular conversation had been ongoing.

29. The communication framework of claim 27, wherein the backend system supports the particular conversation by:
- (a)(1) supporting establishment of the particular conversation; and
- (a)(2) providing at least a subset of the conversation to a device associated with the conversation.

30. The communication framework of claim 27, wherein each of the one or more devices is a device selected from: a smartphone, a tablet device, a computer device, a set-top box, and a television.

31. The communication framework of claim 27, wherein each object in the conversation represents at least one of: text, an image, video content, audio content, a file, a link to an asset, and meta information about the conversation.

32. The communication framework of claim 27, wherein the particular conversation maintained by the backend system is considered to be a true version of the particular conversation within the communication framework.

33. A computer-implemented method, operable in a communication system in which each of a plurality of users has one or more devices associated therewith, and in which the users use at least some of their devices to communicate via a backend system, the method comprising,
- (A) maintaining in the backend system a consistent version of a conversation between multiple users of the plurality of users, wherein conversation maintained by the backend system provides an authoritative version of the conversation within the communication framework, wherein at least one particular user of said one or more users has a first plurality of devices associated with the conversation, said first plurality of devices including a first device and a second device; and,
- (B) during said conversation, and in response to a change in said conversation, updating said conversation on multiple devices associated with said conversation, said multiple devices including multiple of said first plurality of devices of said at least one particular user, wherein the conversation is updated on all present devices of all users in the conversation; and,
- (C) during said conversation,
  - (C)(1) providing, on said first device associated with the conversation, a first view of the conversation, wherein the first view of the conversation comprises a first subset of the conversation corresponding to a first time period; and
  - (C)(2) providing, on said second device associated with the conversation, a second view of the conversation, wherein the second view of the conversation comprises a second subset of the conversation corresponding to a second time period, wherein the second device was not associated with the conversation during at least some of the second time period, wherein, when the first time period overlaps with the second time period for an overlapping period, then the first subset of the conversation overlaps the second subset of the conversation for the overlapping period.

34. A system comprising multiple devices, each of said devices including a processor and a memory, and each of said devices being programmed to perform the method of:
   (A) maintaining, in a backend system, a conversation between one or more users of the plurality of users, wherein the conversation comprises a time-ordered sequence of objects, and wherein the conversation maintained by the backend system is an authoritative version of the conversation within the communication framework, wherein at least one particular user of said one or more users has a first plurality of said multiple devices associated with the conversation, said first plurality of devices including a first device and a second device; and,
   (B) during said conversation, and in response to a change in said conversation, updating said conversation on at least some of said multiple devices associated with said conversation, said multiple devices including multiple of said first plurality of devices of said at least one particular user, wherein the conversation is updated on all present devices of all users in the conversation; and,
   (C) during said conversation,
      (C)(1) providing, on said first device associated with the conversation, a first view of the conversation, wherein the first view of the conversation comprises a first subset of the sequence of objects in the conversation for a first time period; and
      (C)(2) providing, on said second device, a second view of the conversation, wherein the second view of the conversation comprises a second subset of the sequence of objects in the conversation for a second time period, wherein the second device was not associated with the conversation during at least some of the second time period, and wherein the second device obtains at least some of the second subset of the sequence of objects from the backend system,
   wherein, when the first time period is the same as the second time period then the first subset of the sequence of objects is the same as the second subset of the sequence of objects.

35. The system of claim 34, wherein each said device is selected from: a smartphone, a tablet device, a computer device, a set-top box, and a television.

36. A tangible, non-transitory computer-readable storage medium comprising instructions for execution on a device including a processor and a memory in a system of multiple devices, wherein the instructions, when executed by the processor, perform acts of:
   (A) maintaining, in a backend system, a conversation between one or more users of the plurality of users, wherein the conversation comprises a time-ordered sequence of objects, and wherein the conversation maintained by the backend system is an authoritative version of the conversation within the communication framework, wherein at least one particular user of said one or more users has a first plurality of devices associated with the conversation, said first plurality of devices including a first device and a second device; and,
   (B) during said conversation, and in response to a change in said conversation, updating said conversation on at least some of said multiple devices associated with said conversation, said multiple devices including multiple of said first plurality of devices of said at least one particular user, wherein the conversation is updated on all present devices of all users in the conversation; and,
   (C) during said conversation,
      (C)(1) providing, on said first device associated with the conversation, a first view of the conversation, wherein the first view of the conversation comprises a first subset of the sequence of objects in the conversation for a first time period; and
      (C)(2) providing, on said second device, a second view of the conversation, wherein the second view of the conversation comprises a second subset of the sequence of objects in the conversation for a second time period, wherein the second device was not associated with the conversation during at least some of the second time period, and wherein the second device obtains at least some of the second subset of the sequence of objects from the backend system,
   wherein, when the first time period is the same as the second time period then the first subset of the sequence of objects is the same as the second subset of the sequence of objects.

37. The tangible, non-transitory computer-readable storage medium of claim 36, wherein the device is selected from: a smartphone, a tablet device, a computer device, a set-top box, and a television.

38. The method of claim 1, wherein, in (B), in response to the change in the conversation, the conversation is updated on said multiple devices in real time.

39. The method of claim 1, wherein multiple users in said conversation, each have a corresponding plurality of devices associated with the conversation, and wherein, in (B), the conversation is updated on multiple devices of a plurality of said multiple users.

40. The method of claim 13, wherein said updating in (D) is in real time.

41. The method of claim 13, wherein multiple users in said conversation each have a corresponding plurality of devices associated with the conversation, and wherein, in (D), the conversation is updated on multiple devices of a plurality of said multiple users.

42. The method of claim 19, wherein, in (C), in response to said change in the conversation, said conversation is updated on said multiple devices in real time.

43. The method of claim 19, wherein multiple users in said conversation each have a corresponding plurality of devices associated with the conversation, and wherein, in (C), the conversation is updated on multiple devices of a plurality of said multiple users.

44. The communication framework of claim 27, wherein, in (c), said conversation is updated on said multiple devices in real time.

45. The communication framework of claim 27, wherein multiple users in said conversation each have a corresponding plurality of devices associated with the conversation, and wherein, in (c), the conversation is updated on multiple devices of a plurality of said multiple users.

46. The method of claim 33, wherein, in (B), in response to said change in the conversation, said conversation is updated on said multiple devices in real time.

47. A computer-implemented method, operable in a communication framework in which each of a plurality of users has one or more devices associated therewith, and in which the users use at least some of their devices to communicate via a backend system, the method comprising:

(A) maintaining, in the backend system, a consistent version of a conversation between one or more users of the plurality of users, wherein the conversation comprises a time-ordered sequence of objects, and wherein the backend system provides a subset of the conversation to a device associated with the conversation by providing a subset of the sequence of objects to the device; and wherein the conversation maintained by the backend system is an authoritative version of the conversation within the communication framework, wherein at least one particular user of said one or more users has a first plurality of devices associated with the conversation, wherein the conversation maintained by the backend system is considered to be the true version of the conversation within the communication framework, and wherein the backend system acts as a persistent store through which users share data; and, (B) during said conversation, and in response to a change in said conversation, updating information about said conversation on multiple devices associated with said conversation, said multiple devices including multiple of said first plurality of devices of said at least one particular user, wherein the information about said conversation is updated in real time on all present devices of all users in the conversation; and, wherein at least one object in the conversation represents one of: an image, video content, audio content, a file, a link to an asset, and meta information about the conversation.

* * * * *